US012755107B2

(12) United States Patent
Holub et al.

(10) Patent No.: US 12,755,107 B2
(45) Date of Patent: Oct. 6, 2026

(54) SYSTEMS AND METHODS FOR PERFORMING AND VISUALIZING SEMI-AUTOMATED SYSTEMATIC REVIEWS, ONTOLOGICAL HIERARCHIES, AND NETWORK META-ANALYSIS

(71) Applicant: Nested Knowledge, Inc., St. Paul, MN (US)

(72) Inventors: Karl J. Holub, New Brighton, MN (US); Stephen Mead, St. Charles, MO (US); Kevin M. Kallmes, Sioux Falls, SD (US); Jeffrey T. Johnson, Hamel, MN (US); Keith R. Kallmes, Sioux Falls, SD (US)

(73) Assignee: NESTED KNOWLEDGE, INC., St. Paul, MN (US)

( * ) Notice: Subject to any disclaimer, the term of this patent is extended or adjusted under 35 U.S.C. 154(b) by 278 days.

(21) Appl. No.: 18/523,737

(22) Filed: Nov. 29, 2023

(65) Prior Publication Data

US 2024/0176961 A1 May 30, 2024

Related U.S. Application Data

(60) Provisional application No. 63/385,607, filed on Nov. 30, 2022.

(51) Int. Cl.

| | |
|---|---|
| ***G06F 40/40*** | (2020.01) |
| ***G06F 3/04815*** | (2022.01) |
| ***G06F 16/358*** | (2025.01) |

(52) U.S. Cl.

CPC .......... *G06F 40/40* (2020.01); *G06F 3/04815* (2013.01); *G06F 16/358* (2019.01)

(58) Field of Classification Search

CPC ........ G06F 40/40; G06F 40/20; G06F 16/358; G06F 16/26; G06F 16/35; G06F 16/162;

(Continued)

(56) References Cited

U.S. PATENT DOCUMENTS

| | | | |
|---|---|---|---|
| 7,395,501 | B2 | 7/2008 | Graham |
| 7,469,249 | B2 | 12/2008 | Mihaila |

(Continued)

FOREIGN PATENT DOCUMENTS

| | | | | |
|---|---|---|---|---|
| CN | 110472057 A | | 11/2019 | |
| CN | 112364935 A | * | 2/2021 | ......... G06F 18/2321 |

(Continued)

OTHER PUBLICATIONS

Ann Yuan, Andy Coenen, Emily Reif, Daphne Ippolito, "Wordcraft: StoryWriting With Large Language Models", 22nd March, Proceedings of the 27th International Conference on Intelligent User Interfaces (Year: 2022).*

(Continued)

*Primary Examiner* — Paras D Shah
*Assistant Examiner* — Nadira Sultana
(74) *Attorney, Agent, or Firm* — Gallium Law; Jacob Panangat

(57) ABSTRACT

Included in the present disclosure is a system, including an electronic document. In some examples, the electronic document includes a work of authorship. According to some examples, the electronic document includes a topic of the work. The electronic document can include a topic tag configured to identify the topic. In some examples, the system includes a tag generator configured to identify a portion of the work of authorship related to the topic tag using a large language model.

15 Claims, 67 Drawing Sheets

(58) Field of Classification Search
CPC .. G06F 16/285; G06F 16/957; G06F 3/04815; G06N 5/022
See application file for complete search history.

(56) References Cited

U.S. PATENT DOCUMENTS

| | | | | |
|---|---|---|---|---|
| 8,458,185 | B2 | 6/2013 | Nelson | |
| 8,566,360 | B2 | 10/2013 | Chen | |
| 8,782,050 | B2 * | 7/2014 | Nelson | G06F 16/31 707/746 |
| 8,843,479 | B1 | 9/2014 | Bharat | |
| 8,935,291 | B2 | 1/2015 | Chen | |
| 9,552,358 | B2 * | 1/2017 | Cudak | G06F 16/957 |
| 9,710,437 | B2 * | 7/2017 | Bagwell | G06F 16/285 |
| 10,229,117 | B2 | 3/2019 | Cormack | |
| 10,489,347 | B2 * | 11/2019 | Barton | G06F 16/13 |
| 10,599,669 | B2 | 3/2020 | Sexton | |
| 10,679,002 | B2 * | 6/2020 | Kabeya | G06F 40/211 |
| 10,706,113 | B2 | 7/2020 | Lundin | |
| 10,832,360 | B2 | 11/2020 | Bufe | |
| 10,866,992 | B2 | 12/2020 | Pol | |
| 10,984,668 | B2 * | 4/2021 | Bharadwaj | G06F 40/58 |
| 11,037,062 | B2 | 6/2021 | Nakata | |
| 2002/0069086 | A1 | 6/2002 | Fracek | |
| 2002/0128860 | A1 | 9/2002 | Leveque | |
| 2010/0153404 | A1 * | 6/2010 | Ghosh | G06F 16/35 707/769 |
| 2010/0262454 | A1 | 10/2010 | Sommer | |
| 2012/0304247 | A1 | 11/2012 | Badger | |
| 2014/0330760 | A1 | 11/2014 | Meier | |
| 2015/0082156 | A1 * | 3/2015 | Rollins | G06F 40/20 715/255 |
| 2016/0012019 | A1 | 1/2016 | Bagwell et al. | |
| 2017/0323064 | A1 | 11/2017 | Bates | |
| 2018/0089215 | A1 * | 3/2018 | Moon | G06F 16/162 |
| 2019/0130073 | A1 | 5/2019 | Sun | |
| 2019/0384895 | A1 | 12/2019 | Jin | |
| 2020/0011873 | A1 | 1/2020 | Desantis | |
| 2021/0264115 | A1 * | 8/2021 | Wang | G06F 16/26 |
| 2022/0245159 | A1 * | 8/2022 | Vangala | G06N 5/022 |
| 2025/0094429 | A1 * | 3/2025 | Raghavan | G06F 16/248 |
| 2025/0094708 | A1 * | 3/2025 | Cunningham | G06F 40/30 |
| 2025/0124094 | A1 * | 4/2025 | Trivedi | G06Q 10/1093 |

FOREIGN PATENT DOCUMENTS

| | | | |
|---|---|---|---|
| CN | 115062586 | A | 9/2022 |
| JP | 2016134124 | A | 7/2016 |
| WO | 2013096882 | A1 | 6/2013 |

OTHER PUBLICATIONS

Distillersr—"Literature Review Software Smarter Reviews: Trusted Evidence"—Downloaded Oct. 30, 2023—Available from Internet <URL: http://www.distillersr-systematic-review-software>.

* cited by examiner matrix diagram
4902

Odds Ratio

| | Thrombolysis/Medical therapy | Mechanical Thrombectomy + +… | Aspiration | Combination therapy | Stent-triever | Mechanical thrombectomy | Unknown MT |
|---|---|---|---|---|---|---|---|
| Thrombolysis/Medical therapy | 1.00 | 1.12 | 1.07 | 1.16 | 1.02 | 1.06 | 1.53 |
| Mechanical Thrombectomy + IV | 0.896 | 1.00 | 0.963 | 1.04 | 0.916 | 0.967 | 1.37 |
| Aspiration | 0.931 | 1.14 | 1.00 | 1.08 | 0.951 | 0.983 | 1.43 |
| Combination therapy | 0.864 | 0.964 | 0.929 | 1.00 | 0.883 | 0.913 | 1.33 |
| Stent-triever | 0.979 | 1.09 | 1.05 | 1.13 | 1.00 | 1.03 | 1.50 |
| Mechanical thrombectomy | 0.947 | 1.06 | 1.02 | 1.10 | 0.967 | 1.00 | 1.45 |
| Unknown MT | 0.652 | 0.728 | 0.701 | 0.755 | 0.666 | 0.689 | 1.00 |

4904
cell

FIG. 49

SYSTEMS AND METHODS FOR PERFORMING AND VISUALIZING SEMI-AUTOMATED SYSTEMATIC REVIEWS, ONTOLOGICAL HIERARCHIES, AND NETWORK META-ANALYSIS

CROSS-REFERENCE TO RELATED APPLICATIONS

The entire contents of the following application are incorporated by reference herein: U.S. Provisional Patent Application No. 63/385,607; filed Nov. 30, 2022; and entitled SYSTEMS AND METHODS FOR PERFORMING AND VISUALIZING SEMI-AUTOMATED SYSTEMATIC REVIEWS, ONTOLOGICAL HIERARCHIES, AND NETWORK META-ANALYSIS.

BACKGROUND

Technical Field

The present disclosure relates to software for the purposes of searching published media. Specifically, the present disclosure relates to automated systematic reviews, ontological hierarchies, and network meta-analysis.

Description of Related Art

In the early days of systematic reviews, researchers relied on manual and paper-based methods for literature searching and screening. The introduction of early systematic review software, notably designed by organizations like the Cochrane Collaboration, marked a shift toward more structured and streamlined review processes. These tools aim to assist researchers in data extraction and analysis. Over time, a range of software has emerged to meet the growing demand for systematic reviews, offering features such as reference management and collaboration. The evolution of systematic review software has continued, with ongoing improvements focusing on enhancing collaboration, automation, and customization of the review process. Today, these tools play a crucial role in facilitating efficient evidence synthesis and meta-analysis for researchers across various fields.

SUMMARY

Included in the present disclosure is a system (e.g., the system 3100*a* as seen in FIG. 31A), including an electronic document (e.g., the electronic document 10 as seen in FIG. 1). In some examples, the electronic document includes a work of authorship (e.g., the work of authorship 102 as seen in FIG. 1). According to some examples, the electronic document includes a topic of the work (e.g. the topic 104 as seen in FIG. 1). The electronic document can include a topic tag (e.g., the topic tag 106 as seen in FIG. 1) configured to identify the topic. In some examples, the system includes a tag generator (e.g., the tag generator 3102 as seen in FIG. 31A) configured to identify a portion of the work of authorship related to the topic tag using a large language model (e.g., the large language model 3104 as seen in FIG. 31A).

According to some examples, the topic is a main topic (e.g., the main topic 202 as seen in FIG. 2) and the topic tag is a main topic tag (e.g., the main topic tag 206 as seen in FIG. 2) configured to identify the main topic. The electronic document can further include a subtopic (e.g., the subtopic 204 as seen in FIG. 2) of the main topic. In some examples, the electronic document further includes a subtopic tag (e.g., the subtopic tag 208 as seen in FIG. 2) configured to identify the subtopic. According to some examples, the tag generator is configured to generate the subtopic tag using the chatbot.

The system can further include a sunburst diagram generator (e.g., the sunburst diagram generator 4104 as seen in FIG. 41A) configured to generate a sunburst diagram (e.g., the sunburst diagram 4202 as seen in FIG. 42) renderable on a graphical user interface (GUI). In some examples, the sunburst diagram depicts a hierarchy including a graphical representation of a hierarchical relationship between the main topic tag and the subtopic tag. The topic tag can include metadata that explains or is associated with the topic.

In some examples, the electronic document is a first electronic document (e.g., the first electronic document 10*a* as seen in FIG. 3A). According to some examples, the first electronic document further includes a first set of bibliographic data. The system can further include a second electronic document (e.g., the second electronic document 10*b* as seen in FIG. 3A), including a second set of bibliographic data. In some examples, the system further includes a comparison module (e.g., the comparison module 702 as seen in FIG. 7A), configured to match the first electronic document and the second electronic document when the first set of bibliographic data and the second set of bibliographic data are the same.

According to some examples, the electronic document further includes a set of bibliographic data and a reference identification (RefID). The system can further include an inspection module (e.g., the inspection module 3706 as seen in FIG. 37) configured to populate the RefID based on the set of bibliographic data. In some examples, the topic tag includes a data element including a statistic.

Also included in the present disclosure is a system including a tangible form of expression. In some examples, the tangible form of expression includes a topic of the tangible form of expression. According to some examples, the tangible form of expression includes a topic tag configured to identify the topic. The system can include a tag generator configured to generate the topic tag using a large language model.

Also included in the present disclosure is a system including an electronic document. In some examples, the electronic document includes a tangible form of expression. According to some examples, the electronic document includes a main topic of the tangible form of expression. The electronic document can include a subtopic of the main topic. In some examples, the electronic document includes a main topic tag configured to identify the main topic. According to some examples, the electronic document includes a subtopic tag configured to identify the subtopic. The system can include a tag generator configured to generate each of the main topic tag and the subtopic tag using a large language model.

The foregoing, and other features and advantages of the invention, will be apparent from the following, more particular description of the preferred embodiments of the invention, the accompanying drawings, and the claims.

BRIEF DESCRIPTION OF THE DRAWINGS

These and other features, aspects, and advantages are described below with reference to the drawings, which are intended to illustrate, but not to limit, the invention. In the drawings, like characters denote corresponding features consistently throughout similar embodiments.

FIG. 49 illustrates a graphical representation of a matrix diagram, in accordance with some examples of the present disclosure.

COMPONENT INDEX

Figure 1:
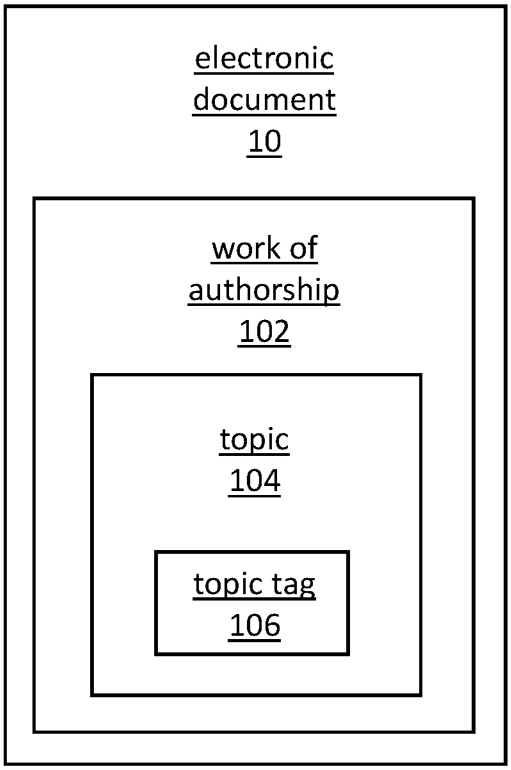
FIGS. 1 to 4B illustrate block diagrams of example aspects of example computing systems, in accordance with some examples of the present disclosure.

10—Electronic document
10*a*—First electronic document
10*b*—Second electronic document
20—Electronic document
20*a*—First electronic document
20*b*—Second electronic document
30*a*—Project
30*b*—Project
102—Work of authorship
104—Topic
106—Topic tag
202—Main topic
204—Subtopic
206—Main topic tag
208—Subtopic tag
400*a*—System
400*b*—System
402—Search engine
404—Search bar
502, 504, 506, and 508—Method steps
602, 604, 606, 608, 610, 612, and 614—Method steps
700*a*—System
700*b*—System
702—Comparison module
802, 804, 806, 808, 810, 812, and 814—Method steps
902, 904, 906, 908, 910, and 912—Method steps
1002, 1004, and 1006—Method steps
1100*a*—System
1100*b*—System
1102—Text extractor
1202—Method step
1300*a*—System
1300*b*—System
1302—Statistical model
1402, 1404, 1406, 1408, 1410, and 1412—Method steps
1502, 1504, 1506, 1508, and 1510—Method steps
1602, 1604, 1606, and 1608—Method steps
1702 and 1704—Method steps
1800*a*—System
1800*b*—System

1802—Oversight module
1902, 1904, 1906, 1908, and 1910—Method steps
2002, 2004, 2006, and 2008—Method steps
2102, 2104, 2106, 2108, 2110, and 2112—Method steps
2202, 2204, 2206, 2208, 2210, and 2212—Method steps
2302—Actions over time diagram
2304—Time
2306—Number of actions
2402—Study flow diagram
2404—Action type
2406—Number of actions
2502, 2504, 2506, 2508, 2510, 2512, 2514, and 2516—Method steps
2602, 2604, 2606, 2608, and 2610—Method steps
2702, 2704, 2706, 2708, 2710, 2712, and 2714—Method steps
2802, 2804, 2806, 2808, 2810, 2812, and 2814—Method steps
2902, 2904, 2906, 2908, 2910, 2912, 2914, 2916, and 2918—Method steps
3002, 3004, 3006, 3008, 3010, 3012, 3014, 3016, and 2018—Method steps
3100*a*—System
3100*b*—System
3102—Tag generator
3104—Large language model
3202, 3204, 3206, and 3208—Method steps
3302, 3304, 3306, 3308, 3310, and 3312—Method steps
3402, 3404, 3406, and 3408—Method steps
3502, 3504, 3506, 3508, 3510, and 3512—Method steps
3602, 3604, 3606, 3608, 3610, 3612, and 3614—Method steps
3700—System
3702—First project
3704—Second project
3706—Inspection module
3802, 3804, 3806, 3808, and 3810—Method steps
3902, 3904, 3906, 3908, 3910, 3912, and 3914—Method steps
4002, 4004, 4006, 4008, 4010, 4012, and 4014—Method steps
4100*a*—System
4100*b*—System
4102—Hierarchical diagram generator
4104—Sunburst diagram generator
4106—Tree diagram generator
4202—Sunburst diagram
4204—Main topic node
4206—Subtopic node
4208—Sub subtopic node
4302—Tree diagram
4304—Main topic node
4306—Subtopic node
4308—Sub subtopic node
4402*a*, 4402*b*, 4404, 4406, 4408, 4410, 4412, 4414, 4416, and 4418—Method steps
4502, 4504, 4506, 4508, 4510, and 4512—Method steps
4600*a*—System
4600*b*—System
4602—Quantitative synthesis module
4702—Drop-down menu
4704—Data density bar
4802—Line diagram
4804—Node
4806—Line
4902—Matrix diagram
4904—Cell
5002—Forest plot
5004—Square
5006—Bar
5102—Surface under the cumulative ranking curve (SUCRA) diagram
5202—Funnel plot
5204—Node
5302—Domain distribution diagram
5304—Bar
5402—Traffic light diagram
5404—Node
5502—Preferred reporting items for systematic reviews and meta-analyses (PRISMA) diagram
5602, 5604, 5606, 5608, 5610, 5612, 5614, and 5616—Method steps
5702, 5704, 5706, 5708, 5710, 5712, 5714, and 5716—Method steps
5802, 5804, 5806, 5808, 5810, 5812, 5814, and 5816—Method steps
5902, 5904, and 5906—Method steps
6002 and 6004—Method steps
6102, 6104, 6106, and 6108—Method steps
6202, 6204, 6206, 6208, 6210, 6212, 6214, and 6216—Method steps
6302, 6304, 6306, 6308, 6310, and 6312—Method steps
6402, 6404, 6406, 6408, 6410, 6412, 6414, 6416, 6418, 6420, and 6422—Method steps
6502, 6504, 6506, 6508, 6510, 6512, and 6514—Method steps
6602—Dashboard
6604—Card
6606—Height
6608—Width

DETAILED DESCRIPTION

In the field of gathering evidence from clinical literature from clinical sources, there is a need to extract, analyze, and provide visuals to communicate the results. Generally, the results are provided in the form of comma-separated values (CSVs) or Excel documents, through qualitative written portable document formats (PDFs), or a combination of spreadsheets and written outputs. There is also a need in this field of technology to use hierarchical tagging to extract and present the information from the relevant references, let alone concept hierarchies that have inherent interactivity and allow a user to drill deeper into concepts or tags. The present disclosure serves, in part, to fulfill these needs in this field of technology.

Additionally, in this field of technology, there exists a need for a dynamic network meta-analysis package, allowing for live changing of comparisons and plot generation. Within this field, network meta-analysis is generally outsourced to external packages, such as the R package "Meta." However, these packages also provide static outputs from network meta-analysis (NMA) one variable at a time, so there is no capability to manipulate different arms being compared or see multiple NMA analyses completed in tandem. This disclosure provides a no-code, dynamic solution to perform network meta-analysis on different arms or different data elements without having to individually run each comparison. By proxy, this also means that this disclosure provides visuals, including interactive visuals, to display this dynamic network meta-analysis. Also, within the network meta-analysis, a user can toggle between fixed effect and random effects models. This toggling can permit a user to switch the type of estimate they are using to obtain a new estimate immediately.

Any or all of the block diagrams, flowcharts, and graphical user interface (GUI) descriptions depicted herein are understood to be capable of being practiced via a processor of a computing medium. This computing medium can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that computing medium. Further, any of the disclosure herein can be capable of being practiced via a non-transitory computer-readable media executable by a processor of any or all of the aforementioned computing mediums.

Throughout the present disclosure, multiple different components of a software are disclosed and described as being capable of performing certain functions. It is understood that a user can also perform these functions manually if desired, and the components of the software are capable of interacting with the results of these user-created functions.

FIG. 1 illustrates a block diagram of an electronic document 10, according to some examples. In some examples, the electronic document 10 includes a work of authorship 102. The term work of authorship 102 is not intended to be limiting, and it is understood that the work of authorship 102 can be any tangible form of expression. Additionally, the work of authorship 102, or tangible form of expression, can serve the same purpose as the electronic document 10 as a whole. Thus, it is understood that any use of electronic document 10 (or electronic document 20 as seen and described in FIG. 2), work of authorship 102, and/or tangible form of expression are not intended to be limiting and can be interchanged where it would make sense to do so. The work of authorship 102 can include a topic 104. In some examples, the topic 104 includes a topic tag 106 that is associated with the topic 104.

While FIG. 1 illustrates a work of authorship 102, it is understood that the electronic document 10 can include multiple works of authorship 102. Additionally, while the work of authorship 102 is shown including a topic 104, it is understood that the work of authorship 102 can include multiple topics 104. Finally, while the topic 104 is shown including a topic tag 106, it is understood that the topic 104 can include multiple topic tags 106.

Figure 2:
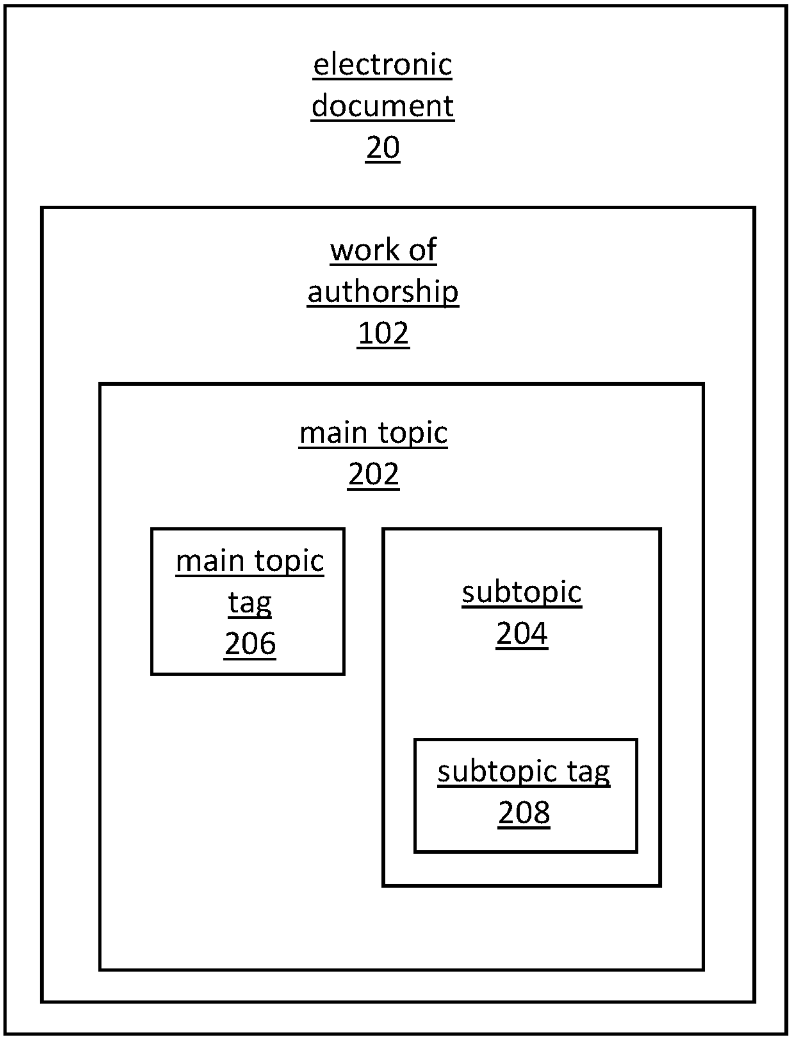

FIG. 2 illustrates a block diagram of another electronic document 20, according to some examples. The electronic document 20 can include a work of authorship 102. In some examples, the work of authorship 102 includes a main topic 202. According to some examples, the main topic 202 includes a subtopic 204, as well as a main topic tag 206 associated with the main topic 202. In some examples, the subtopic 204 is one of parts or divisions of the main topic 202. The subtopic 204 can include a subtopic tag 208 associated with the subtopic 204.

While FIG. 2 illustrates a work of authorship 102, it is understood that the electronic document 20 can include multiple works of authorship 102. Additionally, while the work of authorship 102 is shown including a main topic 202, it is understood that the work of authorship 102 can include multiple main topics 202. Furthermore, while the main topic 202 is shown including a main topic tag 206 associated with the main topic 202, it is understood that the main topic 202 can include multiple main topic tags 206. Also, while the main topic 202 is shown including a subtopic 204, it is understood that the main topic 202 can include multiple subtopics 204. Finally, while the subtopic 204 is shown including a subtopic tag 208 associated with the subtopic 204, it is understood that the subtopic 204 can include multiple subtopic tags 208.

Additionally, it is understood that in FIGS. 1 and 2, and throughout the present disclosure, the presence of electronic document 10 and electronic document 20 does not preempt one or the other, and these two types of electronic documents can be used together.

Figure 3A:
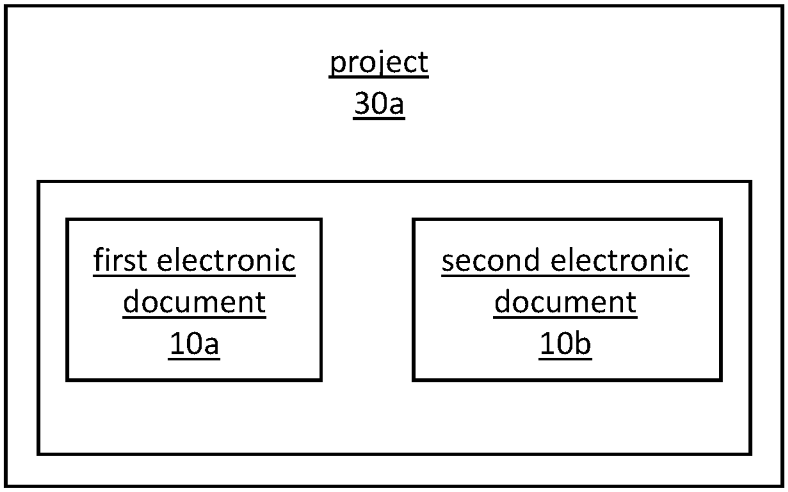

FIG. 3A illustrates a block diagram of a project 30*a*, otherwise known as a nest. As seen in FIG. 3A, the project 30*a* can include a first electronic document 10*a* and a second electronic document 10*b*. The first electronic document 10*a* and the second electronic document 10*b* can be represented by the block diagram of the electronic document 10 as seen and described in FIG. 1.

While FIG. 3A shows a first electronic document 10*a* and a second electronic document 10*b*, it is understood that a project 30*a* can include an electronic document, as well as up to as many electronic documents as desired by a user.

Figure 3B:
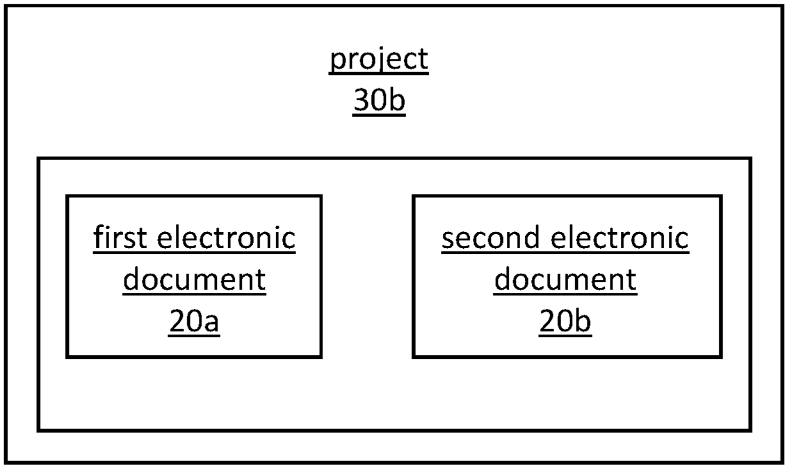

FIG. 3B illustrates a block diagram of a project 30*b*. As seen in FIG. 3B, the project 30*b* can include a first electronic document 20*a* and a second electronic document 20*b*. The first electronic document 20*a* and the second electronic document 20*b* can be represented by the block diagram of the electronic document 20 as seen and described in FIG. 2.

While FIG. 3B shows a first electronic document 20*a* and a second electronic document 20*b*, it is understood that a project 30*b* can include an electronic document, as well as up to as many electronic documents as desired by a user.

Additionally, it is understood that in FIGS. 3A and 3B, and throughout the present disclosure, the presence of project 30*a* and project 30*b* does not preempt one or the other, and these two types of projects can be used together.

Figure 4A:
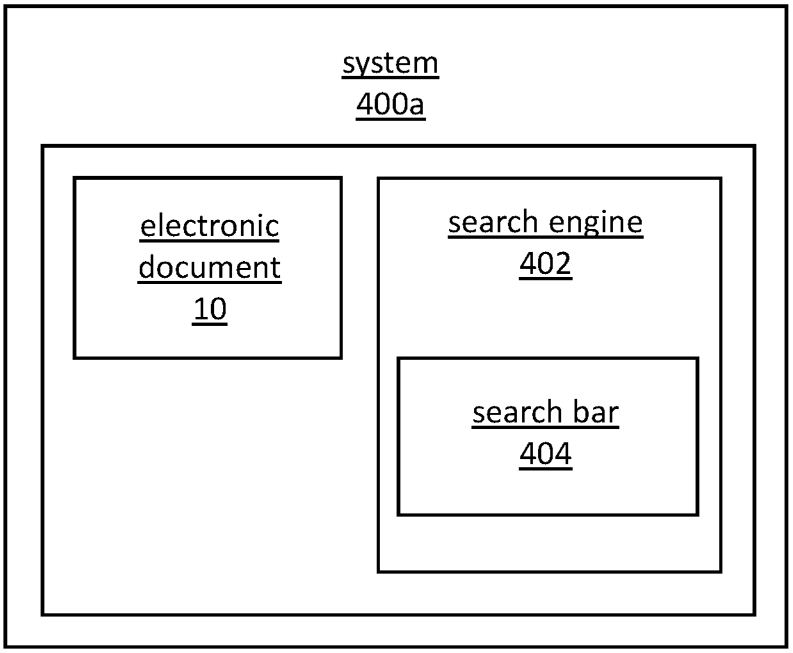

FIG. 4A illustrates a block diagram of a system 400*a*. In some examples, the system 400*a* includes an electronic document 10 as seen and described in FIG. 1. Additionally, the system 400*a* can include a search engine 402. According to some examples, the search engine 402 includes a search bar 404, permitting a user to interact with the search engine 402. While FIG. 4A shows an electronic document 10, it is understood that multiple electronic documents can be included in system 400*a*.

Figure 4B:
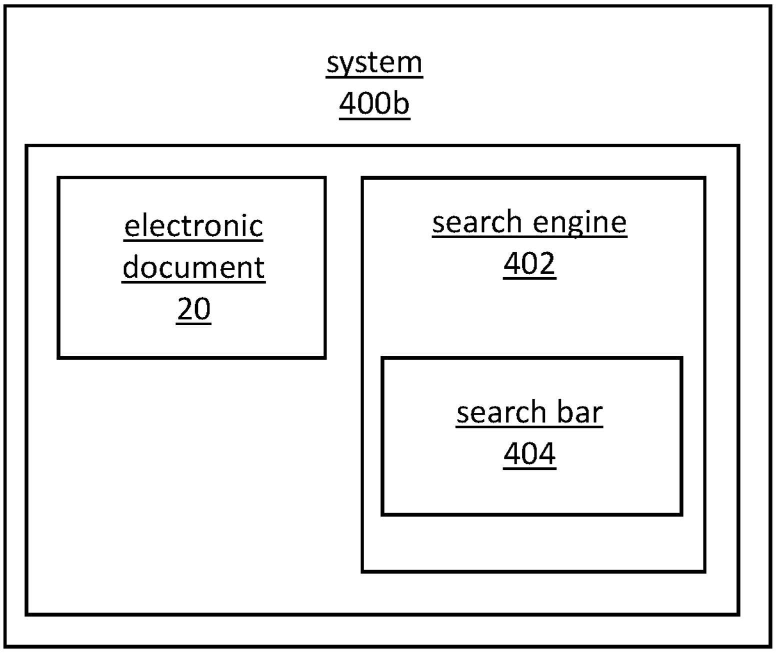

FIG. 4B illustrates a block diagram of a system 400*b*. According to some examples, the system 400*b* includes an electronic document 20 as seen and described in FIG. 2. The system 400*b* can also include a search engine 402. In some examples, the search engine 402 includes a search bar 404, permitting a user to interact with the search engine 402. While FIG. 4A shows an electronic document 20, it is understood that multiple electronic documents can be included in system 400*b*.

In addition, the software disclosed herein as well as the systems described in FIGS. 4A and 4B include compatibility and interactivity with several external search engines and indices, such as PubMed, ClinicalTrials.gov, the directory of Open Access Journal, Europe-PMC, etc. Additionally, any Research Information Systems (RIS), text (TXT), or MedLine tagged format (nBIB) file, as well as several other file types for bibliographic data, can be imported.

Figure 5:
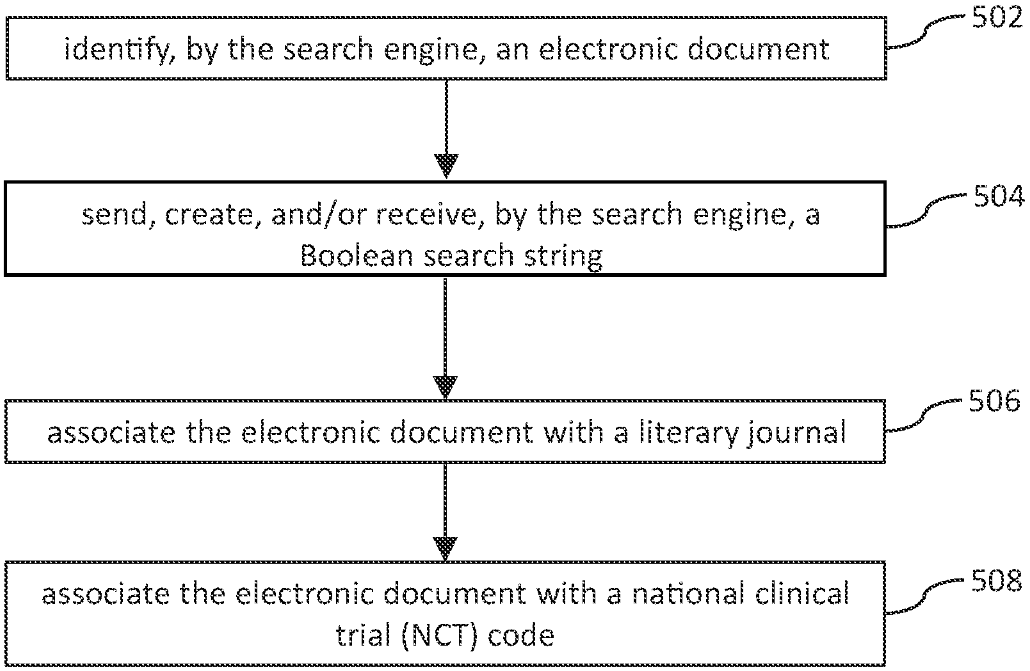
FIGS. 5 to 6B illustrate example methods, in accordance with some examples of the present disclosure.
Figure 6A:
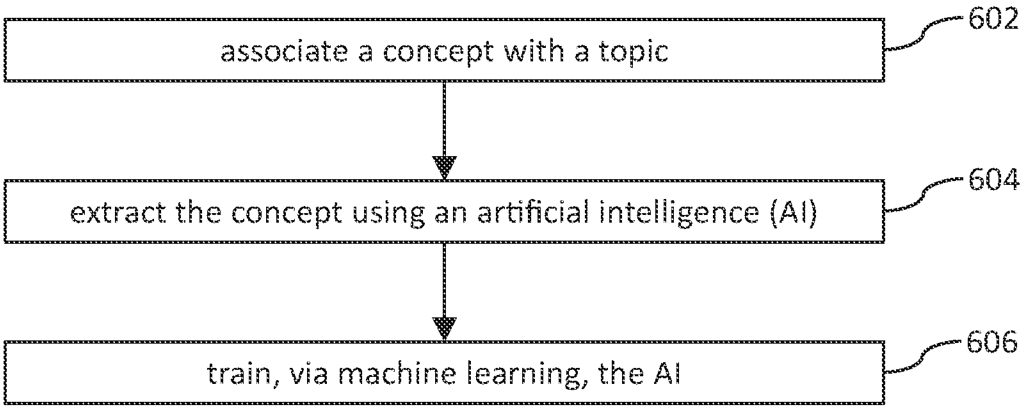
Figure 6B:
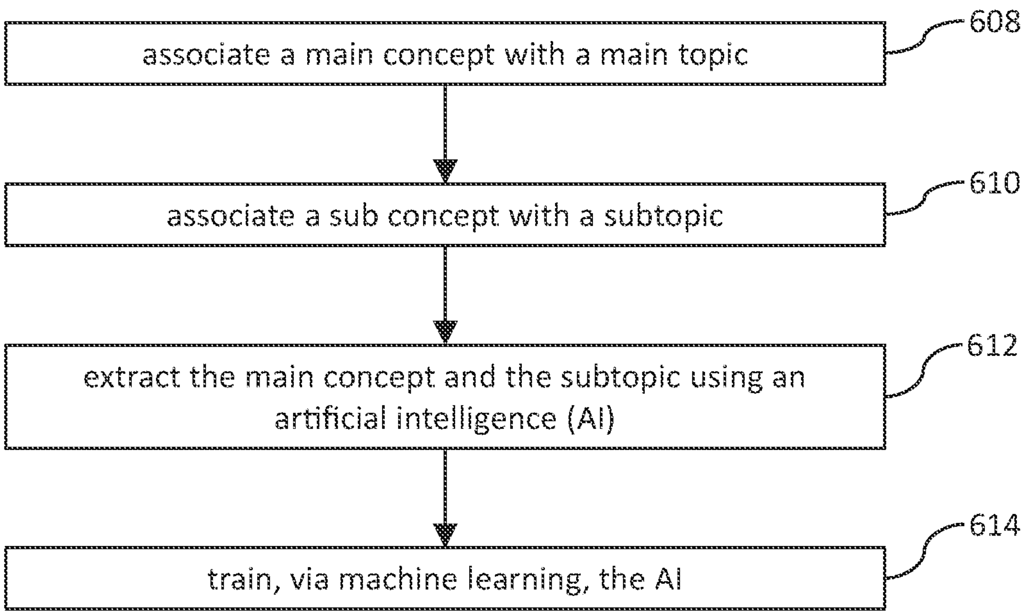

FIGS. 5-6B below describe some potential methods of using system 400*a* and/or system 400*b* as illustrated and described in FIGS. 4A and 4B.

FIG. 5 illustrates a flowchart depicting a method of obtaining electronic documents, according to some examples. The method can include identifying, by the search engine, an electronic document (at step 502). In some examples, the method includes sending, creating, and/or receiving, by the search engine, a Boolean search string (at step 504).

According to some examples, the method includes associating the electronic document with a literary journal (at step 506). The method can include associating the electronic document with a national clinical trial (NCT) code (at step 508).

FIG. 6A illustrates a flowchart depicting a method of using artificial intelligence (AI) to create tags, according to some examples. In some examples, the method includes associating a concept with a topic (at step 602). According to some examples, the method includes extracting the concept using an AI (at step 604). The method can include training, via machine learning, the AI (at step 606).

FIG. 6B illustrates a flowchart depicting another method of using AI to create tags, according to some examples. In some examples, the method includes associating a main concept with a main topic (at step 608). According to some examples, the method includes associating a sub-concept with a subtopic (at step 610).

The method can include extracting the main concept and the subtopic using an AI (at step 612). In some examples, the method includes training, via machine learning, the AI (at step 614).

Figure 7A:
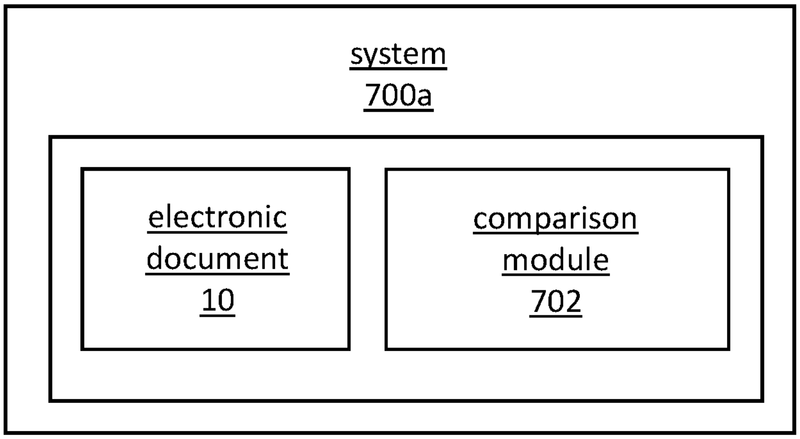
FIGS. 7A and 7B illustrate block diagrams of example aspects of example computing systems, in accordance with some examples of the present disclosure.

FIG. 7A illustrates a block diagram of a system 700*a*. In some examples, the system 700*a* includes an electronic document 10 as seen and described in FIG. 1. Additionally, the system 700*a* can include a comparison module 702, permitting the system 700*a* to compare information within electronic document 10 to information from a source external to electronic document 10. While FIG. 7A shows an electronic document 10, it is understood that multiple electronic documents can be included in system 700*a*.

Figure 7B:
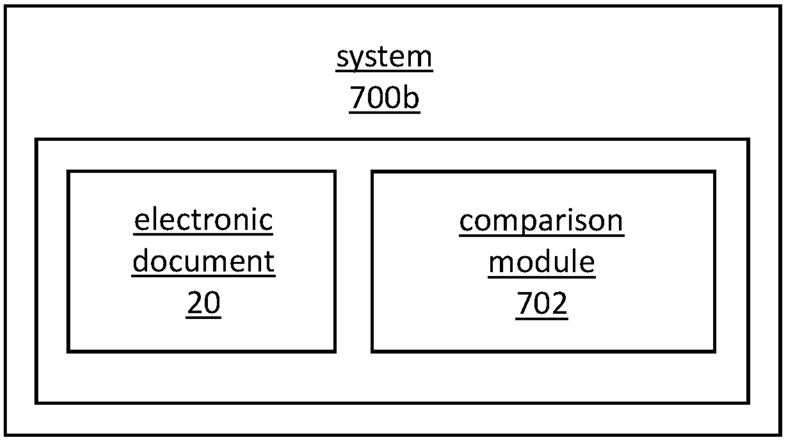

FIG. 7B illustrates a block diagram of a system 700*b*. According to some examples, the system 700*b* includes an electronic document 20 as seen and described in FIG. 2. The system 700*b* can also include a comparison module 702, permitting the system 700*b* to compare information within electronic document 20 to information from a source external to electronic document 20. While FIG. 7B shows a electronic document 20, it is understood that multiple electronic documents can be included in system 700*b*.

Figure 8:
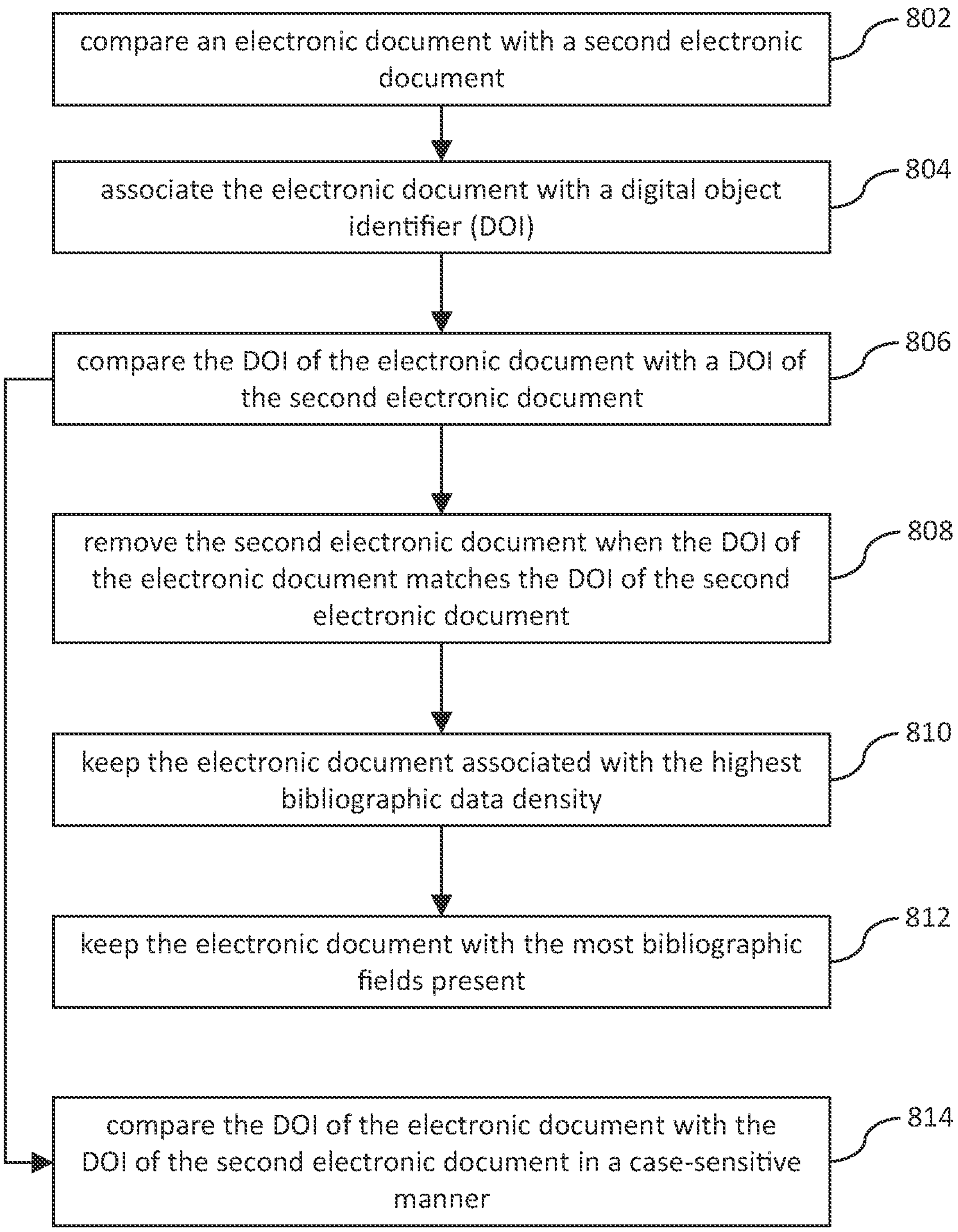
FIGS. 8 to 10 illustrate example methods, in accordance with some examples of the present disclosure.
Figure 9:
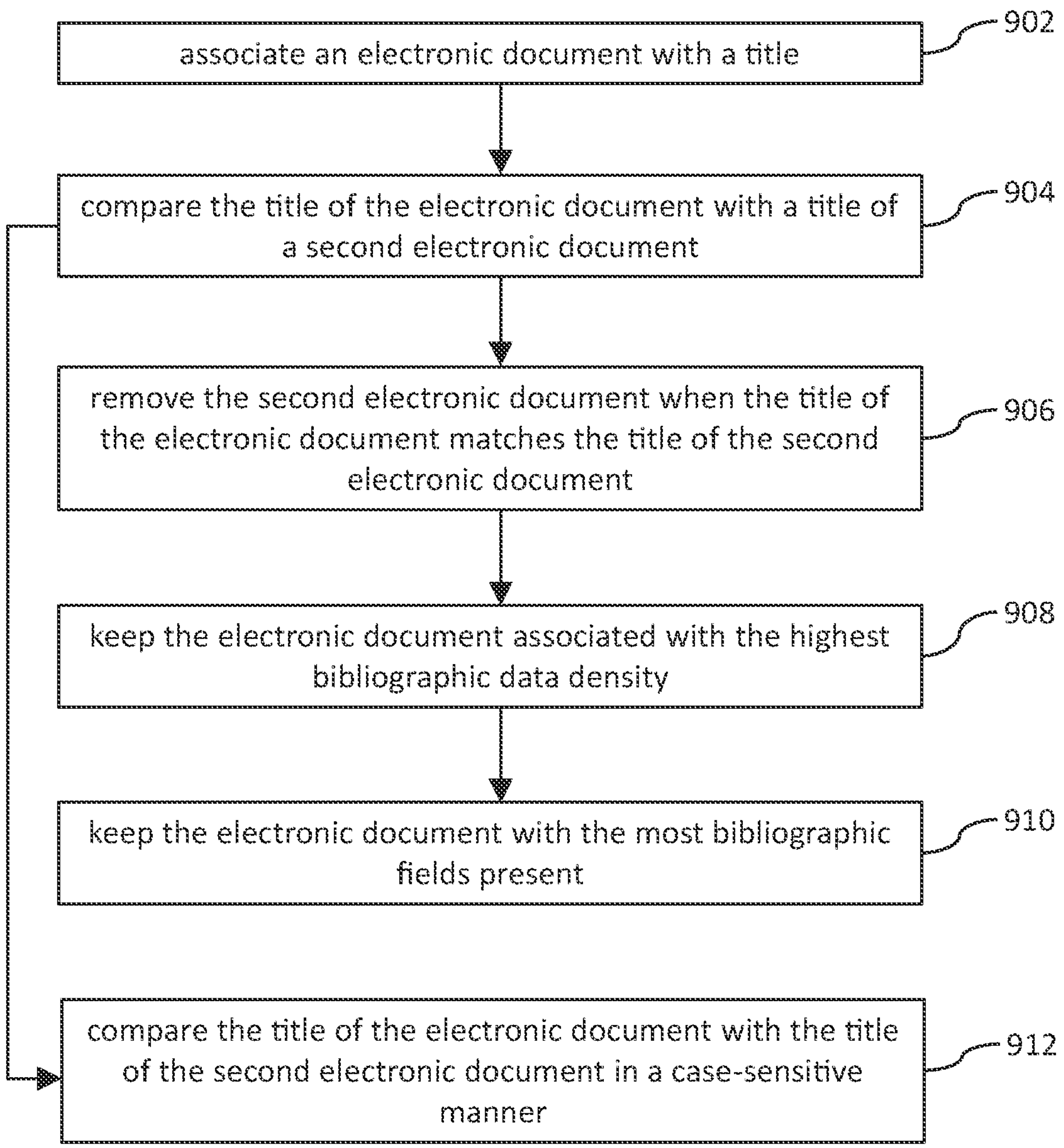
Figure 10:
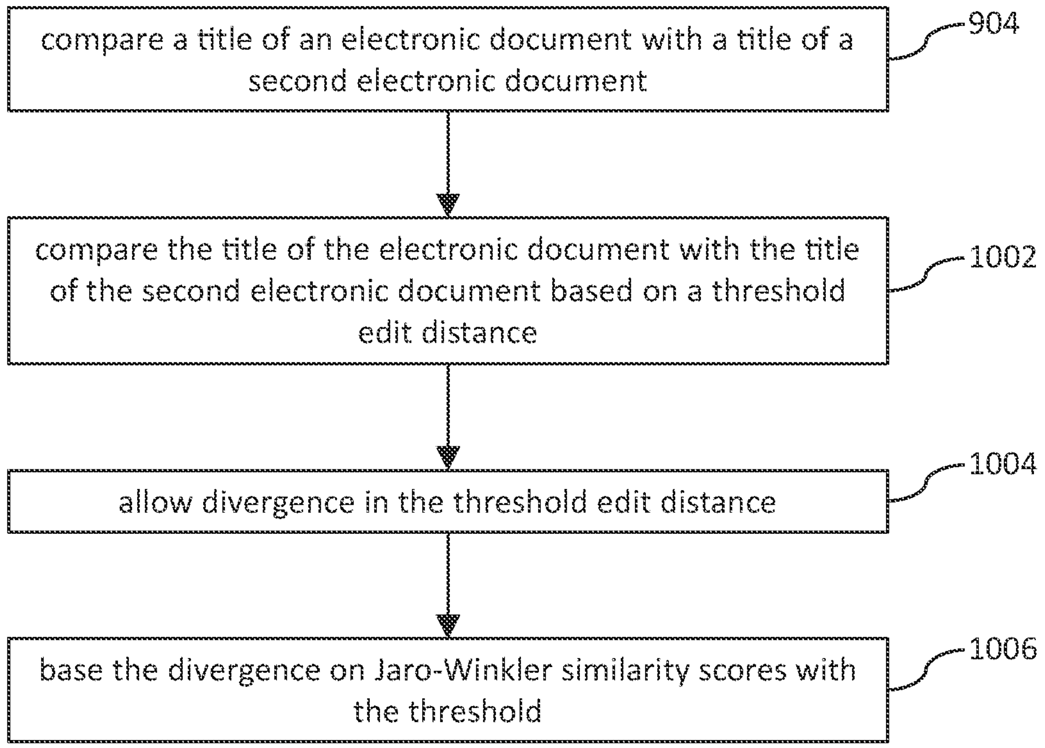

FIGS. 8-10 below describe some potential methods of using system 700*a* and/or system 700*b* as illustrated and described in FIGS. 7A and 7B.

FIG. 8 illustrates a flowchart depicting a method of comparing two electronic documents, according to some examples. The method can include comparing an electronic document with a second electronic document (at step 802). In some examples, the method includes associating the electronic document with a digital object identifier (DOI) (at step 804).

According to some examples, the method includes comparing the DOI of the electronic document with a DOI of the second electronic document (at step 806). The method can include removing the second electronic document when the DOI of the electronic document matches the DOI of the second electronic document (at step 808).

In some examples, the method includes keeping the electronic document associated with the highest bibliographic data density (at step 810). According to some examples, the method includes keeping the electronic document with the most bibliographic fields present (at step 812). The method can include comparing the DOI of the electronic document with the DOI of the second electronic document in a case-sensitive manner (at step 814).

FIG. 9 illustrates a flowchart depicting another method of comparing two electronic documents, according to some examples. In some examples, the method includes associating an electronic document with a title (at step 902). According to some examples, the method includes comparing the title of the electronic document with a title of a second electronic document (at step 904).

The method can include removing the second electronic document when the title of the electronic document matches the title of the second electronic document (at step 906). In some examples, the method includes keeping the electronic document associated with the highest bibliographic data density (at step 908).

The method can include keeping the electronic document with the most bibliographic fields present (at step 910). In some examples, the method includes comparing the title of the electronic document with the title of the second electronic document in a case-sensitive manner (at step 912).

FIG. 10 illustrates a flowchart depicting a method of permitting divergence in similarities between two electronic documents, according to some examples. The method can include comparing a title of an electronic document with a title of a second electronic document (as seen in step 904 in FIG. 9 above). In some examples, the method includes comparing the title of the electronic document with the title of the second electronic document based on a threshold edit distance (at step 1002).

According to some examples, the method includes allowing divergence in the threshold edit distance (at step 1004). The method can include basing the divergence on Jaro-Winkler similarity scored with the threshold (at step 1006).

Figure 11A:
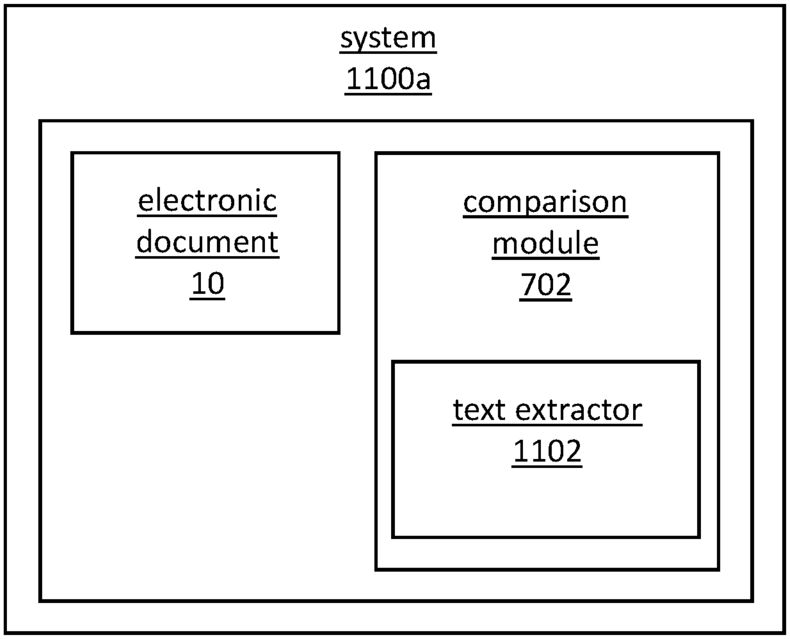
FIGS. 11A and 11B illustrate block diagrams of example aspects of example computing systems, in accordance with some examples of the present disclosure.

FIG. 11A illustrates a block diagram of a system 1100*a*. In some examples, the system 1100*a* includes an electronic document 10 as seen and described in FIG. 1. Additionally, the system 1100*a* can include a comparison module 702 as seen and described in FIGS. 7A and 7B. The comparison module 702 can include a text extractor 1102 configured to extract information from the work of authorship 102 within the electronic document 10 in order to facilitate the comparison of information within electronic document 10 with information from a source external to electronic document 10. While FIG. 11A shows a electronic document 10, it is understood that multiple electronic documents can be included in system 1100*a*.

Figure 11B:
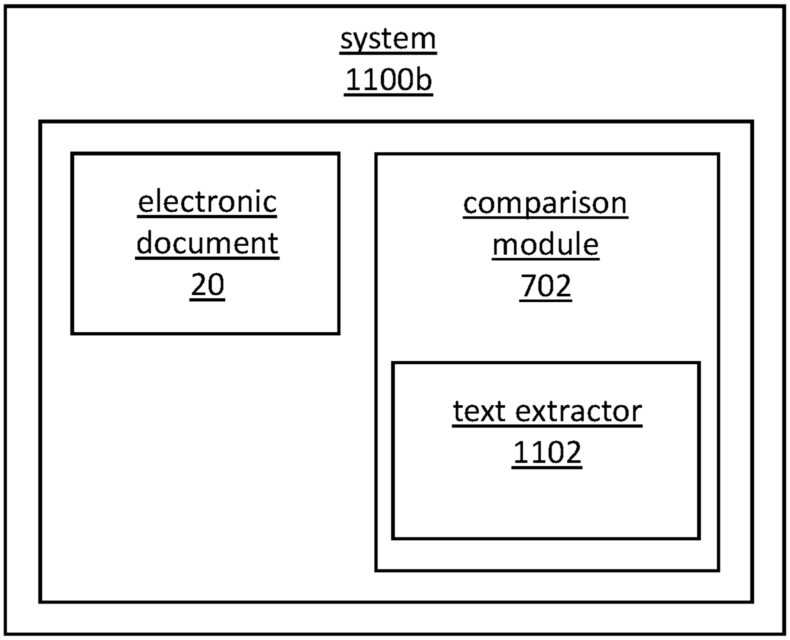

FIG. 11B illustrates a block diagram of a system 1100*b*. According to some examples, the system 1100*b* includes an electronic document 20 as seen and described in FIG. 2. The system 1100*b* can also include a comparison module 702 as seen and described in FIGS. 7A and 7B. The comparison module 702 can include a text extractor 1102 configured to extract information from the work of authorship 102 within the electronic document 20 in order to facilitate the comparison of information within electronic document 20 with information from a source external to electronic document 20. While FIG. 11B shows an electronic document 20, it is understood that multiple electronic documents can be included in system 1100*b*.

Figure 12:
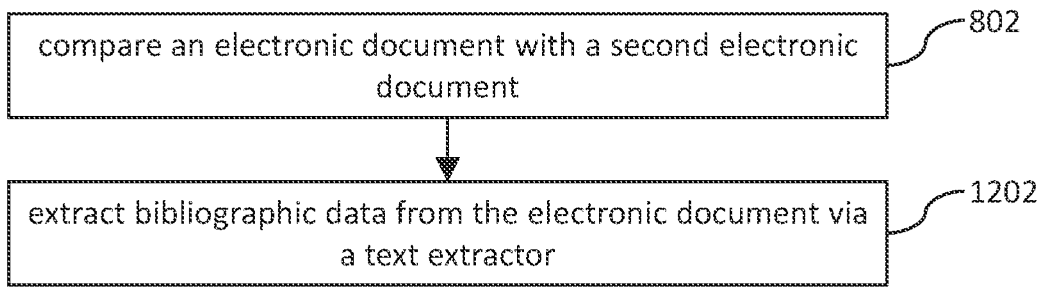
FIG. 12 illustrates an example method, in accordance with some examples of the present disclosure.

FIG. 12 below describes a potential method of using system 1100*a* and/or system 1100*b* as illustrated and described in FIGS. 11A and 11B.

FIG. 12 illustrates a flowchart depicting a method of data extraction, according to some examples. In some examples, the method includes comparing an electronic document with a second electronic document (as seen in step 802 in FIG. 8 above). According to some examples, the method includes extracting bibliographic data from the electronic document via a text extractor (at step 1202).

Figure 13A:
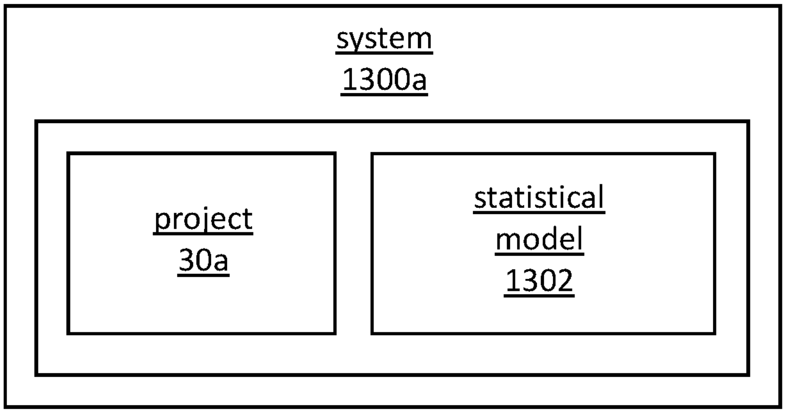
FIGS. 13A and 13B illustrate block diagrams of example aspects of example computing systems, in accordance with some examples of the present disclosure.

FIG. 13A illustrates a block diagram of a system 1300*a*. In some examples, the system 1300*a* includes an electronic document 10 as seen and described in FIG. 1. Additionally, the system 1300*a* can include a statistical model 1302 configured to determine inclusion and exclusion probabilities of topics 104 and topic tags 106 within a work of authorship 102 in order to assist a user of a project. While FIG. 13A shows an electronic document 10, it is understood that multiple electronic documents can be included in system 1300*a*.

Figure 13B:
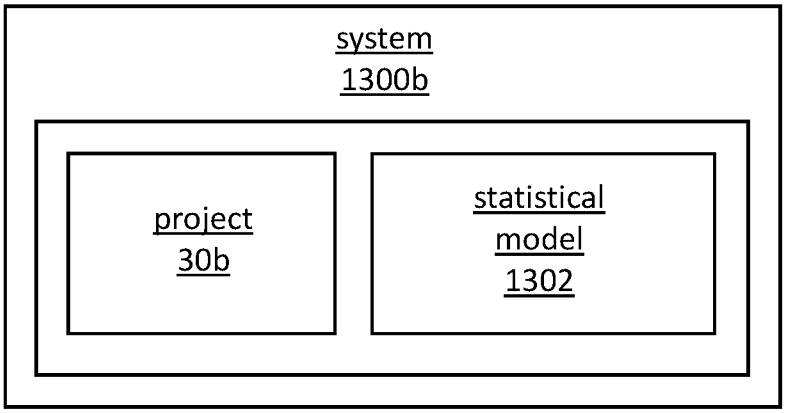

FIG. 13B illustrates a block diagram of a system 1300*b*. According to some examples, the system 1300*b* includes an electronic document 20 as seen and described in FIG. 2. The system 1300*b* can also include a statistical model 1302 configured to determine inclusion and exclusion probabilities of main topics 202, subtopics 204, main topics tags 206, and subtopic tags 208 within a work of authorship 102 in order to assist a user of a project. While FIG. 13B shows an electronic document 20, it is understood that multiple electronic documents can be included in system 1300*b*.

FIGS. 14-17 below describe potential methods of using systems 1300*a* and/or 1300*b* as illustrated and described in FIGS. 13A and 13B.

Figure 14:
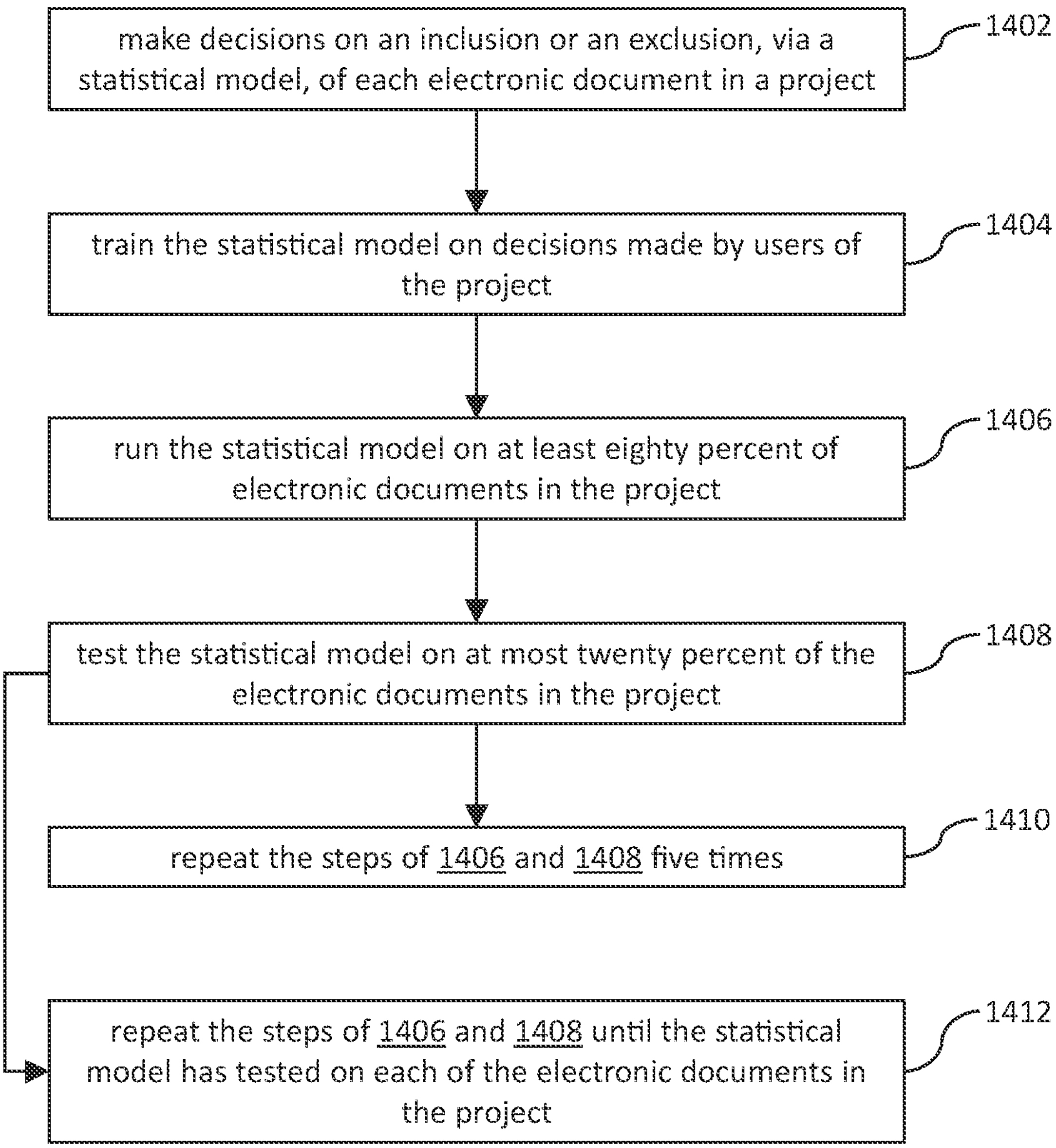
FIGS. 14 to 17 illustrate example methods, in accordance with some examples of the present disclosure.

FIG. 14 illustrates a flowchart depicting a method of training a statistical model, according to some examples. The method can include making decisions on an inclusion or an exclusion, via a statistical model, of each electronic document in a project (at step 1402). In some examples, the method includes training the statistical model on decisions made by users of the project (at step 1404).

According to some examples, the statistical model and a user in the project can each decide whether or not to include or exclude each electronic document in the project. In the cases of disagreement, a third-party, known as an adjudicator, can decide whether to agree with the statistical model or the user. In additional examples, in cases where the statistical model and the user agree on an inclusion or exclusion of an electronic document in the project, the adjudicator can override the decision made by both the statistical model and the user.

According to some examples, the method includes running the statistical model on at least eighty percent of electronic documents in the project (at step 1406). The method can include testing the statistical model on at most twenty percent of the electronic documents in the project (at step 1408). It is understood that the percentages used herein are by example only, and any percentages can be used. It is likely, but not necessary, for the percentage electronic documents the statistical model is run on and the percentage the electronic documents the statistical model is tested on add up to approximately one hundred percent.

In some examples, the method includes repeating the steps of step 1406 and step 1408 five times (at step 1410). According to some examples, the method includes repeating the steps of step 1406 and step 1408 until the statistical model has tested on each of the electronic documents in the project (at step 1412).

Figure 15:
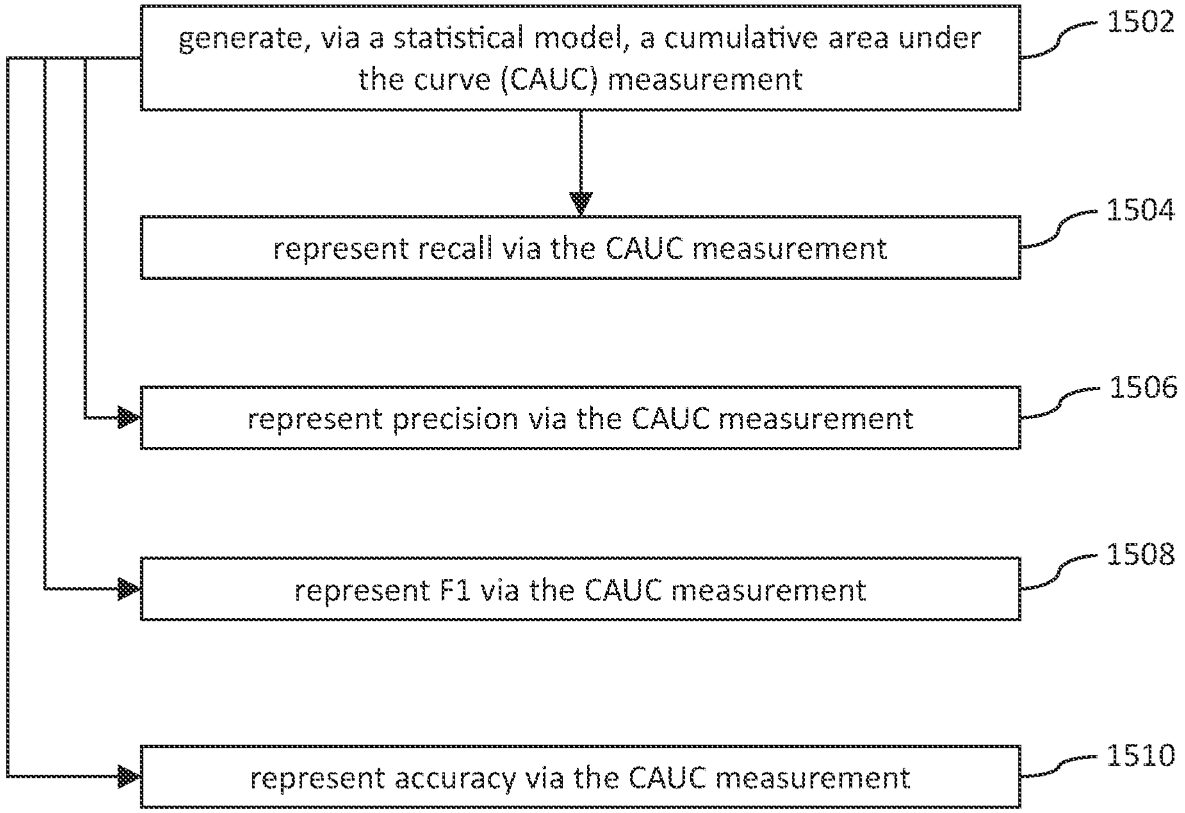

FIG. 15 illustrates a flowchart depicting a method of generating and displaying information via a cumulative area under the curve (CAUC) measurement. The method can include generating, via a statistical model, a CAUC measurement (at step 1502). In some examples, the method includes representing recall via the CAUC measurement (at step 1504).

According to some examples, the method includes representing precision via the CAUC measurement (at step 1506). The method can include representing FI via the CAUC measurement (at step 1508). In some examples, the method includes representing accuracy via the CAUC measurement (at step 1510).

Figure 16:
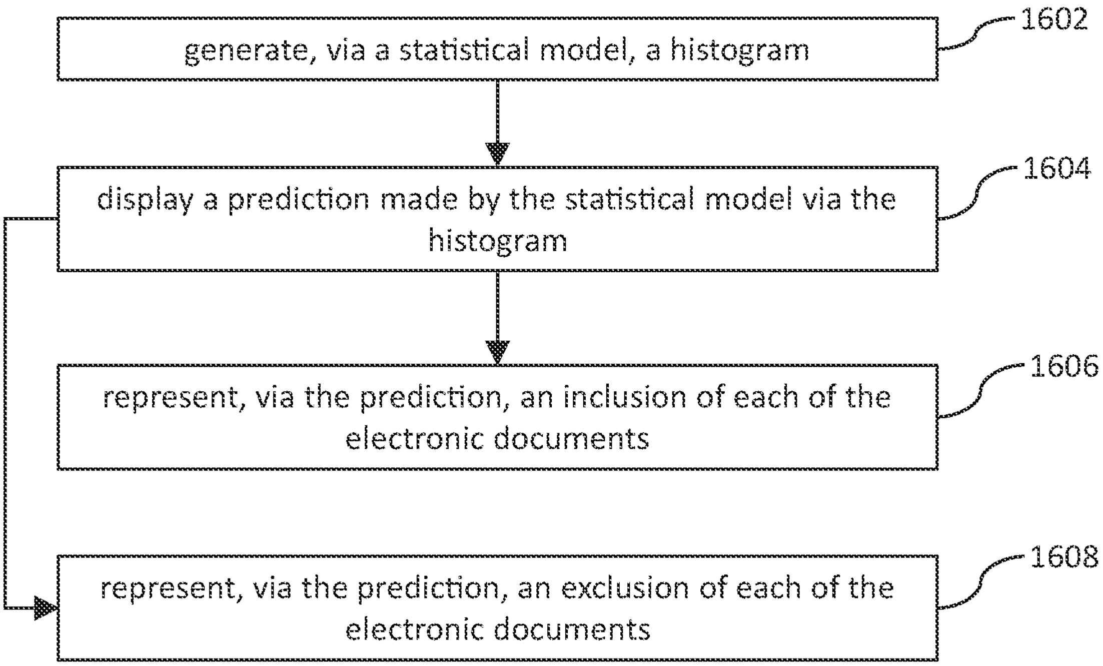

FIG. 16 illustrates a flowchart depicting a method generating and displaying information via a histogram, according to some examples. The method can include generating, via a statistical model, a histogram (at step 1602). In some examples, the method includes displaying a prediction made by the statistical model via the histogram (at step 1604). The histogram can show the score distribution, i.e., the likelihood of inclusion, individually across each electronic document that has been used to train models herein, as well as electronic documents that have yet to be assessed.

According to some examples, the method includes representing, via the prediction, an inclusion of each of the electronic documents (at step 1606). The method can include representing, via the prediction, an exclusion of each of the electronic documents (at step 1608).

Figure 17:
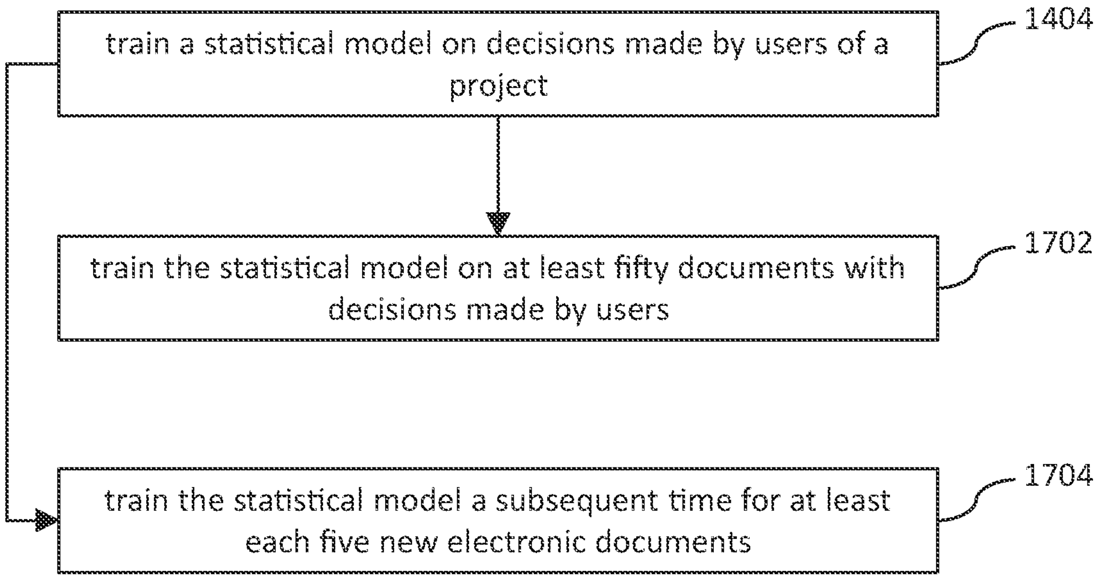

FIG. 17 illustrates a flowchart depicting a method of training a statistical model, according to some examples. In some examples, the method includes training a statistical model on decisions made by users of a project (as seen in step 1404 in FIG. 14 above). According to some examples, the method includes training the statistical model on at least fifty documents with decisions made by users (at step 1702). The method can include training the statistical model a subsequent time for at least each five new electronic documents (at step 1704). It is understood that the use of five new electronic documents is by example only, and the statistical model can be trained a subsequent time after the addition of any number of new electronic documents, as desired by the user.

Figure 18A:
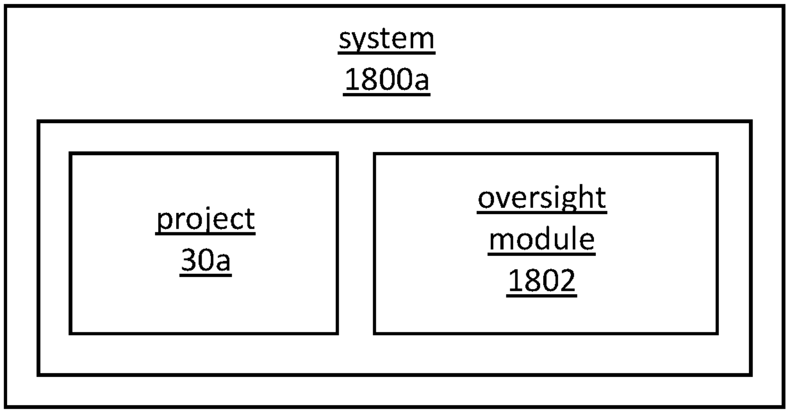
FIGS. 18A and 18B illustrate block diagrams of example aspects of example computing systems, in accordance with some examples of the present disclosure.
Figure 18B:
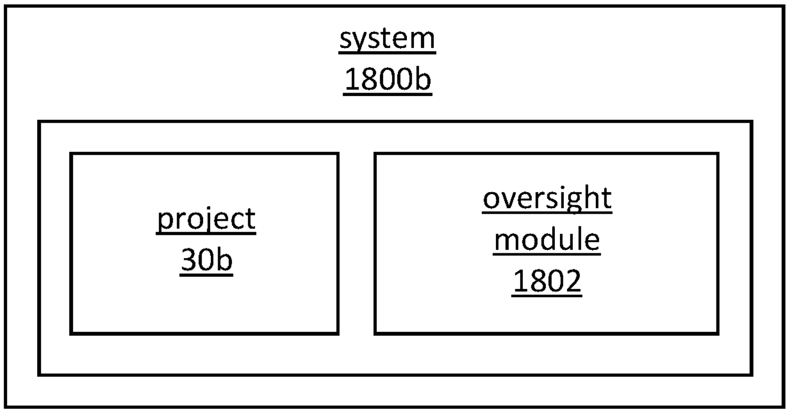

FIG. 18A illustrates a block diagram of a system 1800*a*. In some examples, the system 1800*a* includes a project 30*a* as seen and described in FIG. 3A. Additionally, the system 1800*a* can include an oversight module 1802 configured to oversee and give access to information regarding workflow and actions taken within the project 30*a*. While FIG. 18A shows a project 30*a*, it is understood that multiple projects can be included in system 1800*a*. FIG. 18B illustrates a block diagram of a system 1800*b*. According to some examples, the system 1800*b* includes a project 30*b* as seen and described in FIG. 3B. The system 1800*b* can also include an oversight module 1802 configured to oversee and give access to information regarding workflow and actions taken within the project 30*b*. While FIG. 18B shows a project 30*b*, it is understood that multiple projects can be included in system 1800*b*.

FIGS. 19-22 below describe potential methods of using systems 1800*a* and/or 1800*b* as illustrated and described in FIGS. 18A and 18B.

Figure 19:
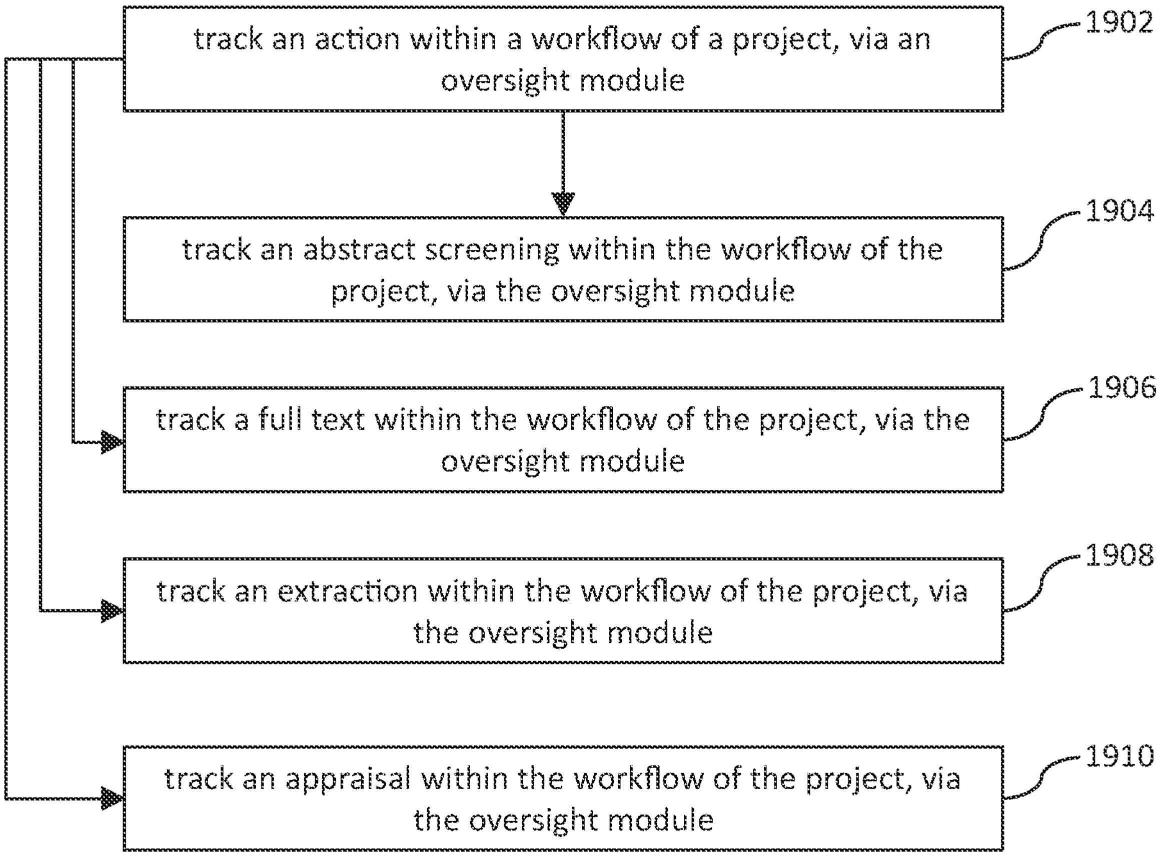
FIGS. 19 to 22 illustrate example methods, in accordance with some examples of the present disclosure.

FIG. 19 illustrates a flowchart depicting a method of tracking a workflow in a project, according to some examples. In some examples, the method includes tracking an action within a workflow of a project, via an oversight module (at step 1902). According to some examples, the method includes tracking an abstract screening within the workflow of the project, via the oversight module (at step 1904).

The method can include tracking a full text within the workflow of the project, via the oversight module (at step 1906). In some examples, the method includes tracking an extraction within the workflow of the project, via the oversight module (at step 1908). According to some examples, the method includes tracking an appraisal within the workflow of the project, via the oversight module (at step 1910).

Figure 20:
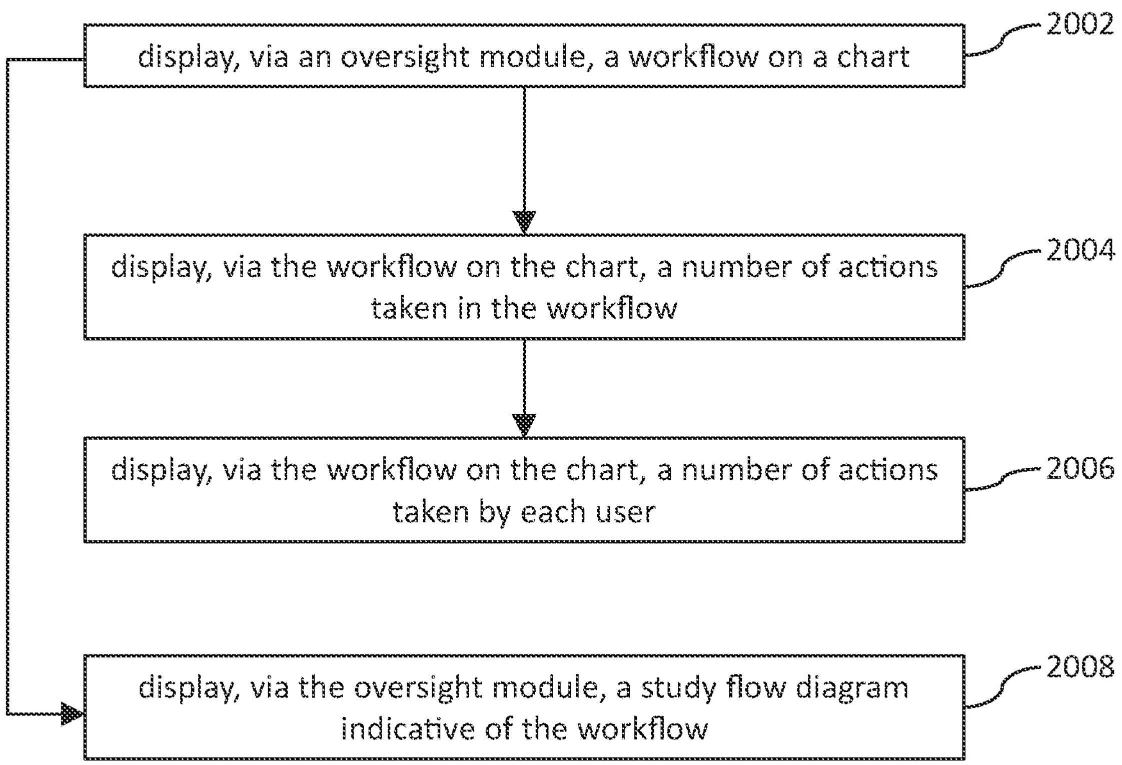

FIG. 20 illustrates a flowchart depicting a method of displaying information pertaining to a workflow, according to some examples. The method can include displaying, via an oversight module, a workflow on a chart (at step 2002). In some examples, the method includes displaying via the workflow on the chart, a number of actions taken in the workflow (at step 2004).

According to some examples, the method includes displaying, via the workflow on the chart, a number of actions taken by each user (at step 2006). The method can include displaying, via the oversight module, a study flow diagram indicative of the workflow (at step 2008).

Figure 21:
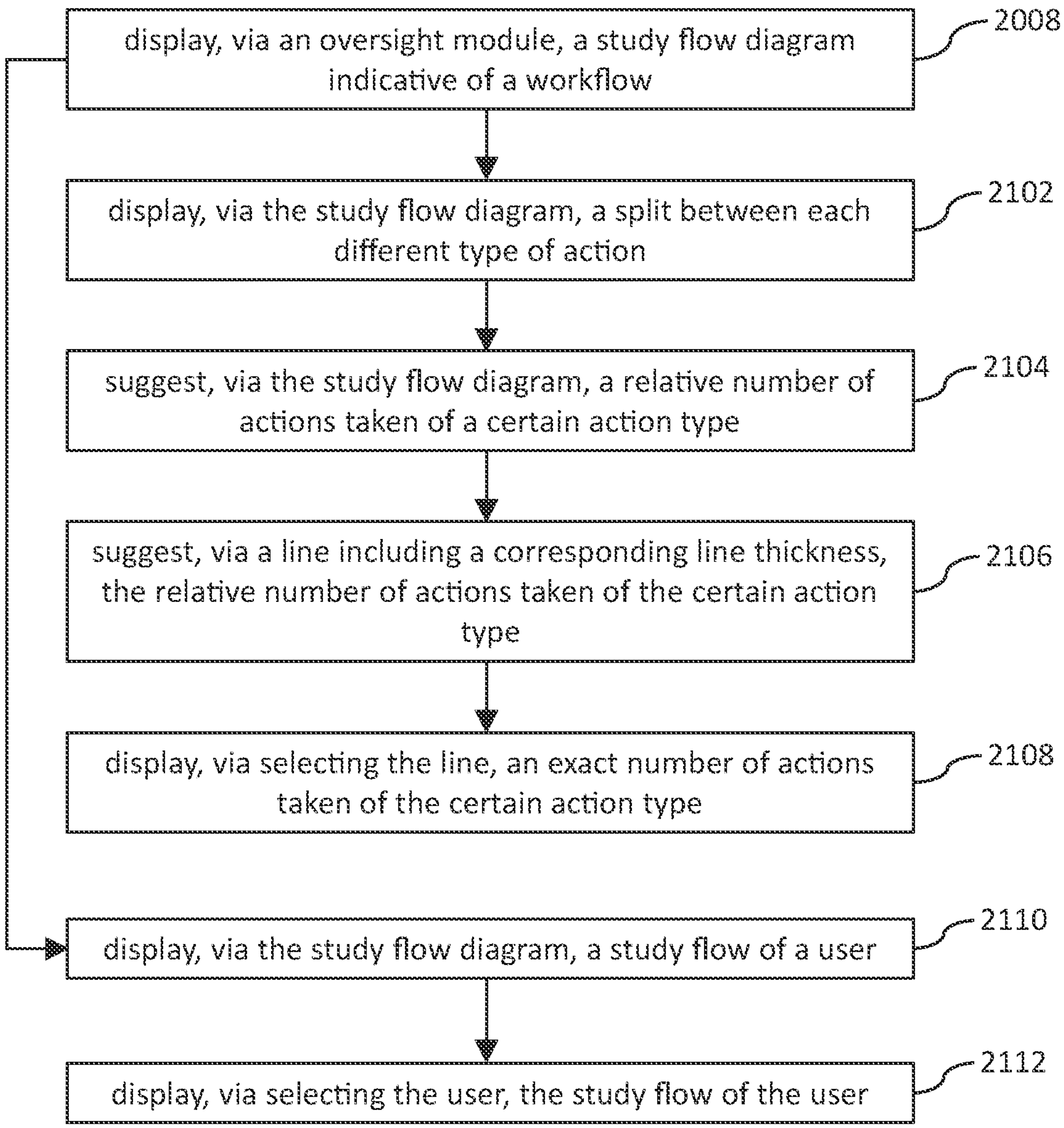

FIG. 21 illustrates a flowchart depicting another method of displaying information pertaining to a workflow, according to some examples. In some examples, the method includes displaying, via an oversight module, a study flow diagram indicative of a workflow (as seen in step 2008 in FIG. 20 above). According to some examples, the method includes displaying, via the study flow diagram, a split between each different type of action (at step 2102).

The method can include suggesting, via the study flow diagram, a relative number of actions taken of a certain action type (at step 2104). In some examples, the method includes suggesting, via a line including a corresponding line thickness, the relative number of actions taken of the certain action type (at step 2106).

According to some examples, the method includes displaying, via selecting the line, an exact number of actions taken of the certain action type (at step 2108). The method can include displaying, via the study flow diagram, a study flow of a user (at step 2110). In some examples, the method includes displaying, via selecting the user, the study flow of the user (at step 2112).

Figure 22:
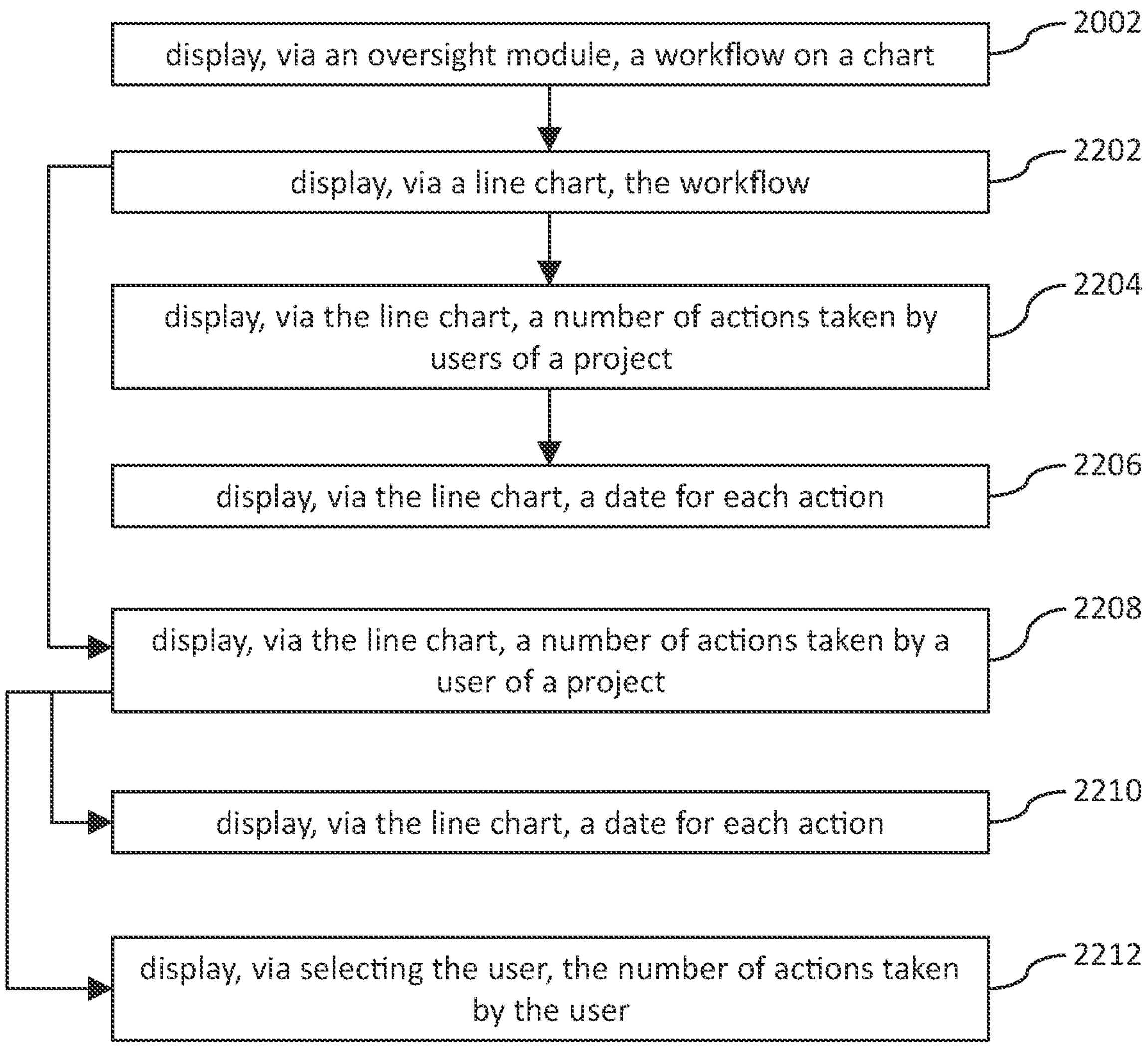

FIG. 22 illustrates a flowchart depicting another method of displaying information pertaining to a workflow, according to some examples. The method can include displaying, via an oversight module, a workflow on a chart (as seen in step 2002 in FIG. 20 above). In some examples, the method includes displaying, via a line chart, the workflow (at step 2202).

According to some examples, the method includes displaying, via the line chart, a number of actions taken by users of a project (at step 2204). The method can include displaying, via the line chart, a date for each action (at step 2206).

In some examples, the method includes displaying, via the line chart, a number of actions taken by a user of a project (at step 2208). According to some examples, the method includes displaying, via the line chart, a date for each action (at step 2210). The method can include displaying, via selecting the user, the number of actions taken by the user (at step 2212).

Figure 23:
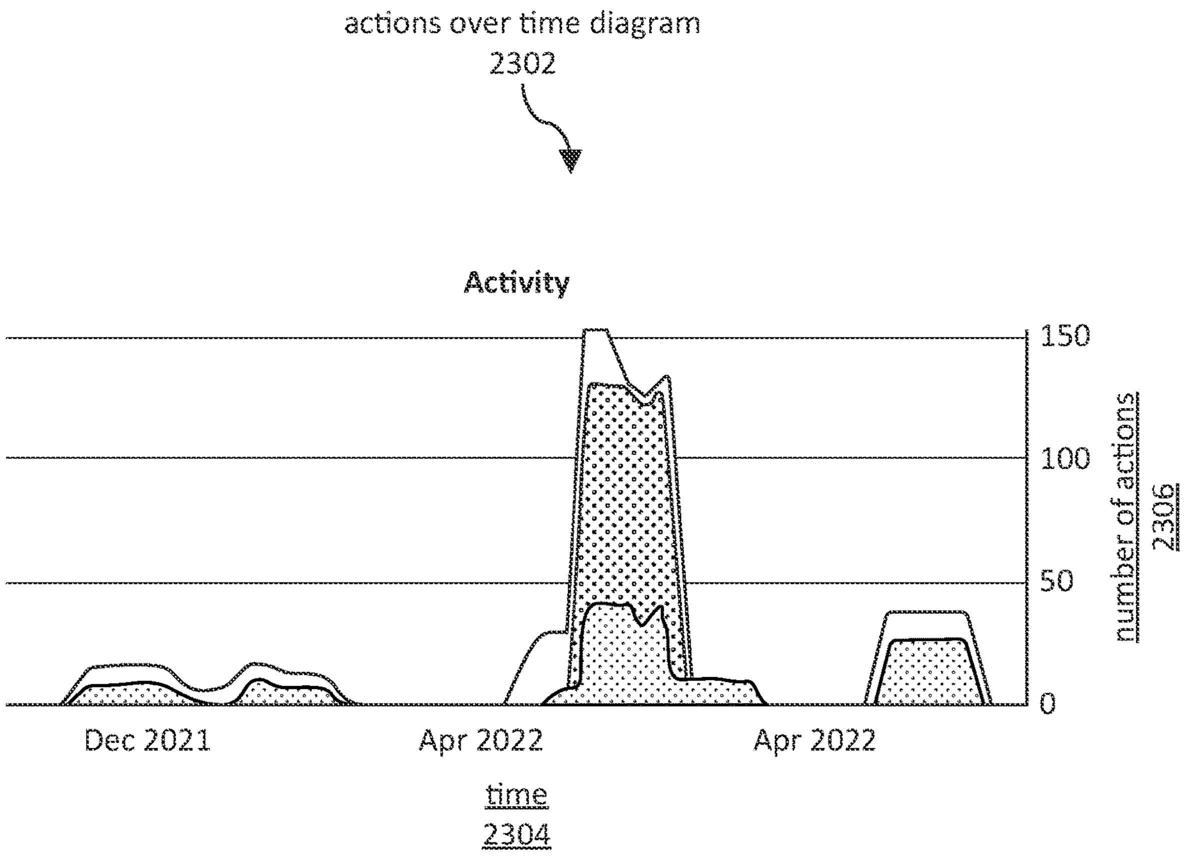
FIG. 23 illustrates a graphical representation of actions taken over time, in accordance with some examples of the present disclosure.

FIG. 23 illustrates a graphical representation of actions taken over time, according to some examples. This graphical representation can take the form of an actions over time diagram 2302. The actions over time diagram 2302 can appear in the form of a standard X-Y graph, where X is represented by time 2304, and Y is represented by number of actions 2306, though it is understood that these axes can be switched as desired.

Multiple different actions can be tracked over the actions over time diagram 2302, and displayed separately from each other through the use of color, shading, darkness levels, or differently stylized dashed lines. The actions that are tracked on the actions over time diagram 2302 can be any actions taken by a user, or automatically generated via another intelligence, such as a large language model, such as inclusion or exclusion of a study, tagging of the study, extraction of text from the study, etc. It is understood throughout this disclosure that the large language model can be synonymous with, or indicative of, a chatbot. The study flow diagram 2302 can include any or all actions taken within a project, or any or all actions taken by a user of the project. In the later case, selecting a user can bring up a study flow diagram 2302 specific to that user.

Figure 24:
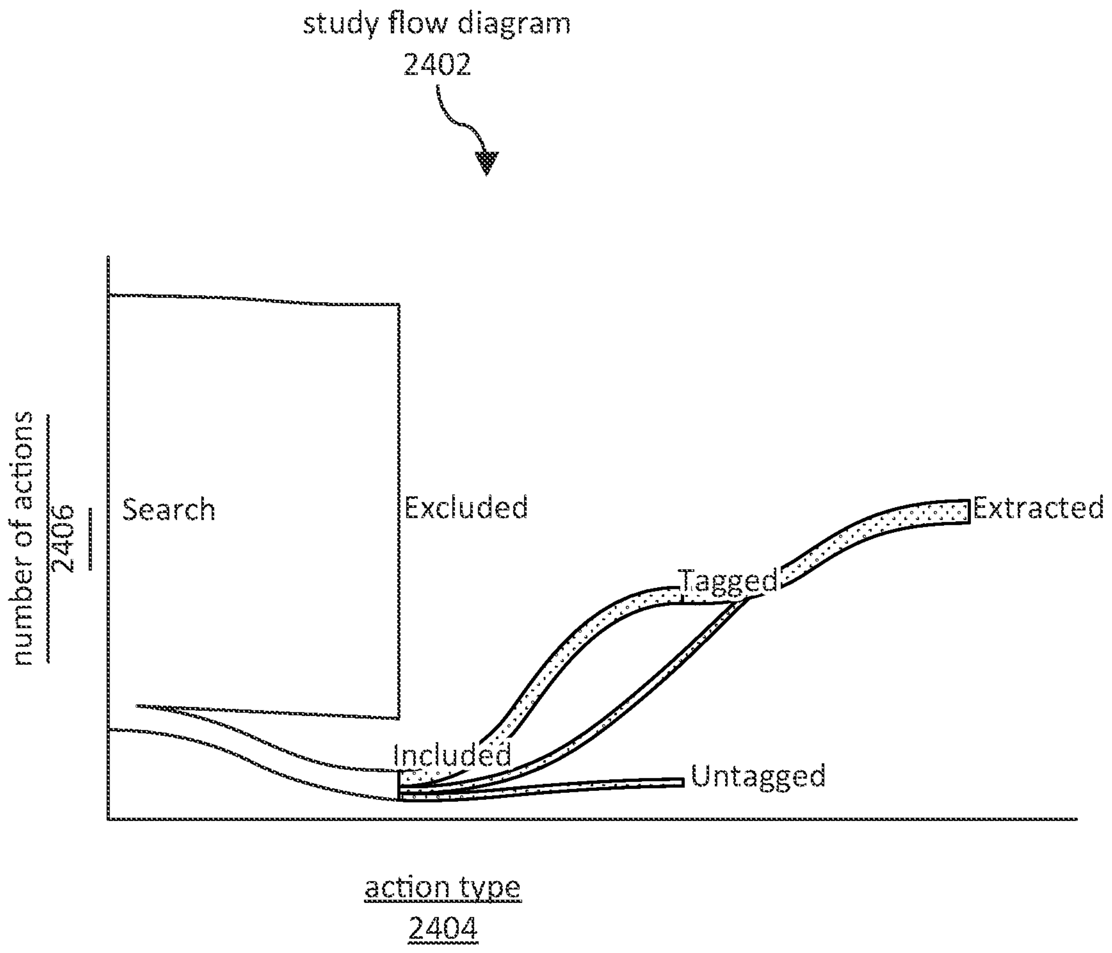
FIG. 24 illustrates a graphical representation of a user's workflow, in accordance with some examples of the present disclosure.

FIG. 24 illustrates a graphical representation of a user's workflow, according to some examples. This graphical representation can take the form of a study flow diagram 2402. The study flow diagram 2402 can appear in the form of a standard X-Y graph, where X is represented by the action type 2404, and Y is represented by the number of actions 2406, though it is understood that these axes can be switched as desired.

Multiple different actions can be tracked over the study flow diagram 2402 and displayed separately from each other through the use of color, shading, or darkness levels. The actions that are tracked on the study flow diagram 2402 can be any actions taken by a user, or automatically generated via another intelligence, such as a large language model, such as inclusion or exclusion of a study, tagging of the study, extraction of text from the study, etc. The study flow diagram 2402 can include any or all actions taken within a project, or any or all actions taken by a user of the project. In the later case, selecting a user can bring up a study flow diagram 2402 specific to that user.

Figure 25:
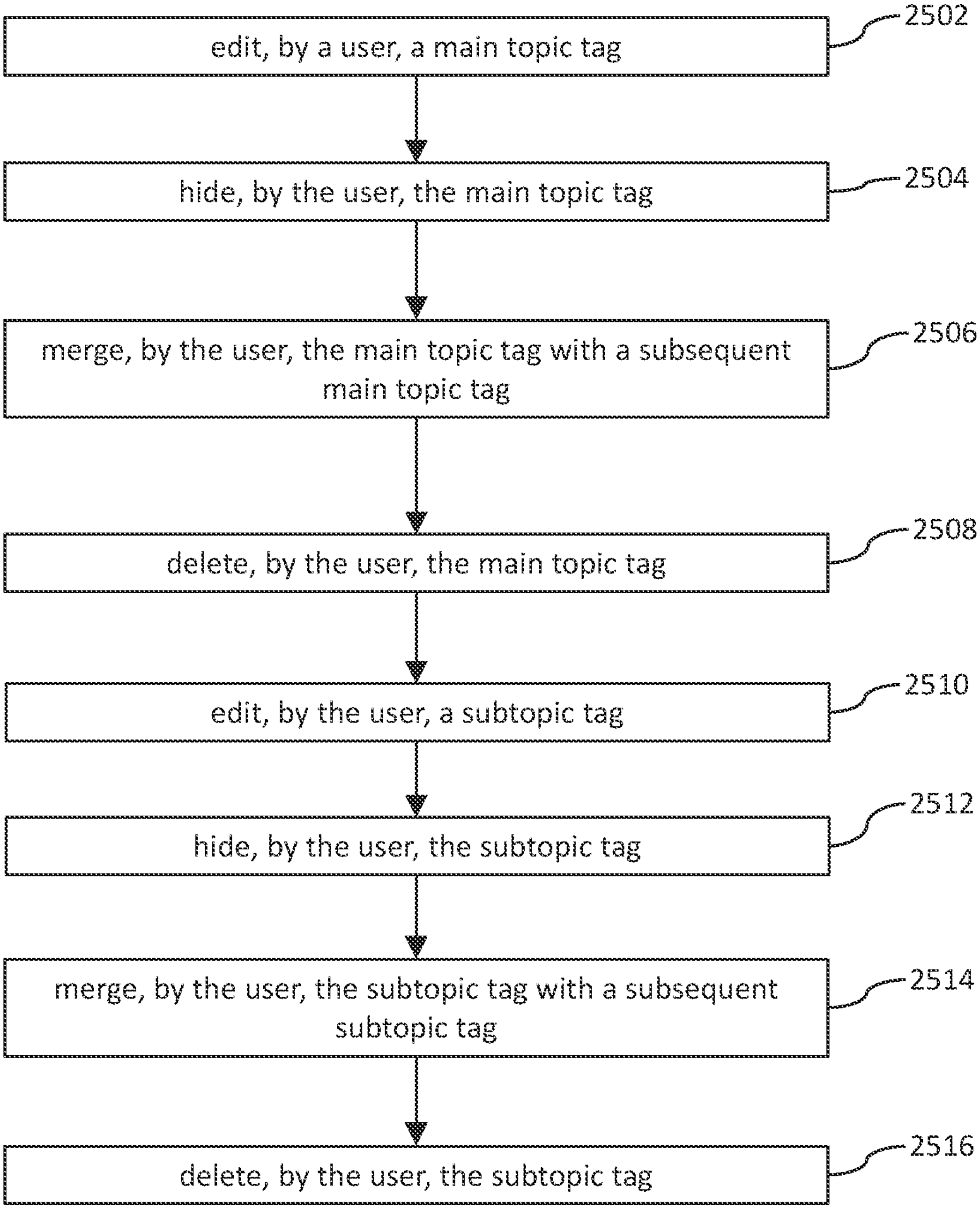
FIGS. 25 to 30 illustrate example methods, in accordance with some examples of the present disclosure.

FIG. 25 illustrates a flowchart depicting a method of interacting with topic tags, according to some examples. In some examples, the method includes editing, by a user, a main topic tag (at step 2502). According to some examples, the method includes hiding, by the user, the main topic tag (at step 2504).

The method can include merging, by the user, the main topic tag with a subsequent main topic tag (at step 2506). In some examples, the method includes deleting, by the user, the main topic tag (at step 2508).

According to some examples, the method includes editing, by the user, a subtopic tag (at step 2510). The method can include hiding, by the user, the subtopic tag (at step 2512).

In some examples, the method includes merging, by the user, the subtopic tag with a subsequent subtopic tag (at step 2514). According to some examples, the method includes deleting, by the user, the subtopic tag (at step 2516).

Figure 26:
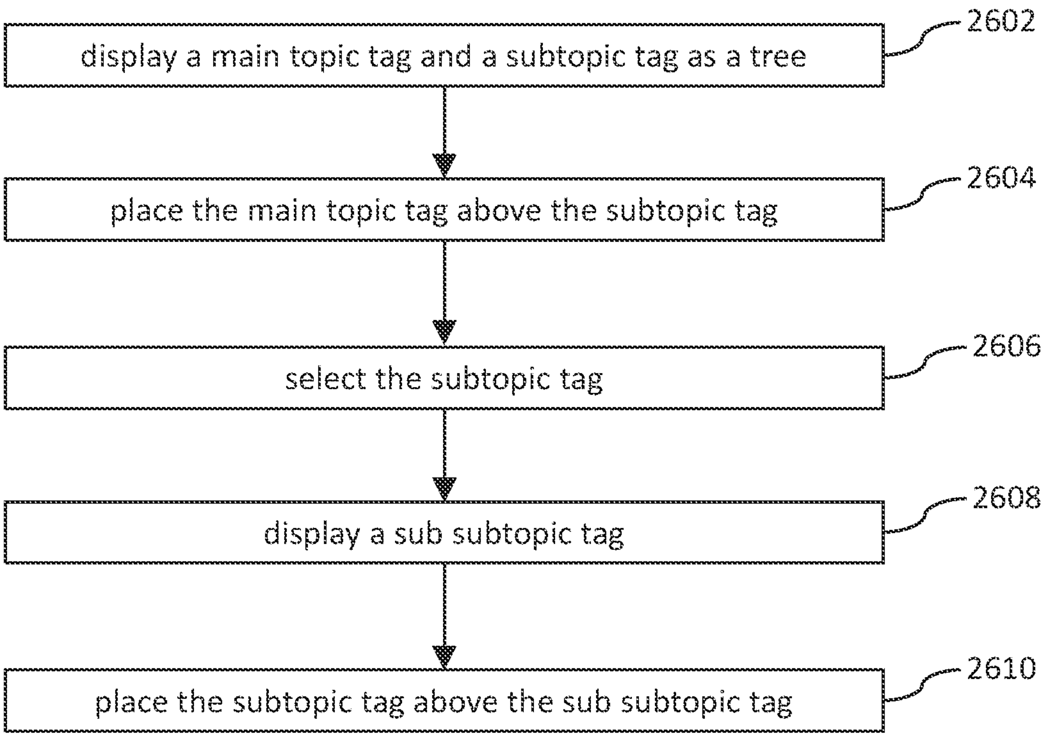

FIG. 26 illustrates a flowchart depicting a method of hierarchically organizing topic tags, according to some examples. The method can include displaying a main topic tag and a subtopic tag as a tree (at step 2602). In some examples, the method includes placing the main topic tag above the subtopic tag (at step 2604).

According to some examples, the method includes selecting the subtopic tag (at step 2606). The method can include displaying a sub subtopic tag (at step 2608). In some examples, the method includes placing the subtopic tag above the sub subtopic tag (at step 2610).

Figure 27:
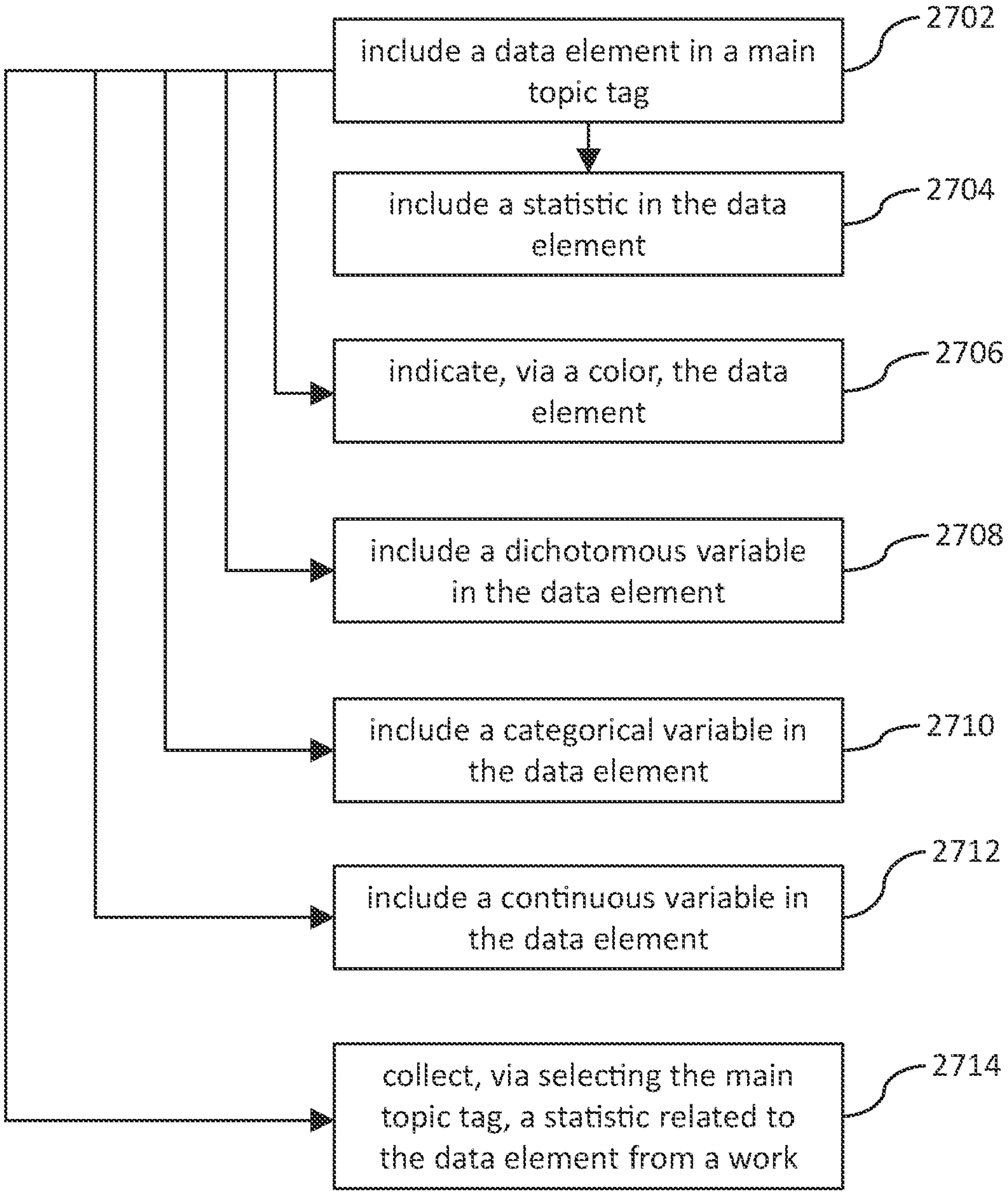

FIG. 27 illustrates a flowchart depicting a method of obtaining data through a main topic tag, according to some examples. The method can include including a data element in a main topic tag (at step 2702). In some examples, the method includes including a statistic in the data element (at step 2704). According to some examples, the method includes indicating, via a color, the data element (at step 2706).

The method can include including a dichotomous variable in the data element (at step 2708). In some examples, the method includes including a categorical variable in the data element (at step 2710). According to some examples, the method includes including a continuous variable in the data element (at step 2712).

The method can include collecting, via selecting the main topic tag, a statistic related to the data element from a work (at step 2714).

Figure 28:
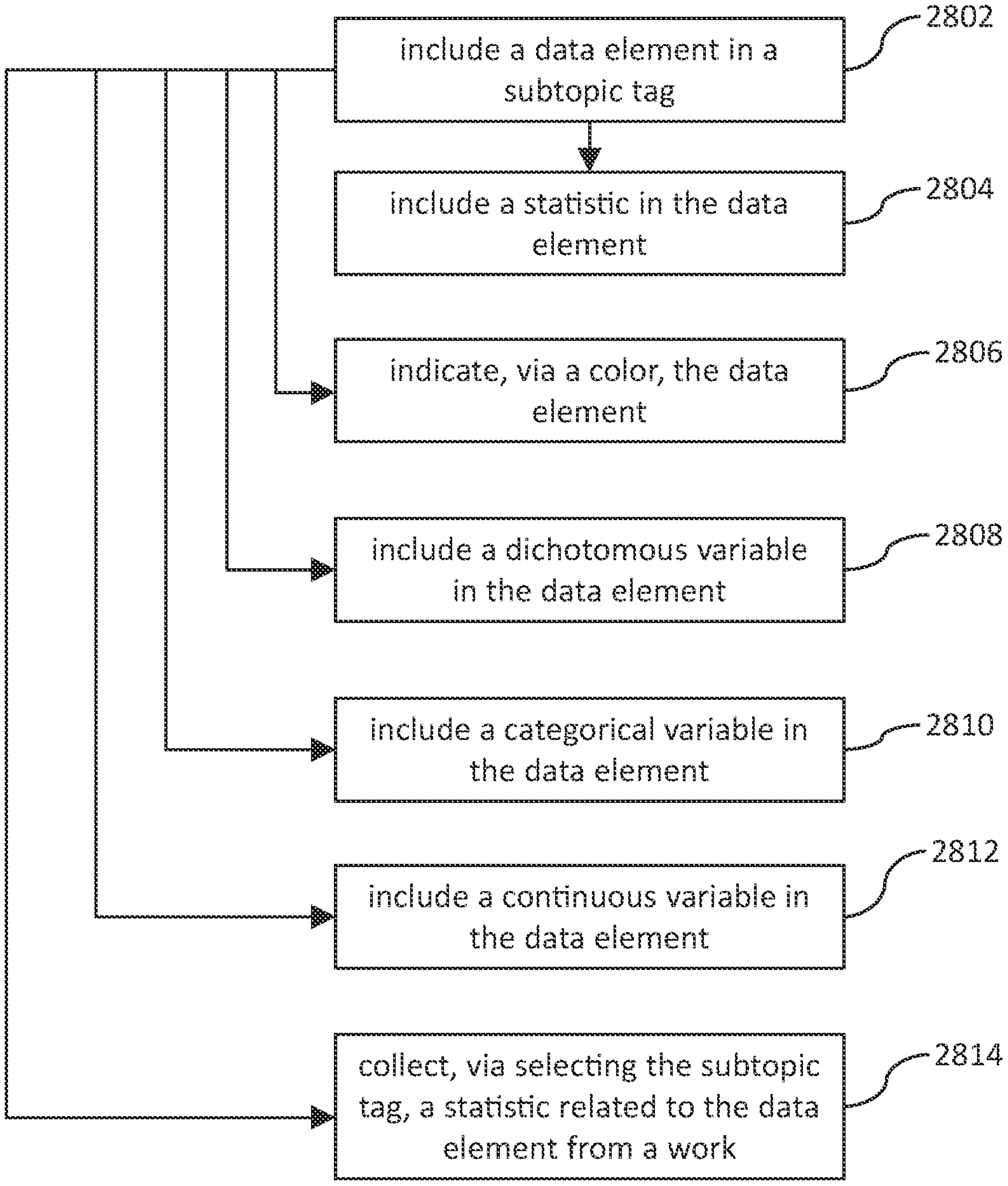

FIG. 28 illustrates a flowchart depicting a method of obtaining data through a subtopic tag, according to some examples. In some examples, the method includes including a data element in a subtopic tag (at step 2802). According to some examples, the method includes including a statistic in the data element (at step 2804). The method can include indicating, via a color, the data element (at step 2806).

In some examples, the method includes including a dichotomous variable in the data element (at step 2808). According to some examples, the method includes including a categorical variable in the data element (at step 2810). The method can include including a continuous variable in the data element (at step 2812).

In some examples, the method includes collecting, via selecting the subtopic tag, a statistic related to the data element from a work (at step 2814).

Figure 29:
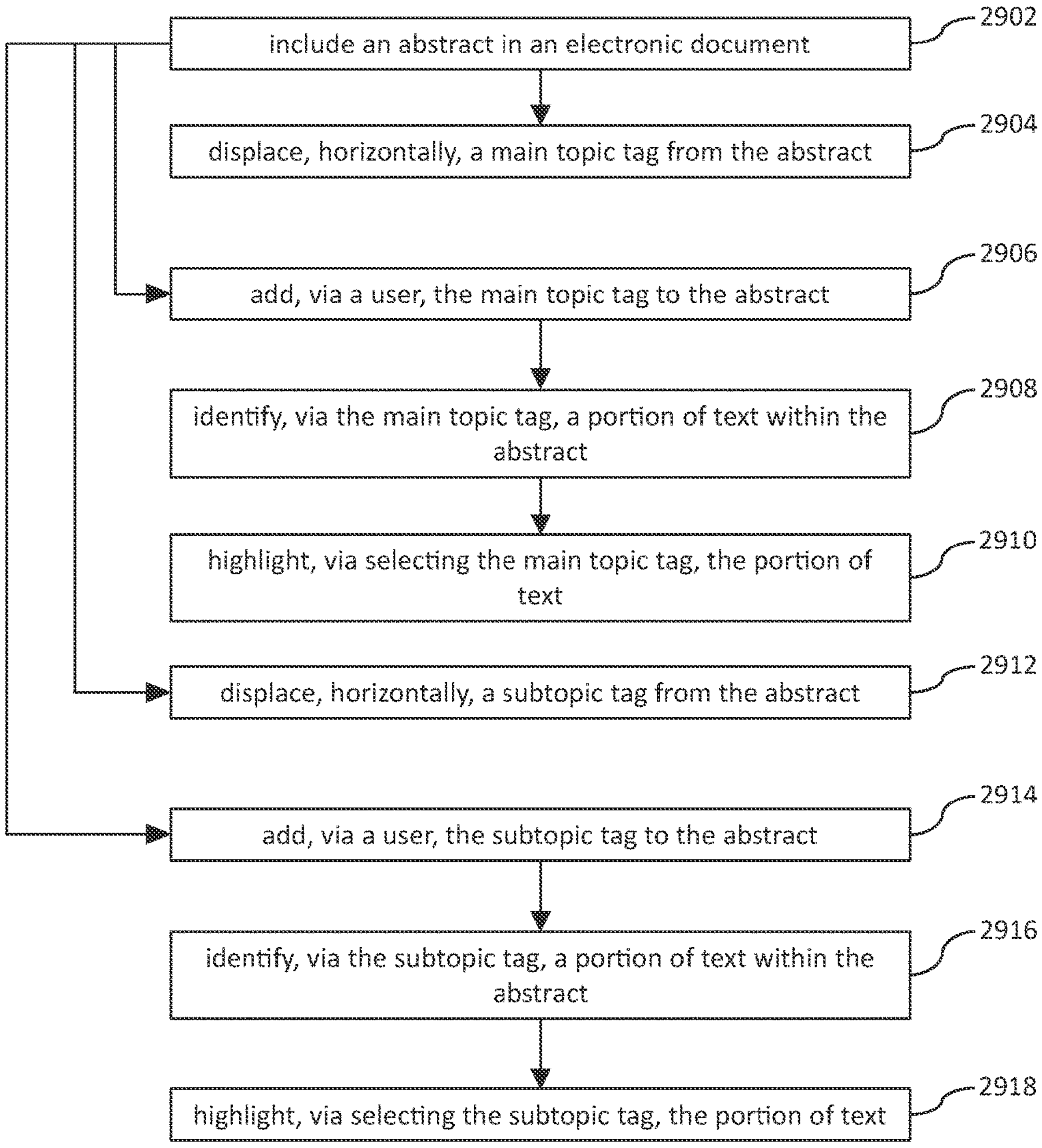

FIG. 29 illustrates a flowchart depicting a method of interacting with an abstract of a work, according to some examples. The method can include including an abstract in an electronic document (at step 2902). In some examples, the method includes displacing, horizontally, a main topic tag from the abstract (at step 2904).

According to some examples, the method includes adding, via a user, the main topic tag to the abstract (at step 2906). The method can include identifying, via the main topic tag, a portion of text within the abstract (at step 2908). In some examples, the method includes highlighting, via selecting the main topic tag, the portion of the text (at step 2910).

According to some examples, the method includes displacing, horizontally, a subtopic tag from the abstract (at step 2912). The method can include adding, via a user, the subtopic tag to the abstract (at step 2914).

In some examples, the method includes identifying, via the subtopic tag, a portion of text within the abstract (at step 2916). According to some examples, the method includes highlighting, via selecting the subtopic tag, the portion of text (at step 2918).

Figure 30:
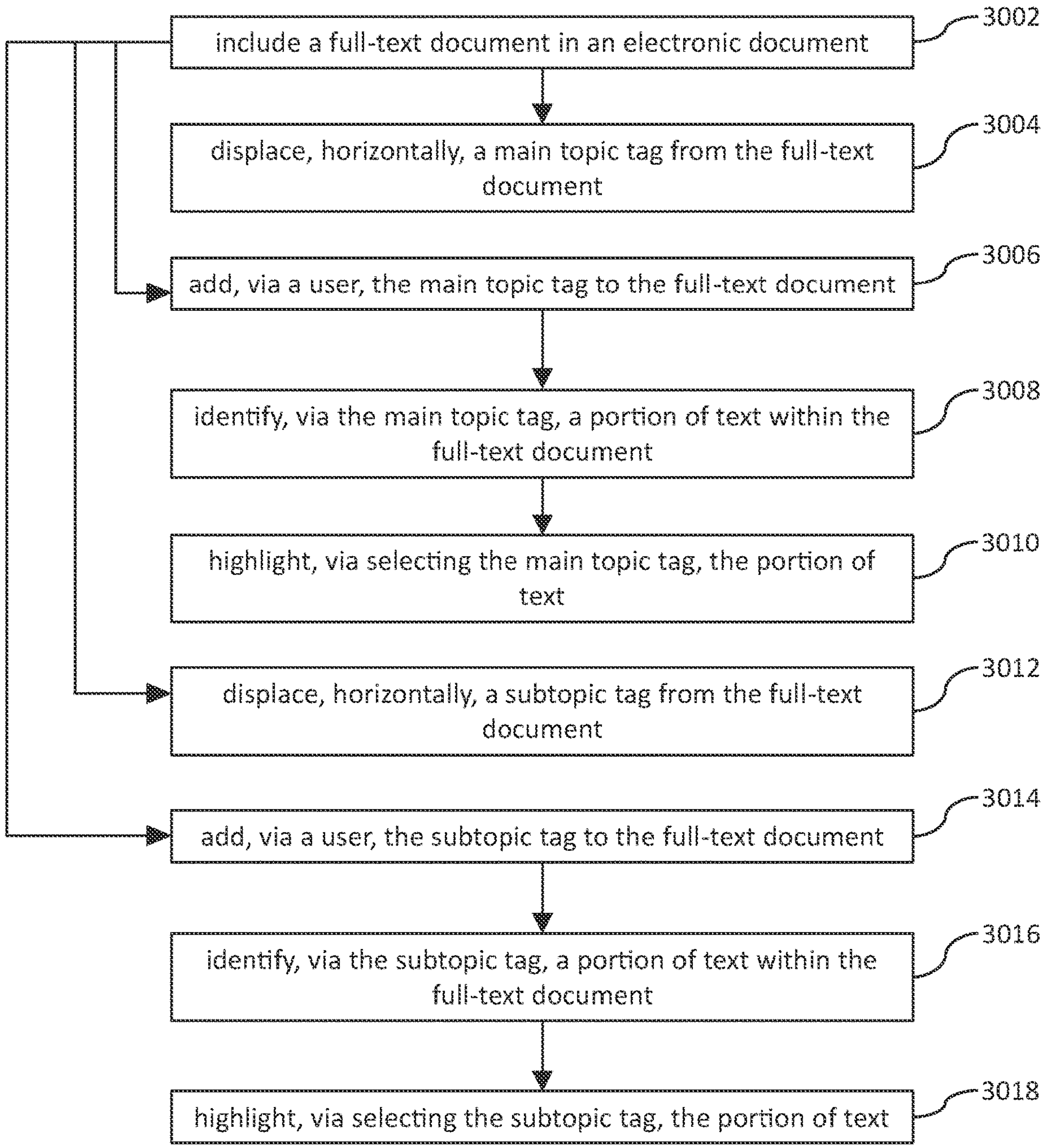

FIG. 30 illustrates a flowchart depicting a method of interacting with a full-text document of a work, according to some examples. The method can include including a full-text document in an electronic document (at step 3002). In some examples, the method includes displacing, horizontally, a main topic tag from the full-text document (at step 3004).

According to some examples, the method includes adding, via a user, the main topic tag to the full-text document (at step 3006). The method can include identifying, via the main topic tag, a portion of text within the full-text document (at step 3008). In some examples, the method includes highlighting, via selecting the main topic tag, the portion of text (at step 3010).

According to some examples, the method includes displacing, horizontally, a subtopic tag from the full-text document (at step 3012). The method can include adding, via a user, the subtopic tag to the full-text document (at step 3014).

In some examples, the method includes identifying, via the subtopic tag, a portion of text within the full-text document (at step 3016). According to some examples, the method includes highlighting, via selecting the subtopic tag, the portion of text (at step 3018).

Figure 31A:
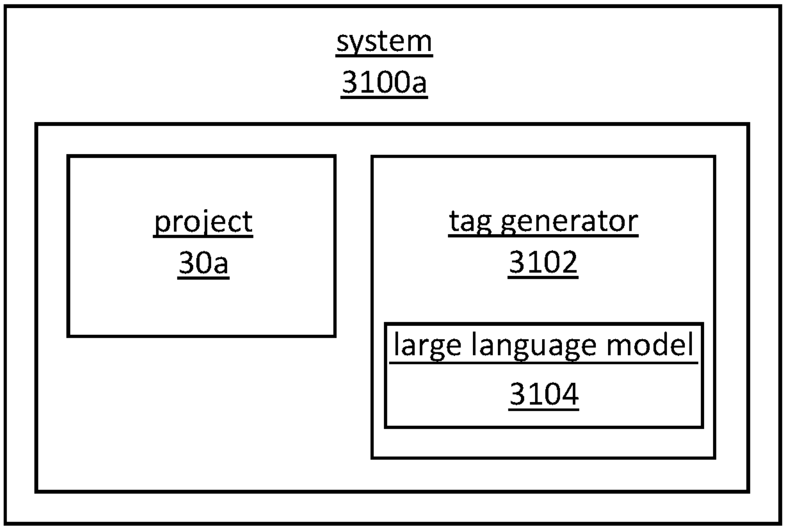
FIGS. 31A and 31B illustrate block diagrams of example aspects of example computing systems, in accordance with some examples of the present disclosure.

FIG. 31A illustrates a block diagram of a system 3100*a*. In some examples, the system 3100*a* includes a project 30*a* as shown and described in FIG. 3A. Additionally, the system 3100*a* can include a tag generator 3102 configured to populate topic tags 106 within works of authorship 102 within electronic document 10 of project 30*a*. The tag generator 3102 can include a large language model 3104, configured to learn about proper application of topic tags 106 in order to improve the accuracy of such topic tag 106 applications.

While FIG. 31A shows a project 30*a*, it is understood that multiple projects can be included in system 3100*a*. Additionally, while FIG. 31A shows a tag generator 3102, it is understood that multiple tag generators can be included in the system 3100*a*.

Figure 31B:
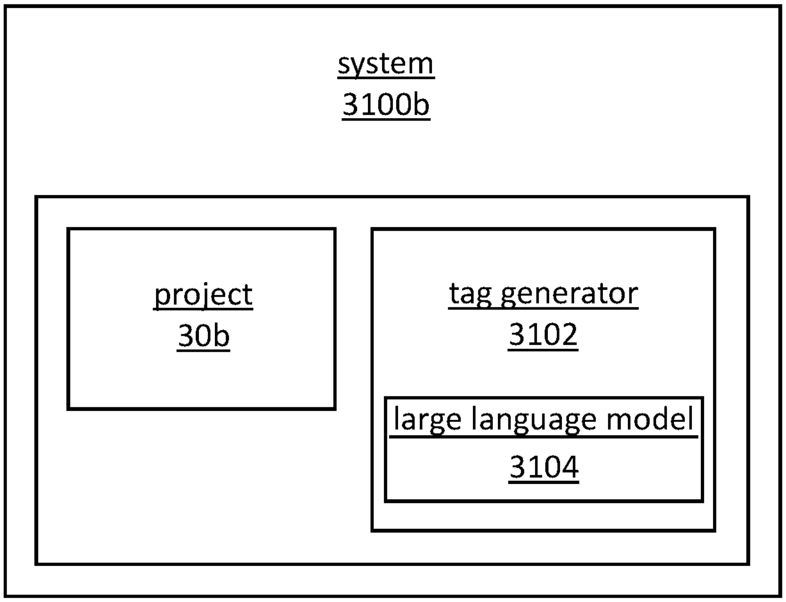

FIG. 31B illustrates a block diagram of a system 3100*b*. In some examples, the system 3100*b* includes a project 30*b* as shown and described in FIG. 3B. Additionally, the system 3100*b* can include a tag generator 3102 configured to populate main topic tags 206 and subtopic tags 208 within works of authorship 102 within electronic document 20 of project 30*b*. The tag generator 3102 can include a large language model 3104, configured to learn about proper application of main topic tags 206 and subtopic tags 208 in order to improve the accuracy of such main topic tags 206 and subtopic tags 208 applications.

While FIG. 31B shows a project 30*b*, it is understood that multiple projects can be included in system 3100*b*. Additionally, while FIG. 31B shows a tag generator 3102, it is understood that multiple tag generators can be included in the system 3100*b*.

FIGS. 32-36 below describe potential methods of using systems 3100*a* and/or 3100*b* as illustrated and described in FIGS. 31A and 31B.

Figure 32:
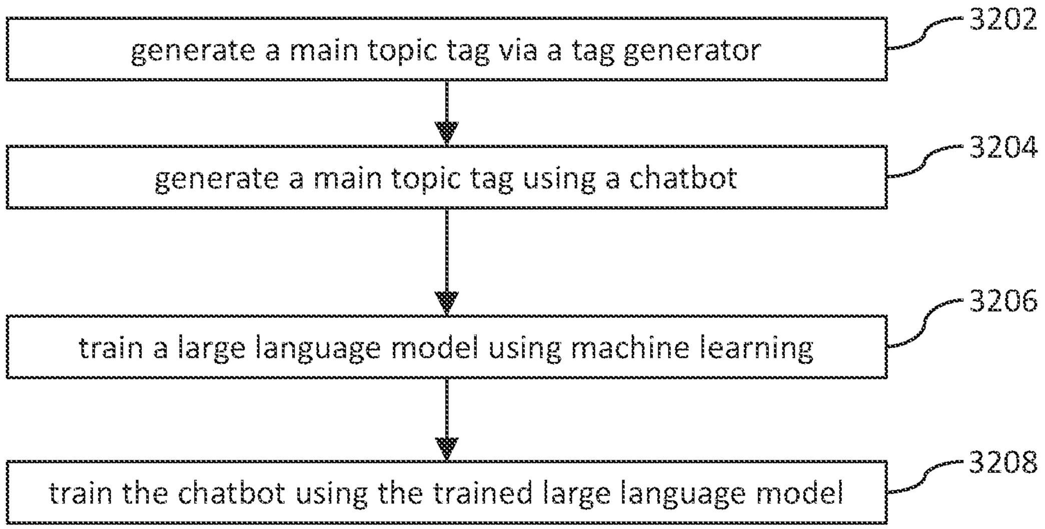
FIGS. 32 to 36 illustrate example methods, in accordance with some examples of the present disclosure.

FIG. 32 illustrates a flowchart depicting a method of topic tag generation through a chatbot, according to some examples. The method can include generating a main topic tag via a tag generator (at step 3202). In some examples, the method includes generating a main topic tag using a large language model (at step 3204).

According to some examples, the method includes training a large language model using machine learning (at step 3206). The method can include training the chatbot using the trained large language model (at step 3208).

Figure 33:
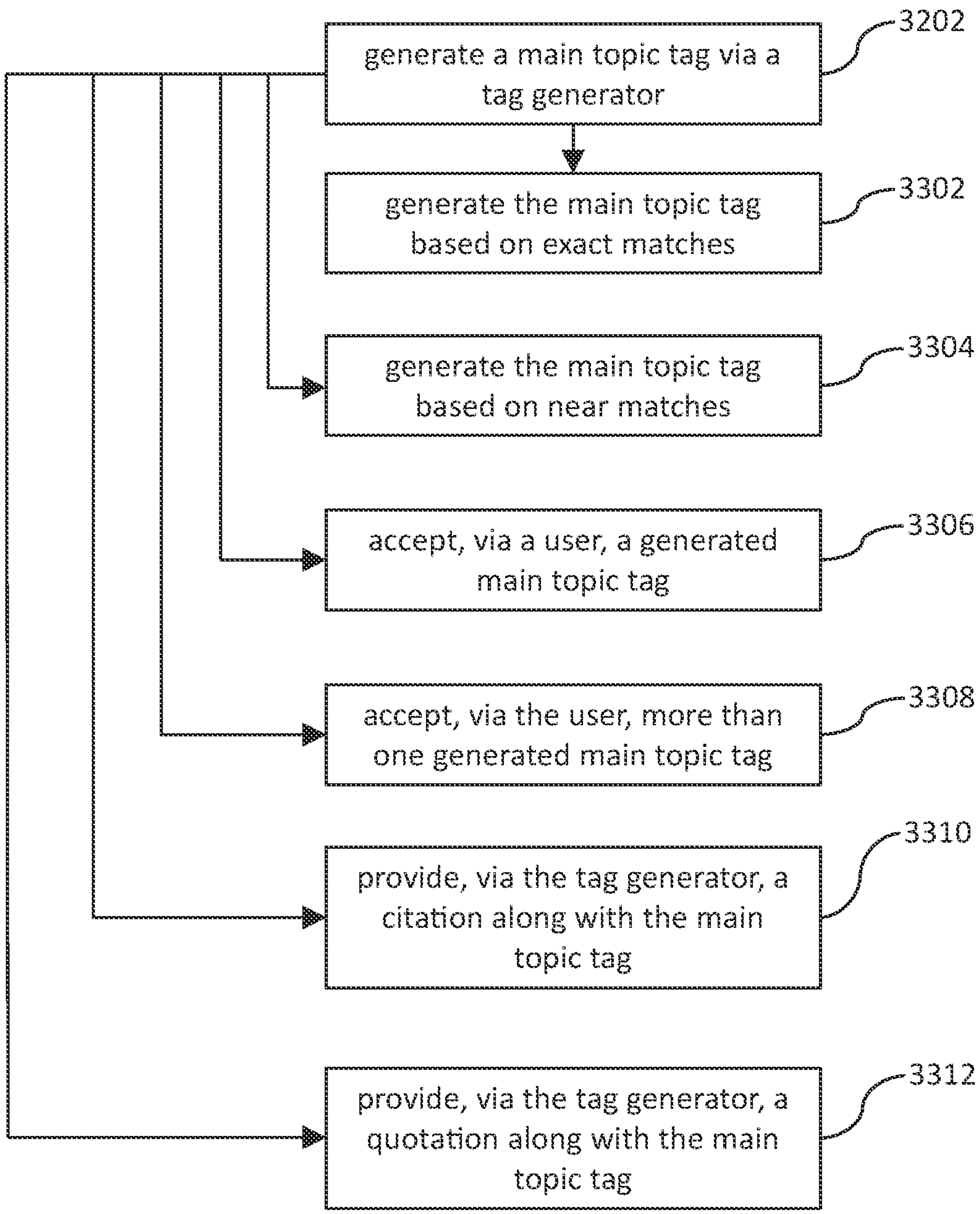

FIG. 33 illustrates a flowchart depicting a method of interacting with a generated topic tag, according to some examples. In some examples, the method includes generating a main topic tag via a tag generator (as seen in step 3202 in FIG. 32 above). According to some examples, the method includes generating the main topic tag based on exact matches (at step 3302). The method can include generating the main topic tag based on near matches (at step 3304).

In some examples, the method includes accepting, via a user, a generated main topic tag (at step 3306). According to some examples, the method includes accepting, via the user, more than one generated main topic tag (at step 3308).

The method can include providing, via the tag generator, a citation along with the main topic tag (at step 3310). In some examples, the method includes providing, via the tag generator, a quotation along with the main topic tag (at step 3312).

Figure 34:
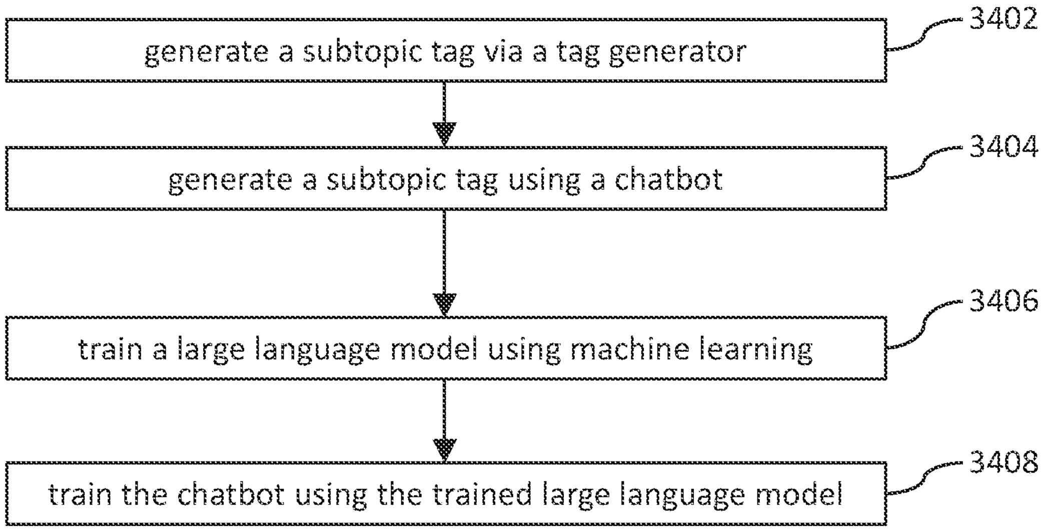

FIG. 34 illustrates a flowchart depicting another method of topic tag generation through a large language model, according to some examples. The method can include generating a subtopic tag via a tag generator (at step 3402). In some examples, the method includes generating a subtopic tag using a chatbot (at step 3404).

According to some examples, the method includes training a large language model using machine learning (at step 3406). The method can include training the chatbot using the trained large language model (at step 3408).

Figure 35:
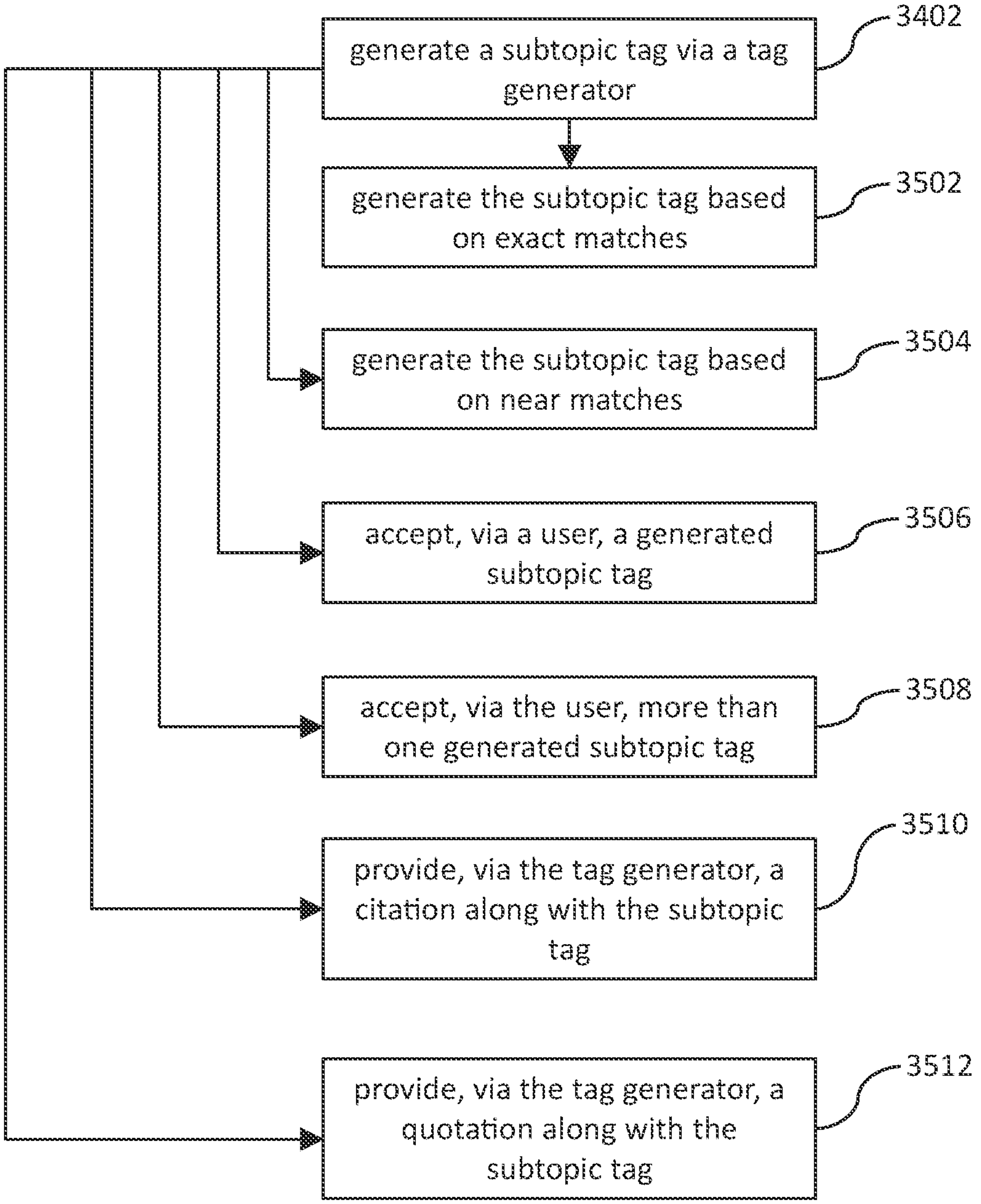

FIG. 35 illustrates a flowchart depicting another method of interacting with a generated topic tag, according to some examples. In some examples, the method includes generating a subtopic tag via a tag generator (as seen in step 3402 in FIG. 34 above). According to some examples, the method includes generating the subtopic tag based on exact matches (at step 3502). The method can include generating the subtopic tag based on near matches (at step 3504).

In some examples, the method includes accepting, via a user, a generated subtopic tag (at step 3506). According to some examples, the method includes accepting, via the user, more than one generated subtopic tag (at step 3508).

The method can include providing, via the tag generator, a citation along with the subtopic tag (at step 3510). In some examples, the method includes providing, via the tag generator, a quotation along with the subtopic tag (at step 3512).

Figure 36:
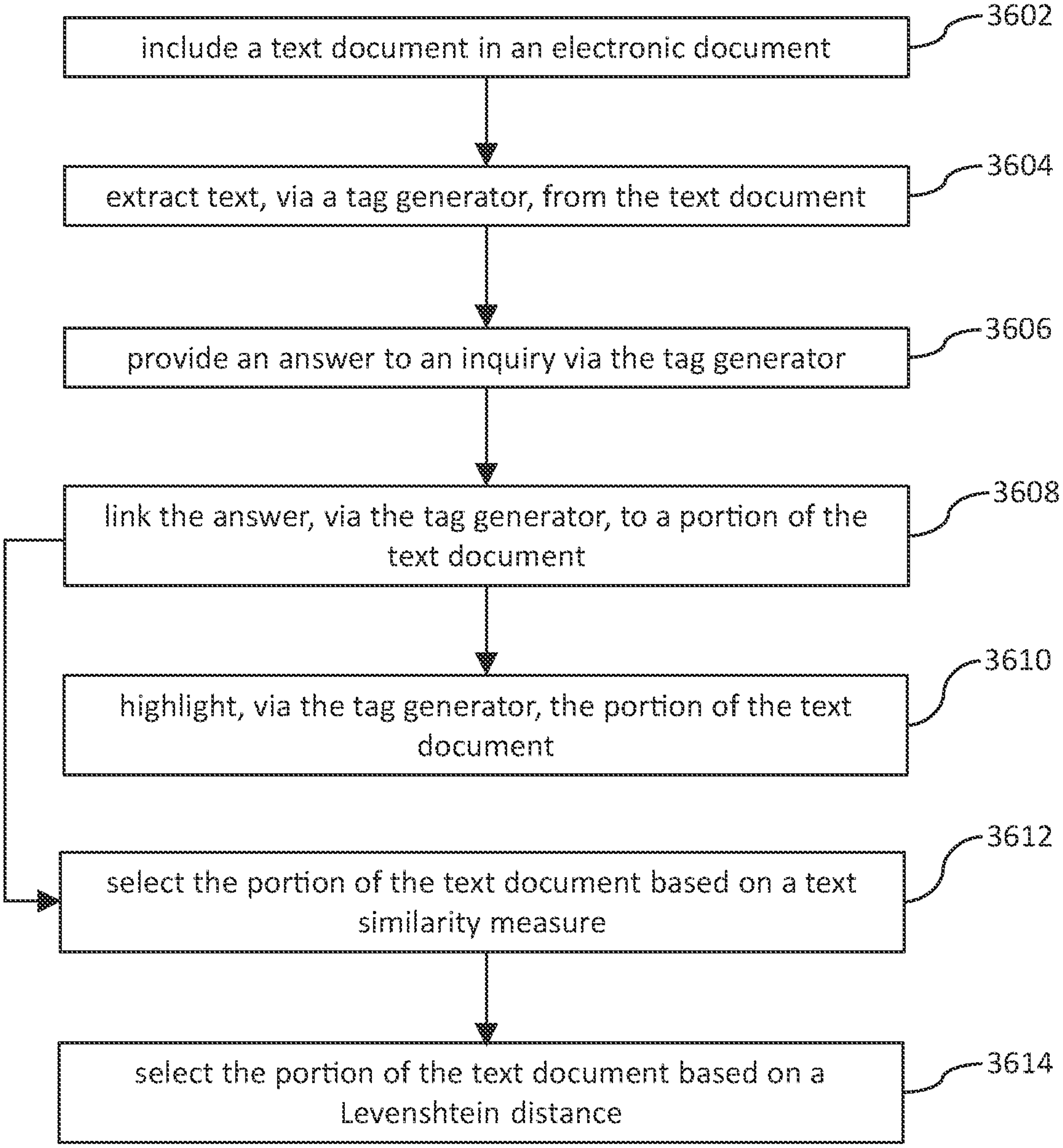

FIG. 36 illustrates a flowchart depicting a method of extracting text from an electronic document, according to some examples. The method can include including a text document in an electronic document (at step 3602). In some examples, the method includes extracting text, via a tag generator, from the text document (at step 3604).

According to some examples, the method includes providing an answer to an inquiry via the tag generator (at step 3606). That is to say, in some examples, the inquiry is provided by the tag generator, and the answer to said inquiry is found within the text document. If the answer to the inquiry exists within the text document, it can be isolated and presented to the user in the following steps. The method can include linking the answer, via the tag generator, to a portion of the text document (at step 3608). In some examples, the method includes highlighting, via the tag generator, the portion of the text document (at step 3610).

According to some examples, the method includes selecting the portion of the text document based on a text similarity measure (at step 3612). The method can include selecting the portion of the text document based on a Levenshtein distance (at step 3614).

Figure 37:
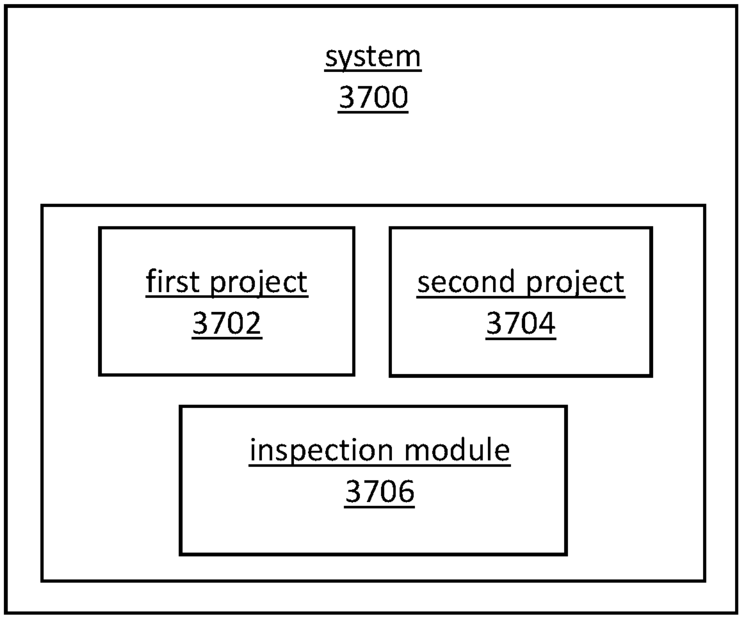
FIG. 37 illustrates a block diagram of example aspects of an example computing system, in accordance with some examples of the present disclosure.

FIG. 37 illustrates a block diagram of a system 3700. In some examples, the system includes a first project 3702 and a second project 3704. First project 3702 and second project 3704 can be project 30*a* or project 30*b*, but are labeled differently here in order to facilitate understanding. Additionally, system 3700 can include an inspection module 3706 configured to facilitate the display of and interactions with the multiple projects within system 3700.

While FIG. 37 shows a first project 3702 and a second project 3704, it is understood that additional projects can also be included within system 3700.

Figure 38:
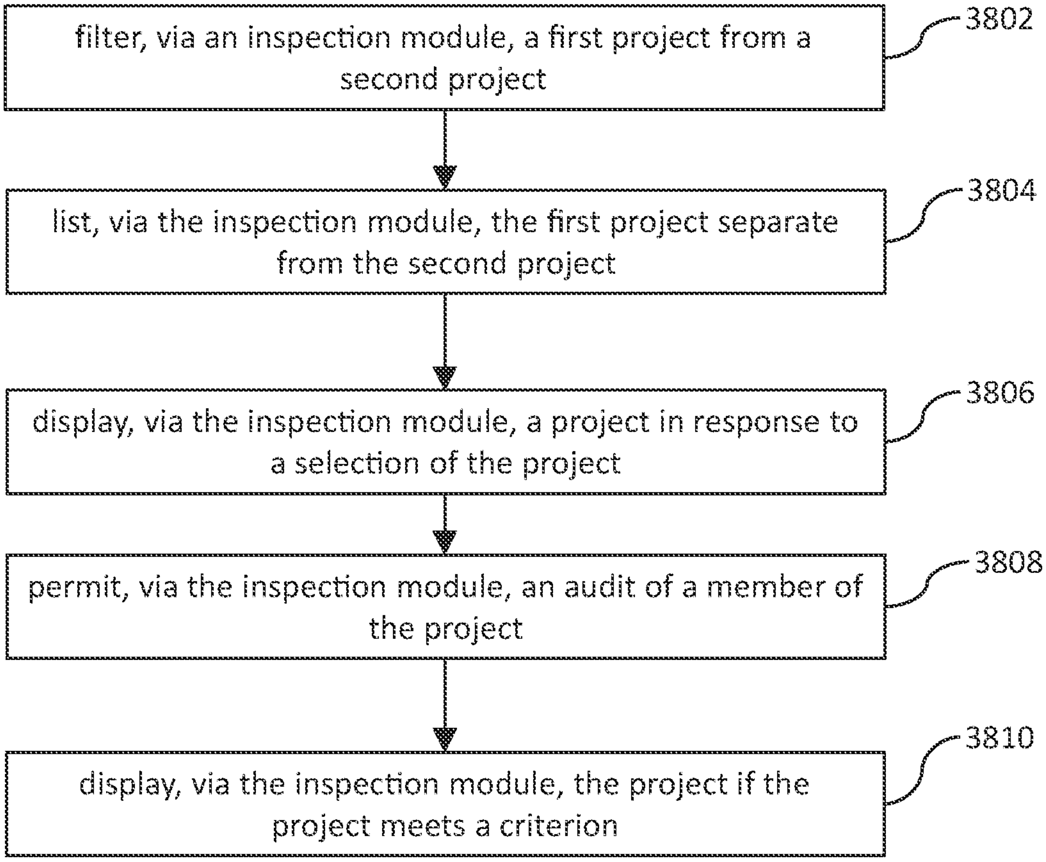
FIGS. 38 to 40 illustrate example methods, in accordance with some examples of the present disclosure.
Figure 39:
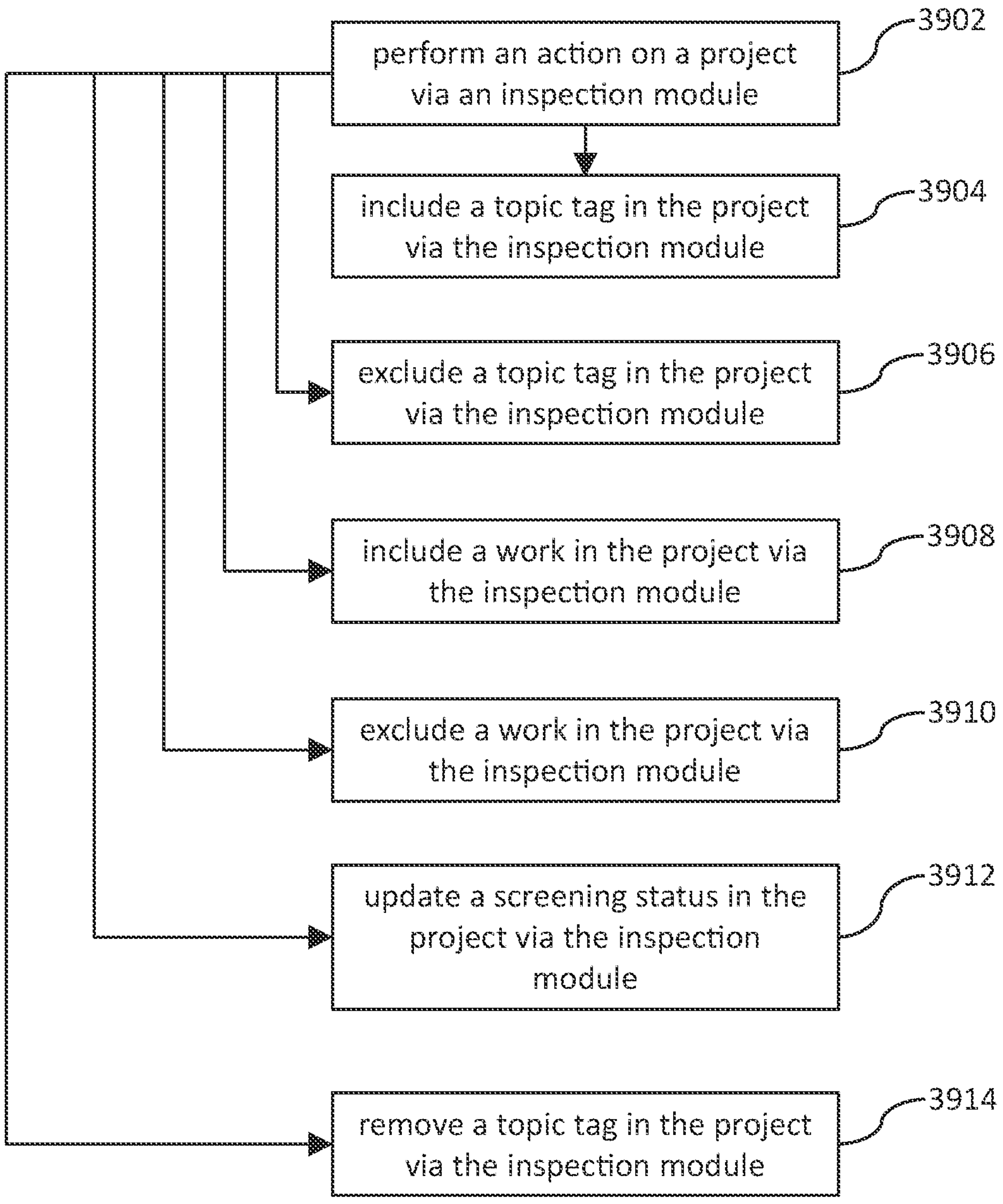
Figure 40:
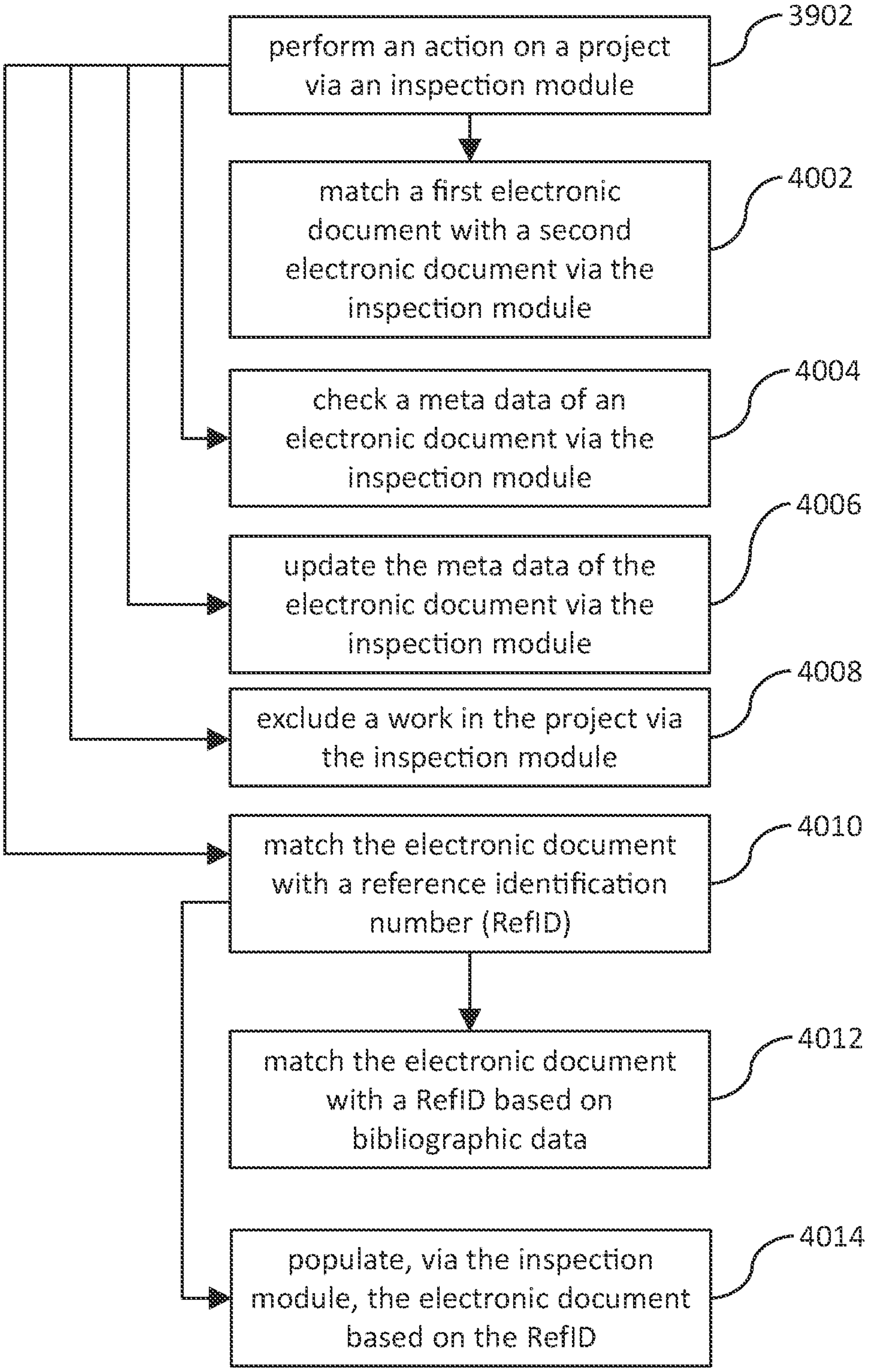

FIGS. 38-40 below describe potential methods of using system 3700 as illustrated and described in FIG. 37.

FIG. 38 illustrates a flowchart depicting a method of inspecting a project, according to some examples. In some examples, the method includes filtering, via an inspection module, a first project from a second project (at step 3802). According to some examples, the method includes listing, via the inspection module, the first project separate from the second project (at step 3804). While the steps herein discuss separating a first project and a second project, it is understood that all of the capabilities of the inspection module can be narrowed in scope so as to inspect the electronic documents within a single project so as to filter between these electronic documents.

The method can include displaying, via the inspection module, a project in response to a selection of the project (at step 3806). In some examples, the method includes permitting, via the inspection module, an audit of a member of the project (at step 3808). According to some examples, the method includes displaying, via the inspection module, the project if the project meets a criterion (at step 3810).

FIG. 39 illustrates a flowchart depicting another method of inspecting a project, according to some examples. The method can include performing an action on a project via an inspection module (at step 3902). In some examples, the method includes including (i.e., adding) a topic tag in the project via the inspection module (at step 3904). According to some examples, the method includes excluding (i.e., removing) a topic tag in the project via the inspection module (at step 3906).

The method can include including a work in the project via the inspection module (at step 3908). In some examples, the method includes excluding a work in the project via the inspection module (at step 3910).

According to some examples, the method includes updating a screening status in the project via the inspection module (at step 3912). The method can include removing a topic tag in the project via the inspection module (at step 3914). Any action or step discussed in FIG. 39 can be completed in bulk (i.e., on multiple or all projects or electronic documents) as well as on individual projects or electronic documents.

FIG. 40 illustrates a flowchart depicting another method of inspecting a project, according to some examples. In some examples, the method includes performing an action on a project via an inspection module (as seen in step 3902 in FIG. 39 above). According to some examples, the method includes matching a first electronic document with a second electronic document via the inspection module (at step 4002).

The method can include checking a metadata of an electronic document via the inspection module (at step 4004). In some examples, the method includes updating the metadata of the electronic document via the inspection module (at step 4006). According to some examples, the method includes excluding a work in the project via the inspection module (at step 4008). In situations where one or both of the works of authorship within an electronic document are incomplete with respect to the bibliographic data, the records can be merged such as to create a more complete bibliographic data record for the work of authorship.

The method can include matching the electronic document with a reference identification number (RefID) (at step 4010). In some examples, the method includes matching the electronic document with a RefID based on bibliographic data (at step 4012). According to some examples, the method includes populating, via the inspection module, the electronic document based on the RefID (at step 4014).

Figure 41A:
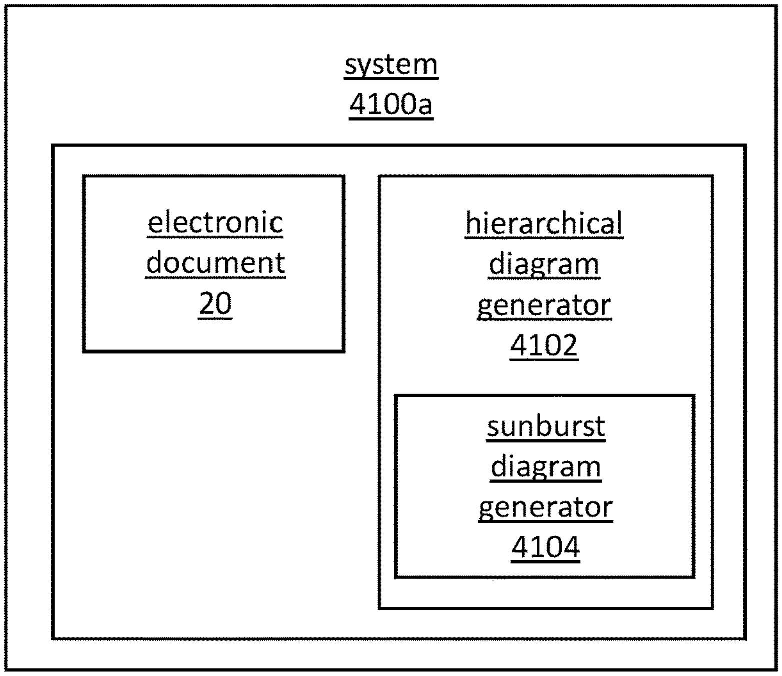
FIGS. 41A and 41B illustrate block diagrams of example aspects of example computing systems, in accordance with some examples of the present disclosure.

FIG. 41A illustrates a block diagram of a system 4100*a*. In some examples, the system includes an electronic document 20 as shown and described in FIG. 2. Electronic document 20 is specifically shown as the generation of a hierarchy begets the needs for an order, and electronic document 20 includes main topics 202 which are hierarchically related to subtopics 204. Additionally, system 4100*a* can include a hierarchical diagram generator 4102 configured to generate a diagram indicative of the hierarchical relationship between the tags of electronic document 20. According to some examples, the hierarchical diagram generator 4102 includes a sunburst diagram generator 4104 for generation of hierarchical diagrams specifically in the form of a sunburst diagram.

While FIG. 41A illustrates an electronic document 20, it is understood that multiple electronic documents can be included within system 4100*a*.

Figure 41B:
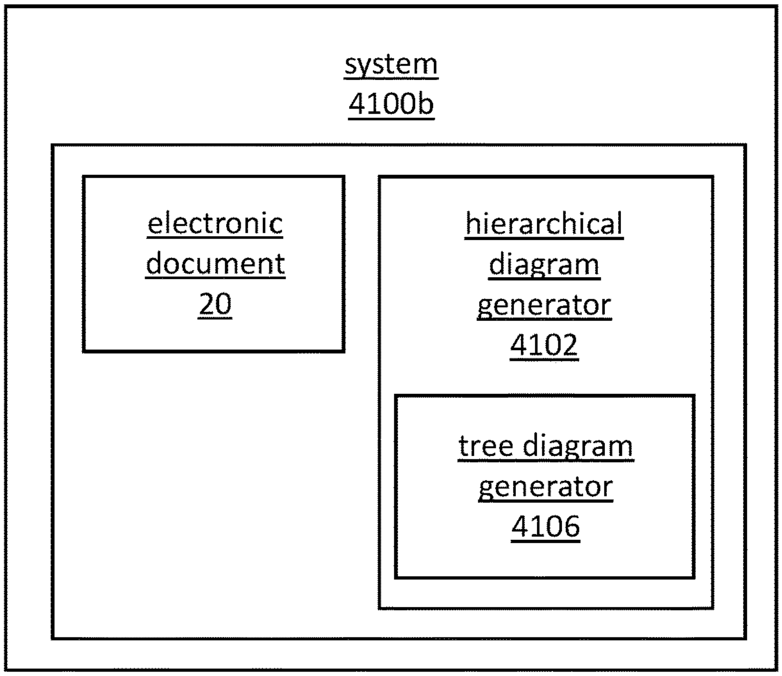

FIG. 41B illustrates a block diagram of a system 4100*b*. In some examples, the system includes an electronic document 20 as shown and described in FIG. 2. Electronic document 20 is specifically shown as the generation of a hierarchy begets the needs for an order, and electronic document 20 includes main topics 202 which are hierarchically related to subtopics 204. Additionally, system 4100*b* can include a hierarchical diagram generator 4102 configured to generate a diagram indicative of the hierarchical relationship between the tags of electronic document 20. According to some examples, the hierarchical diagram generator 4102 includes a tree diagram generator 4106 for generation of hierarchical diagrams specifically in the form of tree diagrams.

While FIG. 41B illustrates an electronic document 20, it is understood that multiple electronic documents can be included within system 4100*b*.

Figure 44:
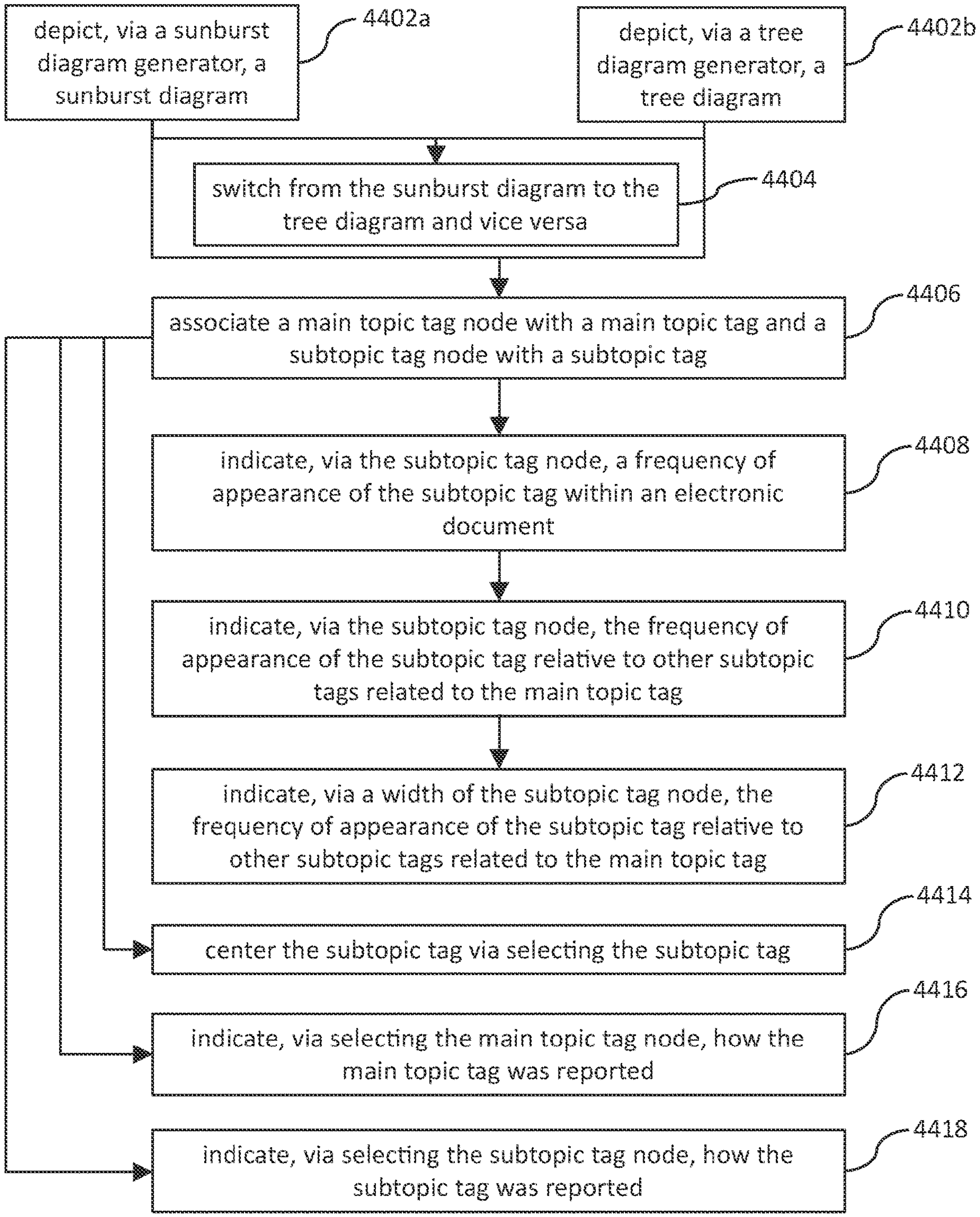
FIGS. 44 and 45 illustrate example methods, in accordance with some examples of the present disclosure.
Figure 45:
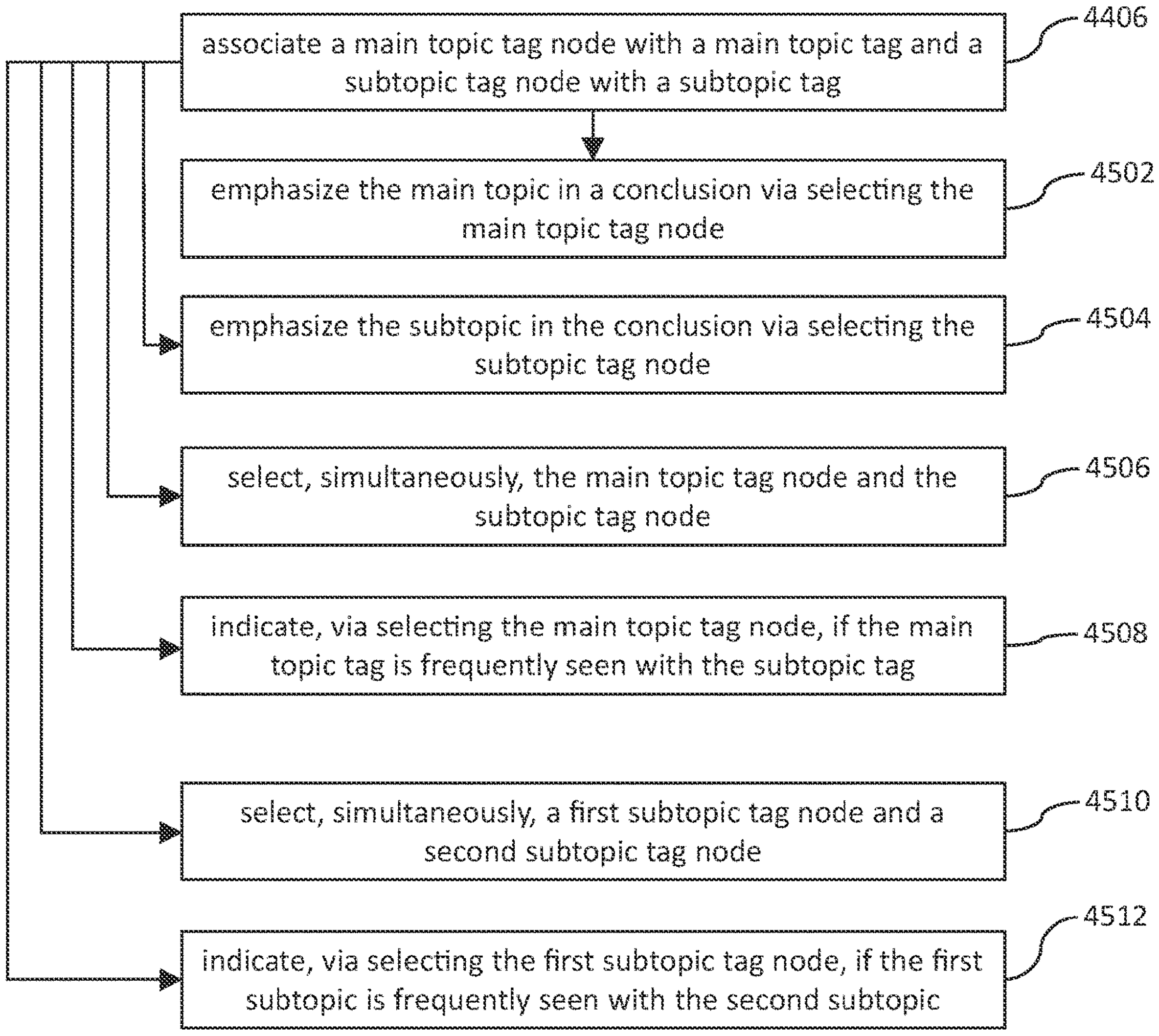

FIGS. 44 and 45 below describe potential methods of using system 4100*a* and/or system 4100*b* as illustrated and described in FIGS. 41A and 41B.

Figure 42:
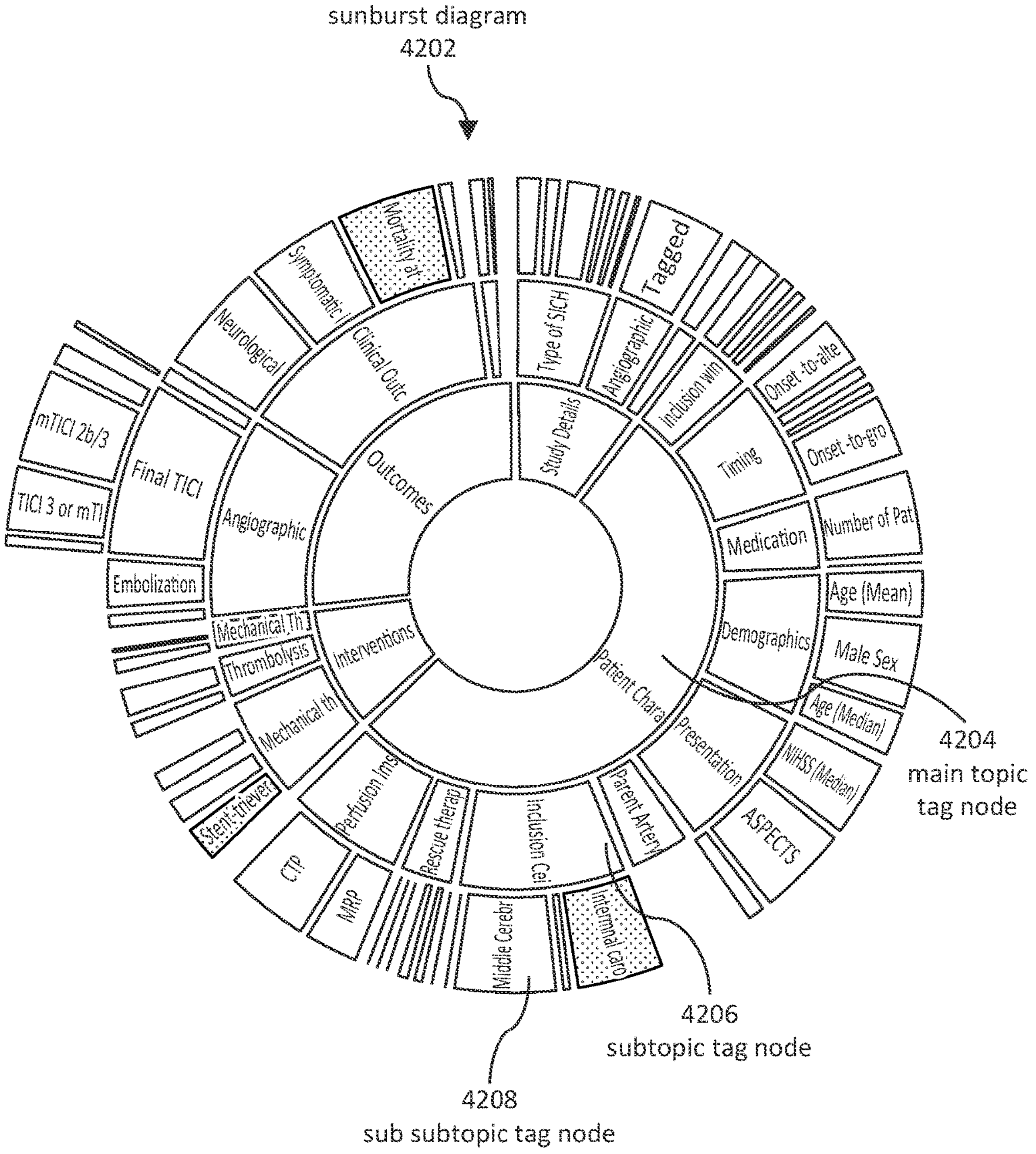
FIG. 42 illustrates a graphical representation of a sunburst diagram, in accordance with some examples of the present disclosure.

FIG. 42 illustrates a graphical representation of a sunburst diagram 4202, according to some examples. The sunburst diagram 4202 can be a circular graph capable of hierarchically displaying a relationship between a main topic tag node 4204 and a subtopic tag node 4206 when the subtopic is related in some manner to the main topic. As also illustrated by the sunburst diagram 4202, the levels of hierarchy can go further, including a sub subtopic tag node 4208 of the subtopic tag node 4206. As also illustrated but not labeled, the levels of hierarchy can go further still, including a sublevel beyond the sub subtopic tag node 4208. In fact, as many levels of hierarchical structure can be used as desired.

The sunburst diagram 4202 can provide information about the relationship between the main topic and subtopic (and subtopic and sub subtopic, etc.) through the size of the nodes with respect to their parent node. The term "parent node" is used here to describe a node above another node in a hierarchy. I.e., a main topic tag node 4204 would be considered a parent tag to the subtopic tag node 4206. Likewise, the subtopic tag node 4206 would be considered a child tag to the main topic tag node 4204. A parent node can have multiple child nodes, but a child node can only have one parent node.

A parent tag node can have more than one child tag node. The width of the child tag node can never be larger than the width of the parent tag node, but the width of this child tag node can still convey information. For example, if a main topic tag node 4204 includes four subtopic tag nodes 4206, and one of the subtopic tag nodes 4206 is approximately a quarter of the width of the main topic tag node 4204, it can be assumed, at a glance, that the subtopic tag node 4206 is found in all cases where the main topic tag node 4204 is found. The relationship between such a subtopic tag node 4206 and other subtopic tag nodes 4206 can indicate the approximate ratio of the other subtopic tag nodes 4206 as found in the main topic tag node 4204 with respect to this subtopic tag node 4206.

Additionally, through selecting a main topic tag node 4204, the sunburst diagram 4202 can focus, or center, on the selected main topic tag node 4204 such that each of its associated subtopic tag nodes 4206 surround it, effectively "zooming in" on this main topic tag node 4204. In turn, a subtopic tag node 4206 can be selected such that each of its associated sub subtopic tag nodes 4208 surrounds it. This "zooming in" can happen at any level of the hierarchy, and any level can be selected from the primary sunburst diagram 4202.

Furthermore, clicking on any node within the sunburst diagram 4202 can provide information related to the topic the node is associated with. For example, selecting a main topic tag node can provide information regarding how the main topic tag was reported, the number of electronic documents in which the main topic tag was found, the content tagged by the main topic tag in the underlying electronic documents, etc.

Figure 43:
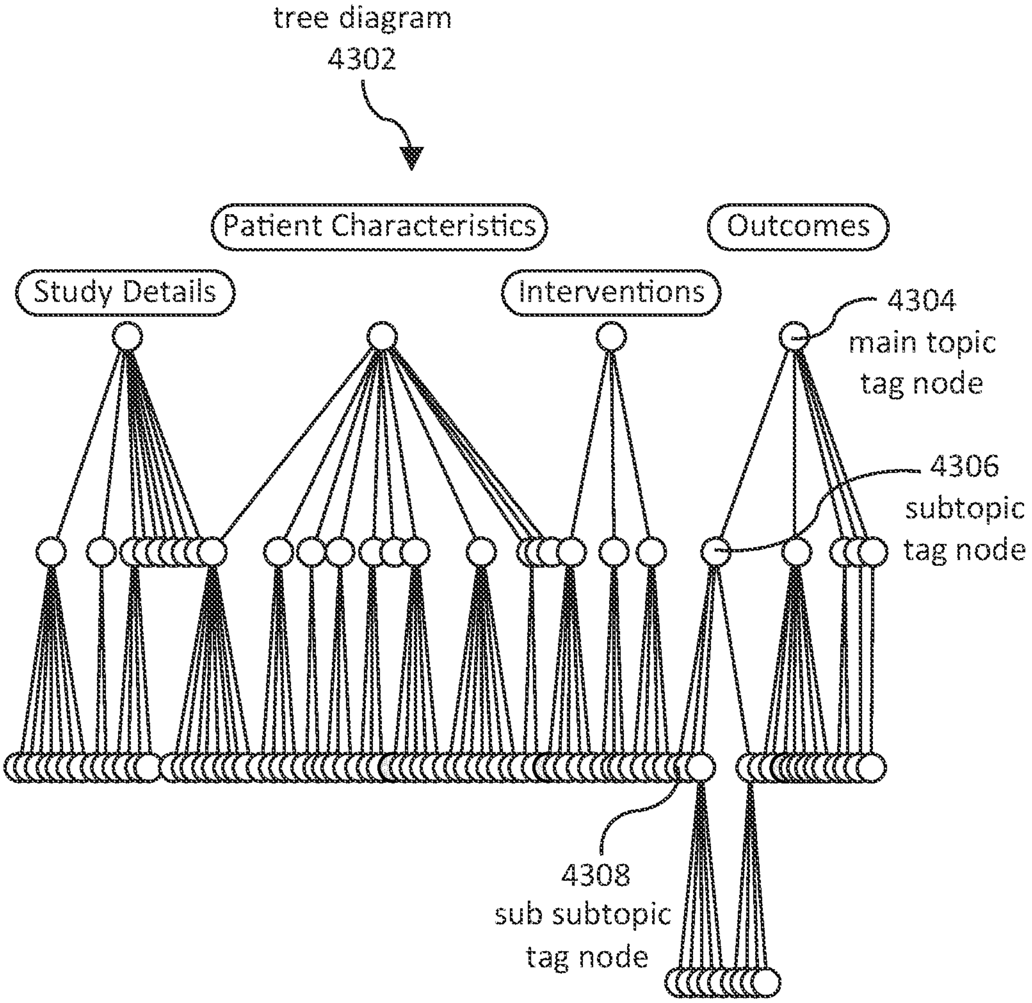
FIG. 43 illustrates a graphical representation of a tree diagram, in accordance with some examples of the present disclosure.

FIG. 43 illustrates a graphical representation of a tree diagram 4302 (also known as a dendrogram), according to some examples. The tree diagram 4302 can be a linear graph with multiple possible lines leading from each node capable of hierarchically displaying a relationship between a main topic tag node 4304 and a subtopic tag node 4306 when the subtopic is related in some manner to the main topic. As also illustrated by the tree diagram 4302, the levels of hierarchy can go further, including a sub subtopic tag node 4308 of the subtopic tag node 4306. As also illustrated but not labeled, the levels of hierarchy can go further still, including a sublevel beyond the sub subtopic tag node 4308. In fact, as many levels of hierarchical structure can be used as desired.

Through selecting a main topic tag node 4304, the tree diagram 4302 can focus, or center, on the selected main topic tag node 4304 such that it is positioned at the new "top" of the tree diagram 4302 and each of its associated subtopic tag nodes 4306 are beneath it, effectively "zooming in" on this main topic tag node 4304. In turn, a subtopic tag node can be selected such that it is positioned at the new "top" of the tree diagram 4302 and each of its associated sub subtopic nodes 4308 are beneath it. This "zooming in" can happen at any level of the hierarchy, and any level can be selected from the primary sunburst diagram.

Furthermore, clicking on any node within the sunburst diagram 4202 can provide information related to the topic the node is associated with. For example, selecting a main topic tag node can provide information regarding how the main topic tag was reported.

FIG. 44 illustrates a flowchart depicting a method of generating and displaying a hierarchical graphic representation of topics, according to some examples. The method can include depicting, via a sunburst diagram generator, a sunburst diagram (at step 4402*a*). In some examples, the method includes depicting, via a tree diagram generator, a tree diagram (at step 4402*b*). According to some examples, the method includes switching from the sunburst diagram to the tree diagram and vice versa (at step 4404).

The method can include associating a main topic tag node with a main topic tag and a subtopic tag node with a subtopic tag (at step 4406). In some examples, the method includes indicating, via the subtopic tag node, a frequency of appearance of the subtopic tag within an electronic document (at step 4408). When multiple electronic documents are present within the project, step 4408 can suggest indicating, via the subtopic tag node, a frequency of appearance of the subtopic tag across the multiple electronic documents.

According to some examples, the method includes indicating, via the subtopic tag node, the frequency of appearance of the subtopic tag relative to other subtopic tags related to the main topic tag (at step 4410). The method can include indicating, via a width of the subtopic tag node, the frequency of appearance of the subtopic tag relative to other subtopic tags related to the main topic tag (at step 4412).

In some examples, the method includes centering the subtopic tag via selecting the subtopic tag (at step 4414). According to some examples, the method includes indicating, via selecting the main topic tag node, how the main topic tag was reported (at step 4416). The method can include indicating, via selecting the subtopic tag node, how the subtopic tag was reported (at step 4418).

FIG. 45 illustrates a flowchart depicting a method of indicating tag frequency relationships, according to some examples. In some examples, the method includes associating a main topic tag node with a main topic tag and a subtopic tag node with a subtopic tag (as seen in step 4406 in FIG. 44 above). According to some examples, the method includes emphasizing the main topic in a conclusion via selecting the main topic tag node (at step 4502). The method can include emphasizing the subtopic in the conclusion via selecting the subtopic tag node (at step 4504).

In some examples, the method includes selecting, simultaneously, the main topic tag node and the subtopic tag node (at step 4506). According to some examples, the method includes indicating, via selecting the main topic tag node, if the main topic tag is frequently seen with the subtopic tag (at step 4508).

The method can include selecting, simultaneously, a first subtopic tag node and a second subtopic tag node (at step 4510). In some examples, the method includes indicating, via selecting the first subtopic tag node, if the first subtopic is frequently seen with the second subtopic (at step 4512).

Figure 46A:
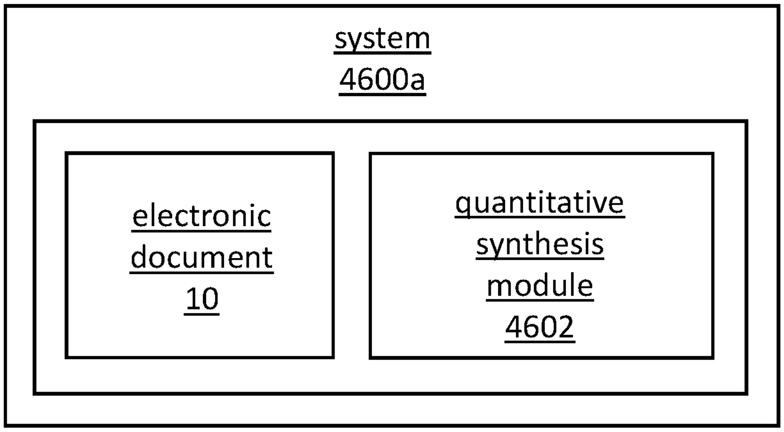
FIGS. 46A and 46B illustrate block diagrams of example aspects of example computing systems, in accordance with some examples of the present disclosure.

FIG. 46A illustrates a block diagram of a system 4600*a*. In some examples, system 4600*a* includes an electronic document 10 as shown and described in FIG. 1. Additionally, system 4600*a* can include a quantitative synthesis module 4602 configured to receive information pertaining the electronic document 10 and output such information in the form of more readily digestible form factors, such as graphic representations.

While FIG. 46A illustrates an electronic document 10, it is understood that multiple electronic documents can be included within system 4600*a*.

Figure 46B:
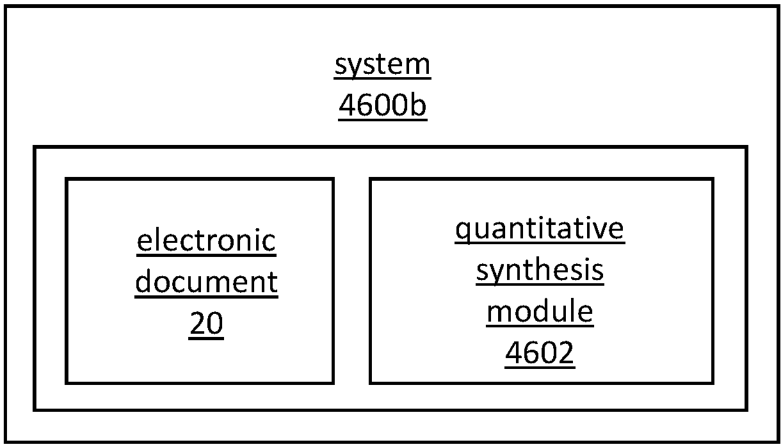

FIG. 46B illustrates a block diagram of a system 4600*b*. According to some examples, system 4600*b* includes an electronic document 20 as shown and described in FIG. 2. System 4600*b* can also include a quantitative synthesis module 4602 configured to receive information pertaining the electronic document 20 and output such information in the form of more readily digestible form factors, such as graphic representations.

While FIG. 46B illustrates an electronic document 20, it is understood that multiple electronic documents can be included within system 4600*b*.

FIGS. 56-63 below describe potential methods of using system 4600*a* and/or system 4600*b* as illustrated and described in FIGS. 46A and 46B.

Figure 47:
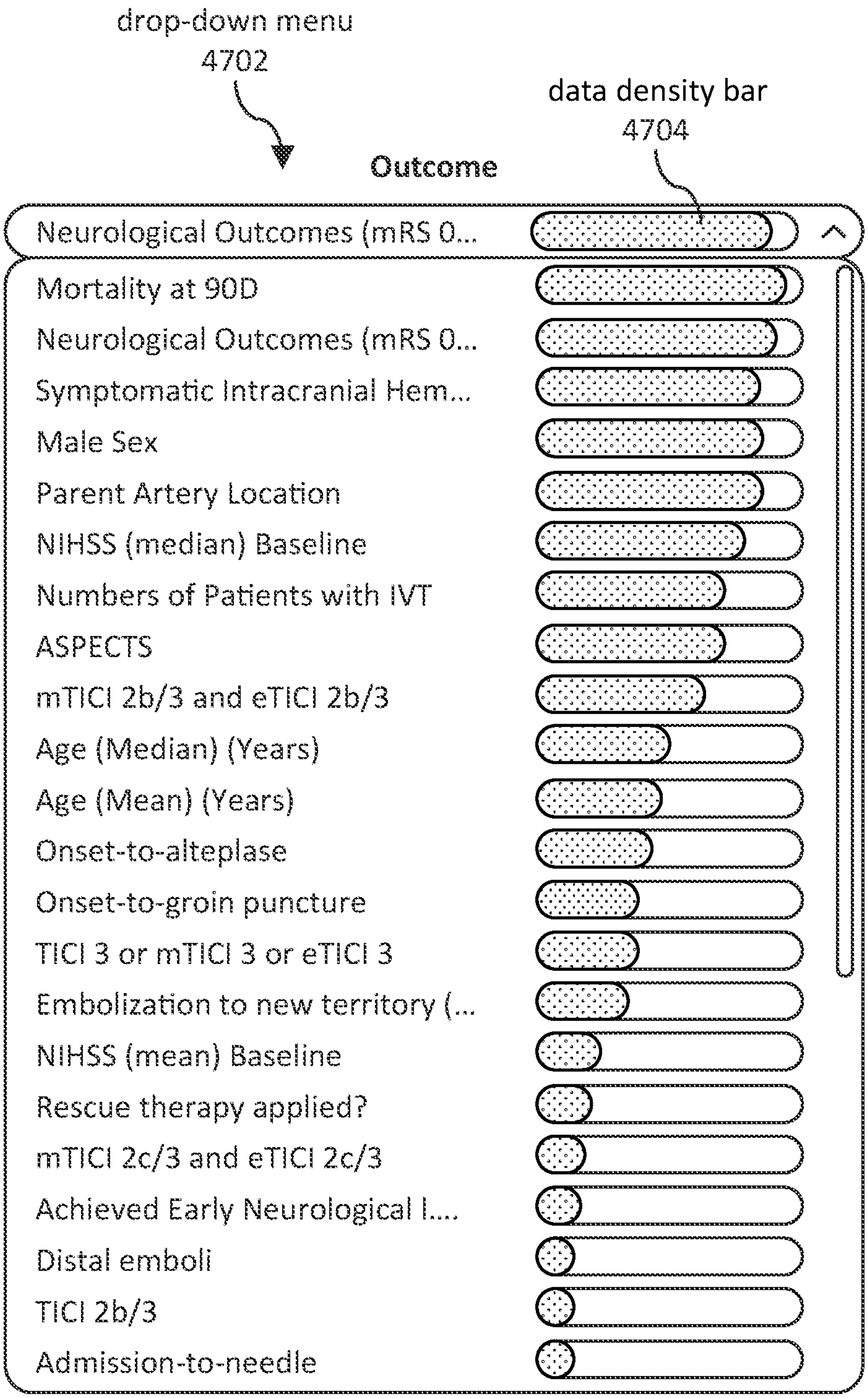
FIG. 47 illustrates a graphical representation of a dropdown menu, in accordance with some examples of the present disclosure.

FIG. 47 illustrates a graphical representation of a drop-down menu 4702, according to some examples. The drop-down menu 4702 can permit a user to select a topic or subtopic from a menu. The drop-down menu 4702 can be associated with a specific project, or multiple projects, or an electronic document including multiple works of art. Additionally, the drop-down menu 4702 can include a data density bar 4704 which indicates the percentage of studies within a project that include the selected topic or subtopic. The data density bar 4704 can further indicate information through the use of color, or darkness, or shading, etc.

Figure 48:
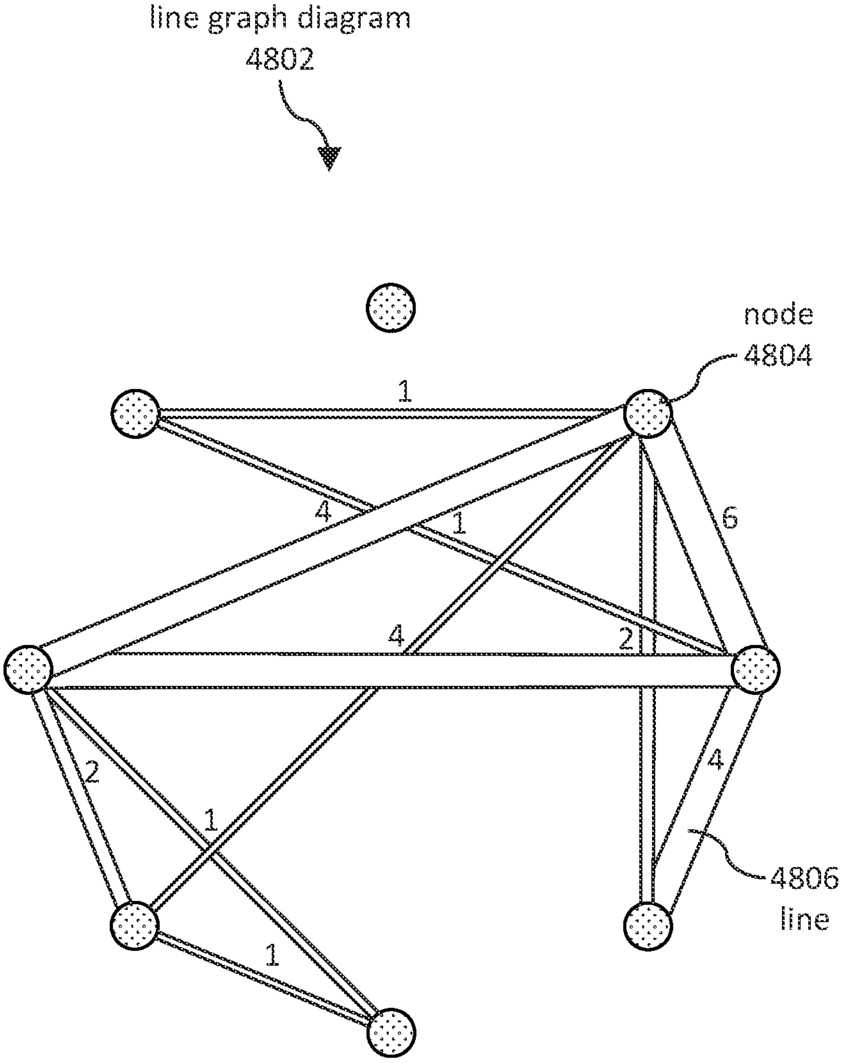
FIG. 48 illustrates a graphical representation of a line diagram, in accordance with some examples of the present disclosure.

FIG. 48 illustrates a graphical representation of a line diagram 4802 (also known as a network diagram), according to some examples. The line diagram 4802 can compare topics between projects, electronic documents, works of authorship, etc. The line diagram 4802 can be generated for any level within a hierarchy. In some examples, these topics are represented by nodes 4804. These nodes 4804 can be connected via lines 4806, indicating that the connected nodes are found in more than one project, electronic document, work of authorship, etc.

The lines 4806 can represent, in more than one way, the strength of connection between two topics (or number of works of authorship comparing two topics) with respect to multiple works of authorship (or projects, electronic documents, etc.). For example, a number over the line 4806 can indicate how many works of authorship connected two topics (and thus, formulated a correlation between these topics). The width of the line 4806 can also indicate such a connection between topics, with wider lines indicating more comparisons. The darkness, color, or shading of the line 4806 can also be used to display, at a glance, the strength of connection between these topics.

FIG. 49 illustrates a graphical representation of a matrix diagram 4902, according to some examples. The matrix diagram can be generated for any level within a hierarchy. In some examples, the matrix diagram 4902 includes topics along two sides, such that the intersections of these topics is represented by a cell 4904. This cell 4904 can then in turn provide an odds ratio between the two topics—that is, the odds that if one topic is observed in a work of authorship (or electronic document, project, etc.), then the other topic connected to the cell is also observed.

The cell 4904 itself can be attached to an exact odds ratio value. In some examples, the cell 4904 includes a color, and the color is capable of communicating a relative odds ratio (that is, relative to the surrounding cells 4904 odds ratios). According to some examples, the cell 4904 includes a scale of darkness, with darker cells 4904 indicating higher ratios. The system can also automatically calculate the percentage of variation across electronic documents that is due to heterogeneity rather than chance using an I-squared value, and present this I-squared value, interactively, to the user.

Figure 50:
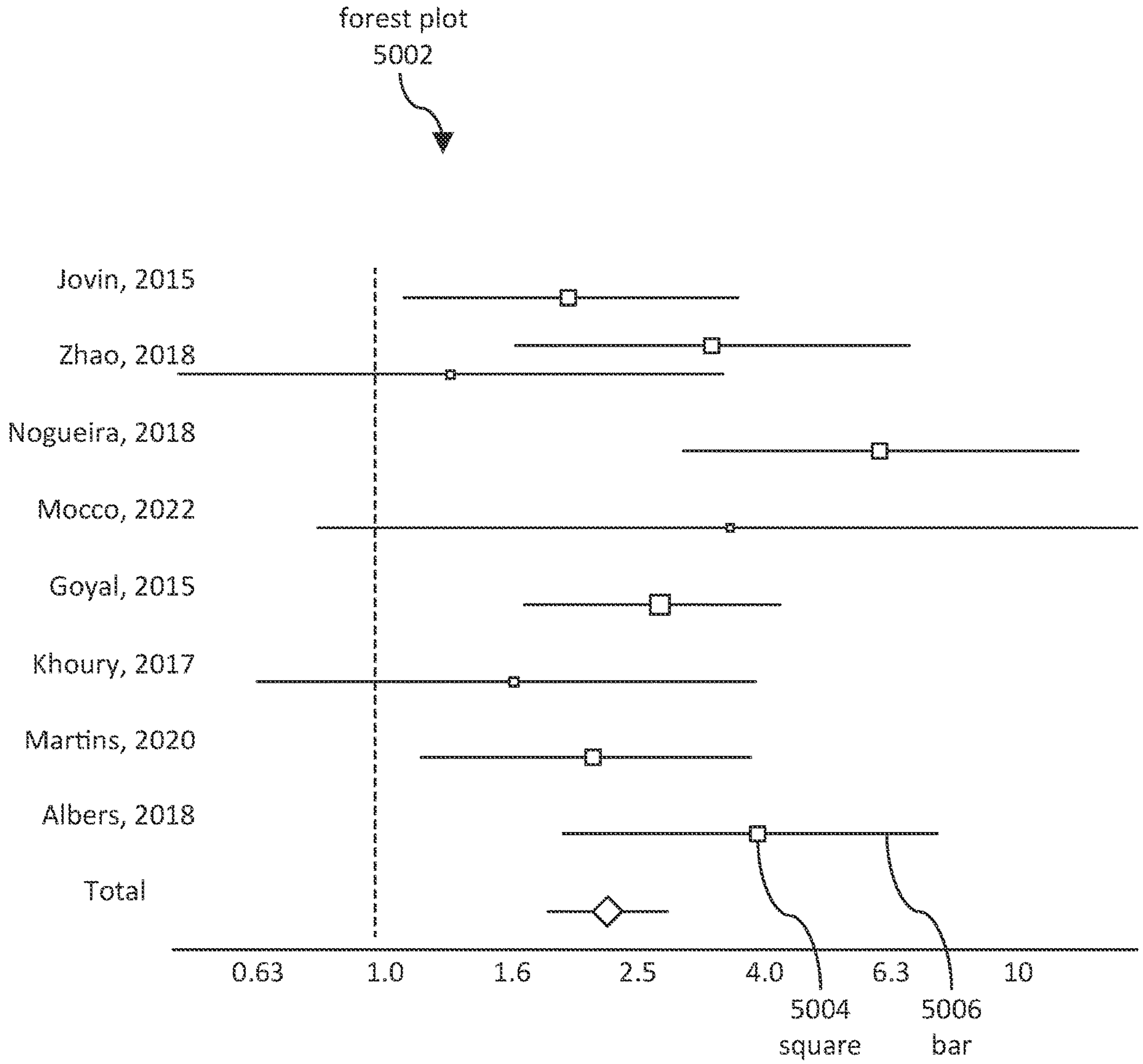
FIG. 50 illustrates a graphical representation of a forest plot, in accordance with some examples of the present disclosure.

FIG. 50 illustrates a graphical representation of a forest plot 5002, according to some examples. The forest plot can be generated for any level within a hierarchy, and can be generated for individual comparisons (i.e., separation of different tags). For any given work of authorship (or electronic document, or project, etc.) the forest plot 5002 can display an odds ratio between two topics (as illustrated by square 5004). The square 5004 is in turn surrounded on both sides by a bar 5006, which can indicate a ninety-five percent confidence interval for such an odds ratio. At the bottom, a cumulative total is shown, with this square 5004 (now turned on its side, or appearing as a diamond) indicating a cumulative odds ratio among all works of authorship (or electronic documents, or projects, etc.) along with the bar 5006 indicating a cumulative ninety-five percent confidence interval.

Figure 51:
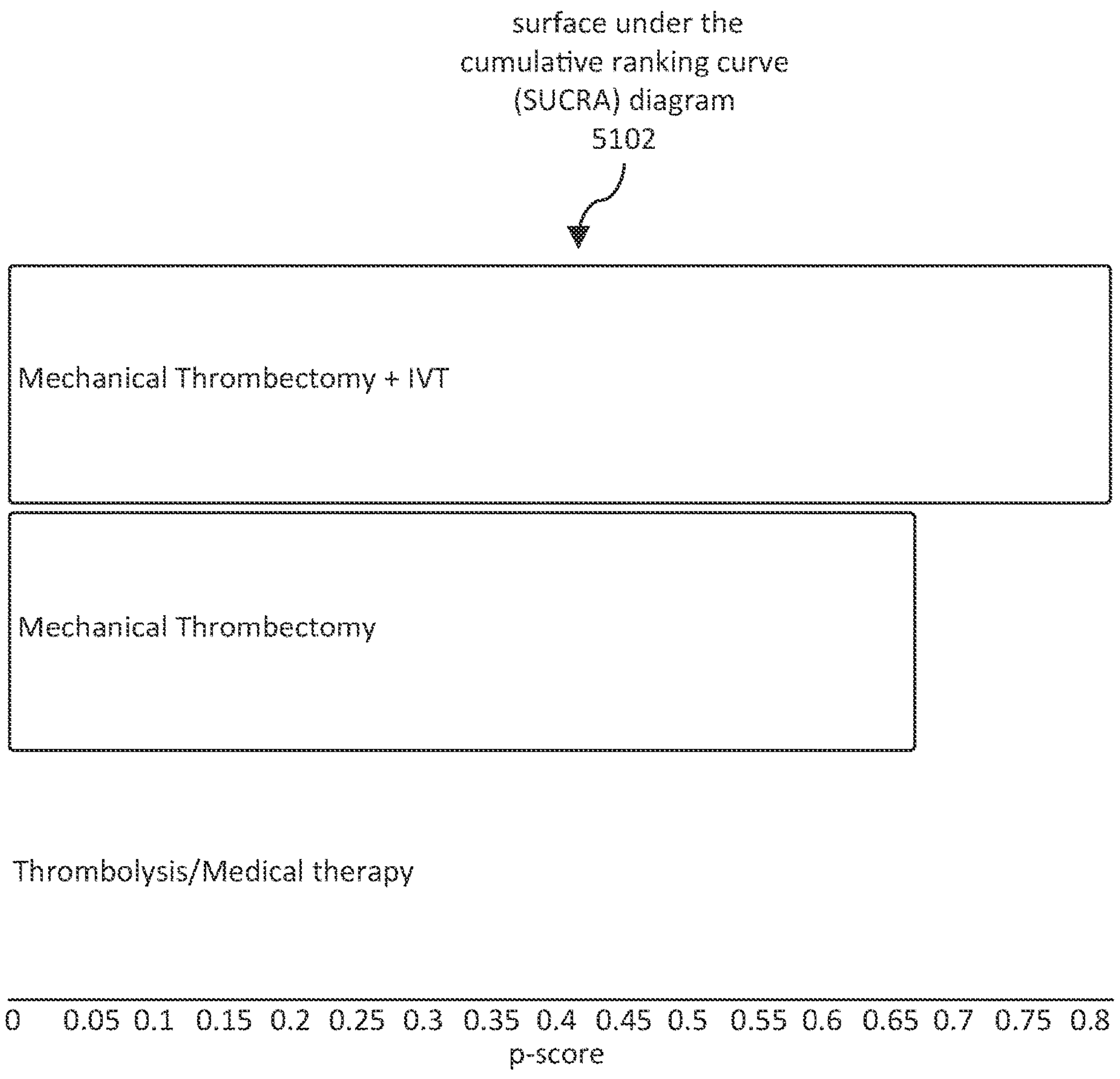
FIG. 51 illustrates a graphical representation of a surface under the cumulative ranking curve (SUCRA) diagram, in accordance with some examples of the present disclosure.

FIG. 51 illustrates a graphical representation of a surface under the cumulative ranking curve (SUCRA) diagram 5102, according to some examples. The SUCRA diagram 5102 can provide more general information than the forest plot 5002, comparing all topics to each other at once, rather than one topic to another topic. Effectively, the SUCRA diagram can show the ranking of all topics leading to one specific topic, along with an estimate for the likelihood of each of these topics leading to said one specific topic.

Figure 52:
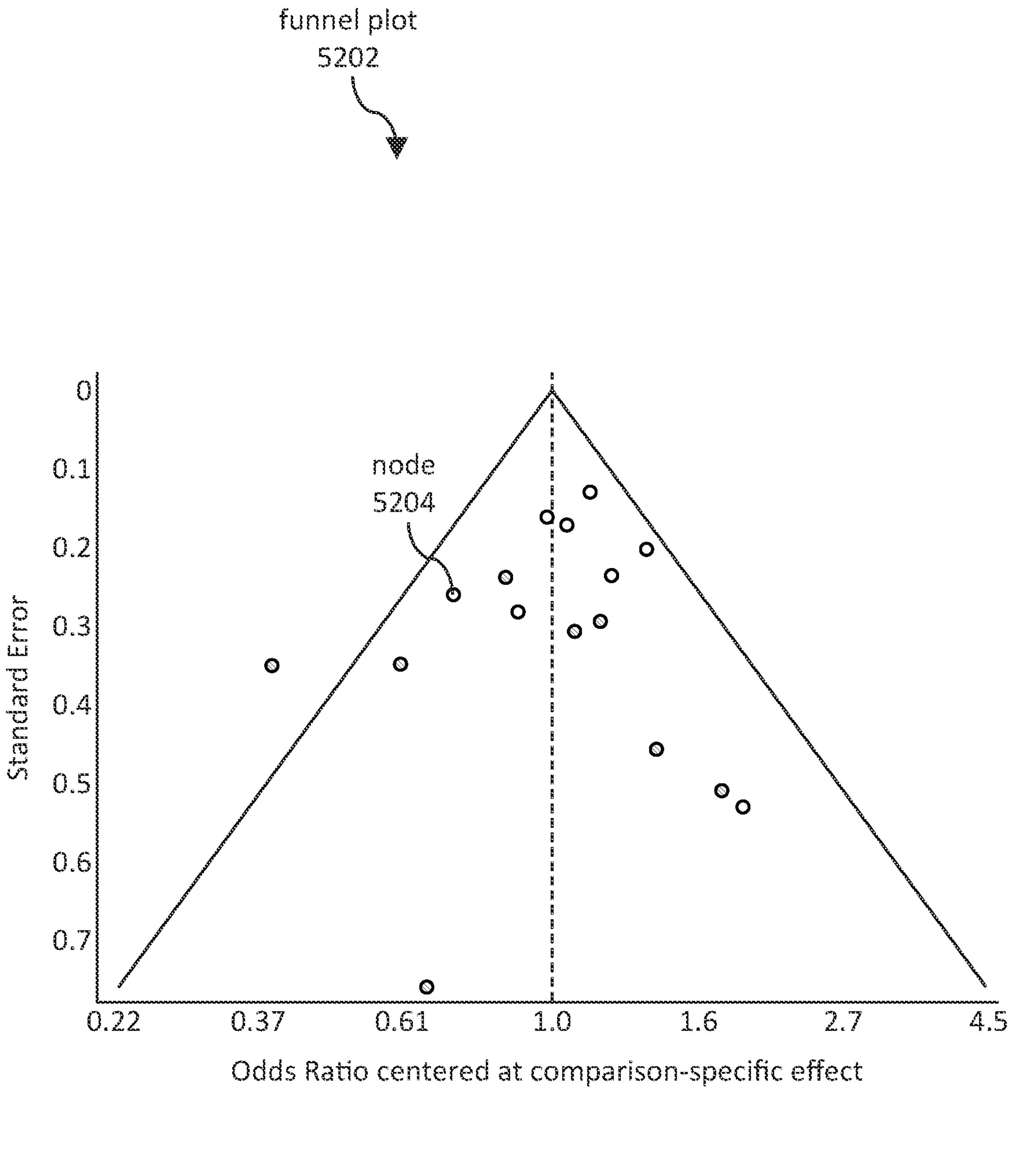
FIG. 52 illustrates a graphical representation of a funnel plot, in accordance with some examples of the present disclosure.

FIG. 52 illustrates a graphical representation of a funnel plot 5202, according to some examples. The funnel plot 5202 can display a logarithmic graph of the odds ratios from the underlying works of authorship (electronic documents, projects, etc.) against the inverse standard error. In some examples, in the funnel plot 5202, each work of authorship is plotted as a node 5204. According to some examples, larger works of authorship will be closer to the top of the funnel plot 5202, and works of authorship with greater variance from the composite odds ratio will be further away from the center of the funnel plot 5202.

Because different topics can be compared with each other in a funnel plot 5202, the nodes 5204 can be displayed as different colors. Additionally, a triangle is formed on the funnel plot 5202, which can indicate the estimated range in which ninety-five percent of works of authorship are expected to be found.

Figure 53:
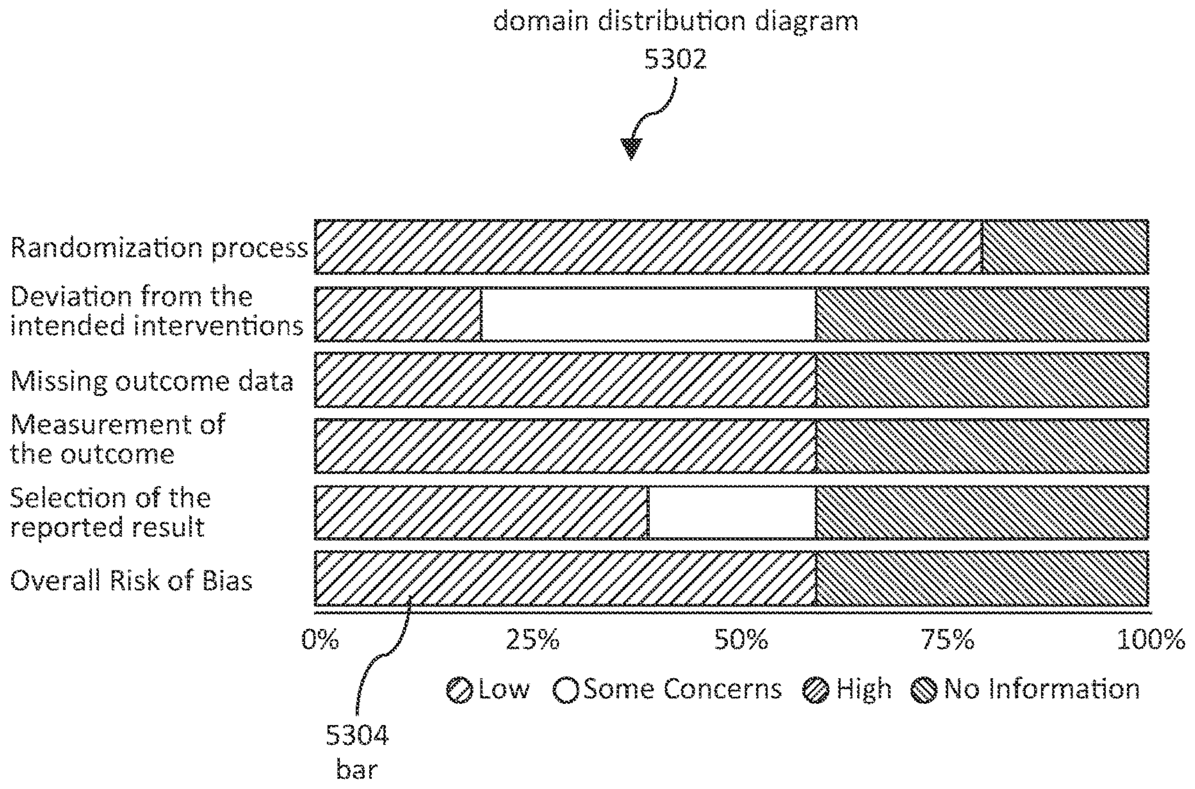
FIG. 53 illustrates a graphical representation of a domain distribution diagram, in accordance with some examples of the present disclosure.

FIG. 53 illustrates a graphical representation of a domain distribution diagram 5302, according to some examples. In some examples, risk of bias of a work of authorship, electronic document, project, etc. are provided. This risk of bias can be created through the use of surveys, or questionnaires, about which users will answer questions (i.e., questions about the underlying electronic documents or works of authorship). These questions can include questions about the randomization process, deviation from the intended interventions (in the case of medical use), missing outcome data, measurement of the outcome, selection of the reported result, overall risk of bias, etc.

The domain distribution diagram 5302 can include bars 5304 alongside each of the answered questions, giving a percentage of the results of the risk of bias survey. These results can be presented as "low," "some concern," "high," and "no information" or "not enough information." These different results can include different colors, shading, or darkness in order to quickly tell them apart from each other. The amount of the bar 5304 filled up with each color, shade, or darkness level can indicate the percentage of works of authorship (electronic documents, projects, etc.) that fall into each response category for each question. As such, according to some examples, the domain distribution diagram 5302 can present an overarching risk of bias analyses for the entirety of the works of authorship (electronic documents, projects, etc.)

Figure 54:
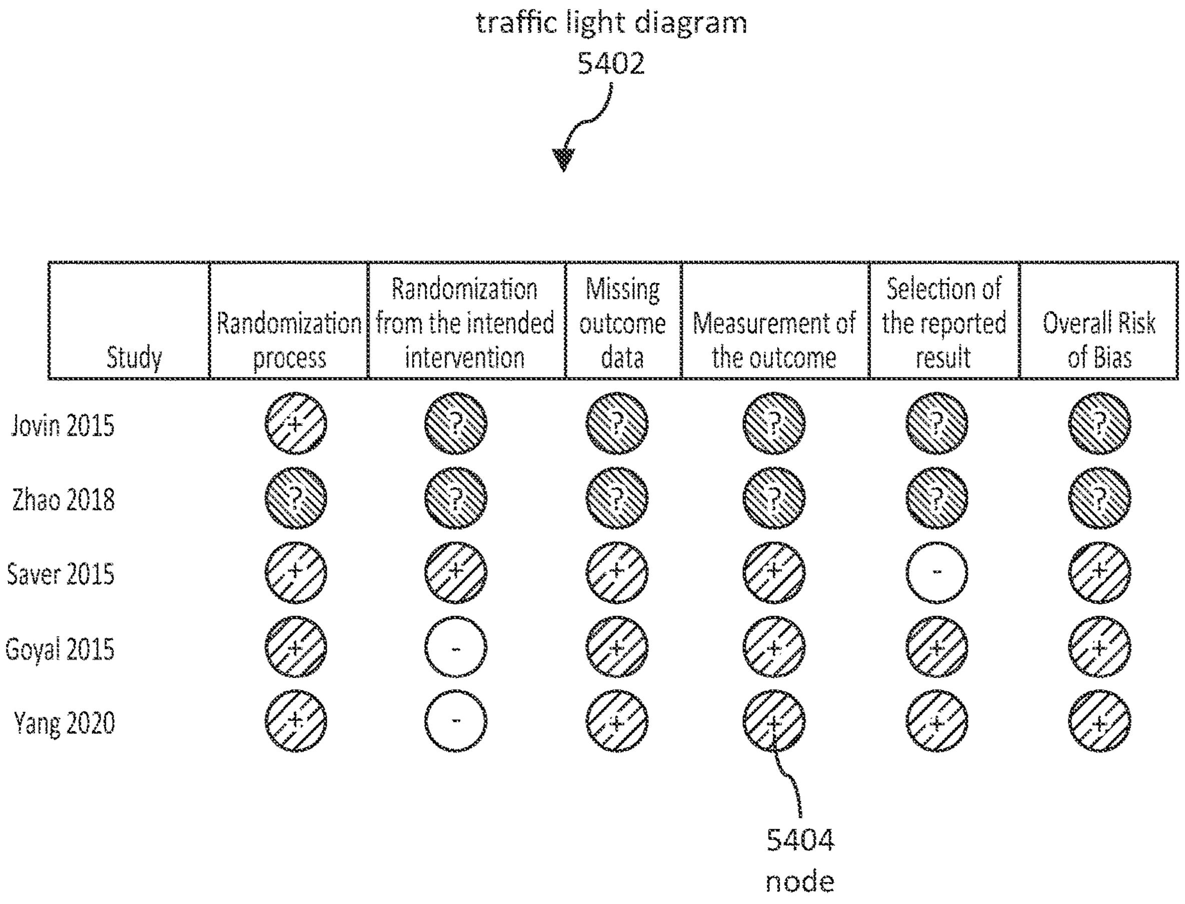
FIG. 54 illustrates a graphical representation of a traffic light diagram, in accordance with some examples of the present disclosure.

FIG. 54 illustrates a graphical representation of a traffic light diagram 5402, according to some examples. In some examples, the traffic light diagram 5402 shows the risk of bias of a work of authorship, electronic document, or project at an individual level—that is to say that the risk of bias is isolated to a single reference. This risk of bias can be created through the use of surveys, or questionnaires, which users will answer questions about. These questions can include questions about the randomization process, deviation from the intended interventions (in the case of medical use), missing outcome data, measurement of the outcome, selection of the reported result, overall risk of bias, etc.

The traffic light diagram 5402 can include nodes 5404 alongside each individual work of authorship (electronic document, project, etc.) These nodes 5404 can represent results of the risk of bias survey. These results can be presented as "low," "some concern," "high," and "no information" or "not enough information." These different results can include different colors, shading, or darkness in order to quickly tell them apart from each other. The nodes 5404 can further differentiate different answers by using symbols to display at a glance answers—such as a "+" for low risk, a "–" for some concern, an "x" for high risk, and a "?" for no information.

In both FIGS. 53 and 54, the domain distribution diagram 5302 and traffic light diagram 5402 are automatically populated when answers to a risk of bias survey are provided. This can facilitate the collection and presentation of risk of bias data while taking a burden off of a user.

Figure 55:
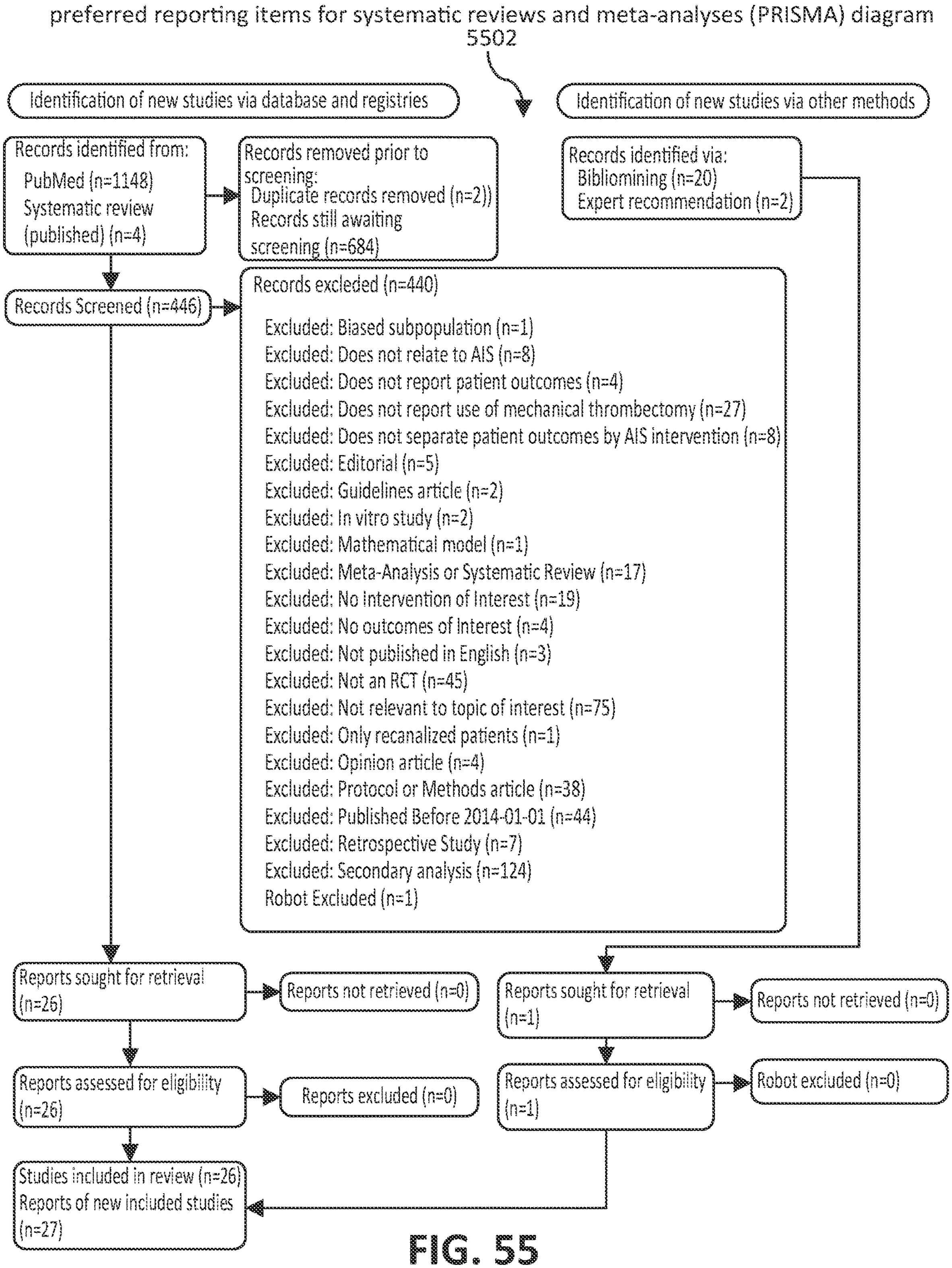
FIG. 55 illustrates a graphical representation of a preferred reporting items for systematic reviews and meta-analyses (PRISMA) diagram, in accordance with some examples of the present disclosure.

FIG. 55 illustrates a graphical representation of a preferred reporting items for systematic reviews and meta-analyses (PRISMA) diagram 5502, according to some examples. According to some examples, the PRISMA diagram 5502 illustrates the flow of works of authorship (electronic documents, projects, etc.) For example, after searching through databases or indices, duplicate references are removed. Any results that were excluded can be viewable in the PRISMA diagram 5502. In some examples, this PRISMA diagram 5502 illustrates any action taken in a project or on a work of authorship, electronic document, or project, etc.

The PRISMA diagram 5502 can be updated in real-time. In some examples, the PRISMA diagram 5502 can be viewed as it would have appeared at any point in time, showing snapshots of a project throughout its history. Effectively, this means that when new references are added automatically to a project as detailed throughout this disclosure, users can see the status of the project before and after the new references were added, and any information tied to these new references automatically update the PRISMA diagram 5502.

Figure 56:
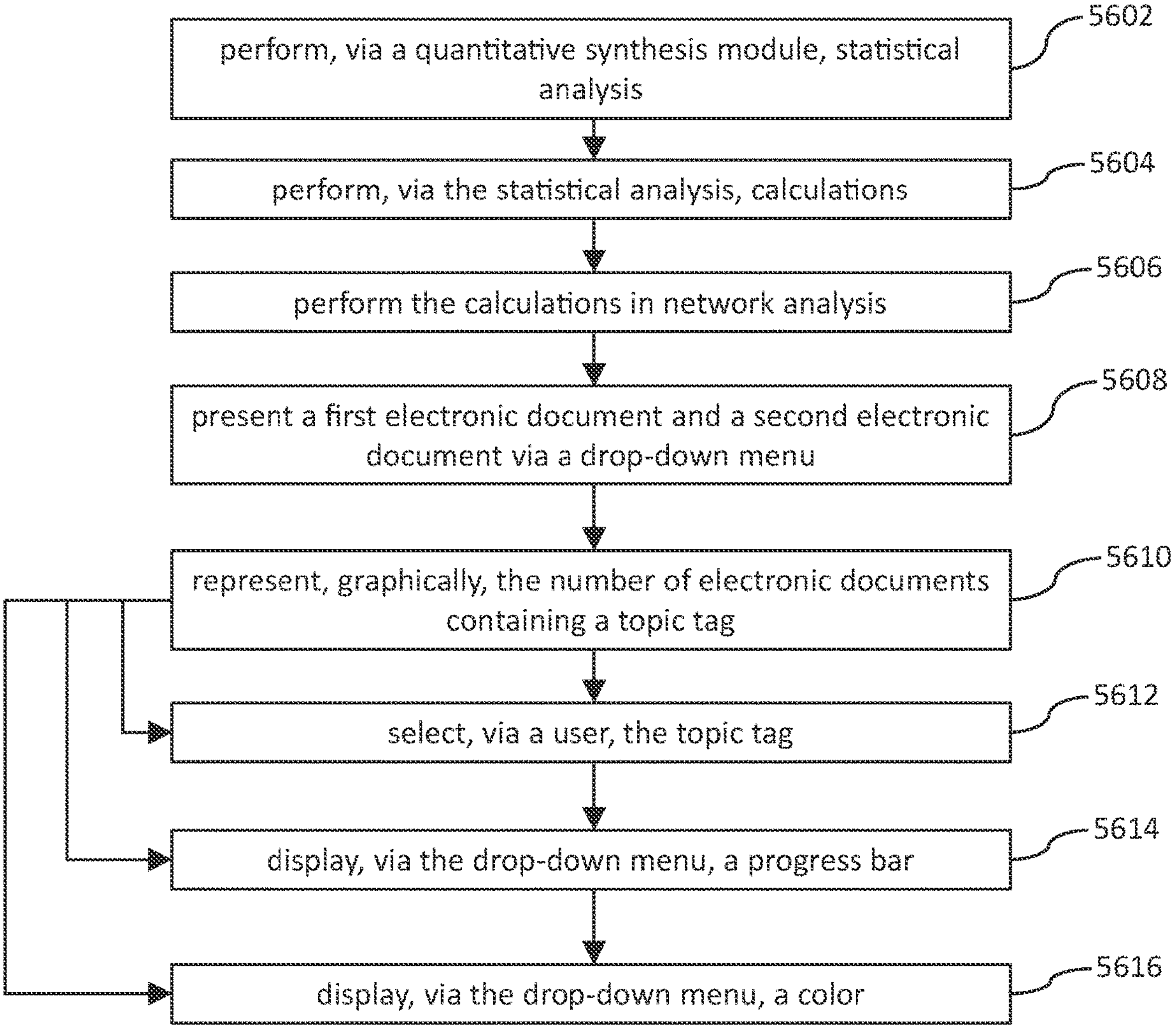
FIGS. 56 to 65 illustrate example methods, in accordance with some examples of the present disclosure.

FIG. 56 illustrates a flowchart depicting a method of displaying information on a drop-down menu, according to some examples. In some examples, the method includes performing, via a quantitative synthesis module, statistical analysis (at step 5602). According to some examples, the method includes performing, via the statistical analysis, calculations (at step 5604). The method can include performing the calculations in network analysis (at step 5606).

In some examples, the method includes presenting a first electronic document and a second electronic document via a drop-down menu (at step 5608). According to some examples, the method includes representing, graphically, the number of electronic documents containing a topic tag (at step 5610).

The method can include selecting, via a user, the topic tag (at step 5612). In some examples, the method includes displaying, via the drop-down menu, a data density bar (at step 5614). According to some examples, the method includes displaying, via the drop-down menu, a color (at step 5616).

Figure 57:
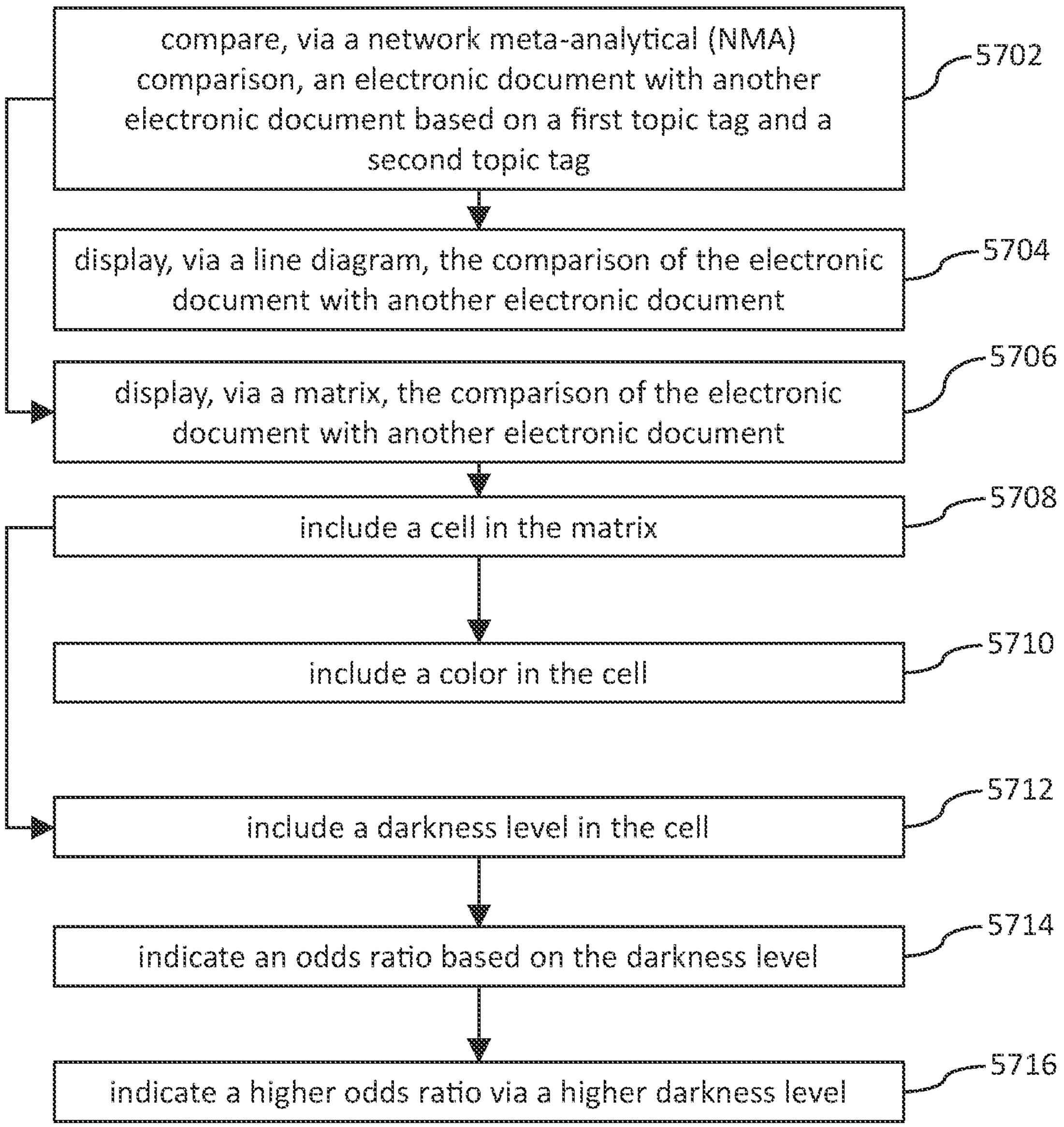

FIG. 57 illustrates a flowchart depicting a method of presenting information in a matrix, according to some examples. The method can include comparing, via a network meta-analytical (NMA) comparison, an electronic document with another electronic document based on a first topic tag and a second topic tag (at step 5702). In some examples, the method includes displaying via a line diagram, the comparison of the electronic document with another electronic document (at step 5704).

According to some examples, the method includes displaying, via a matrix, the comparison of the electronic document with another electronic document (at step 5706). The method can include including a cell in the matrix (at step 5708). In some examples, the method includes including a color in the cell (at step 5710).

According to some examples, the method includes including a darkness level in the cell (at step 5712). The method can include indicating an odds ratio based on the darkness level (at step 5714). In some examples, the method includes indicating a higher odds ratio via a higher darkness level (at step 5716).

Figure 58:
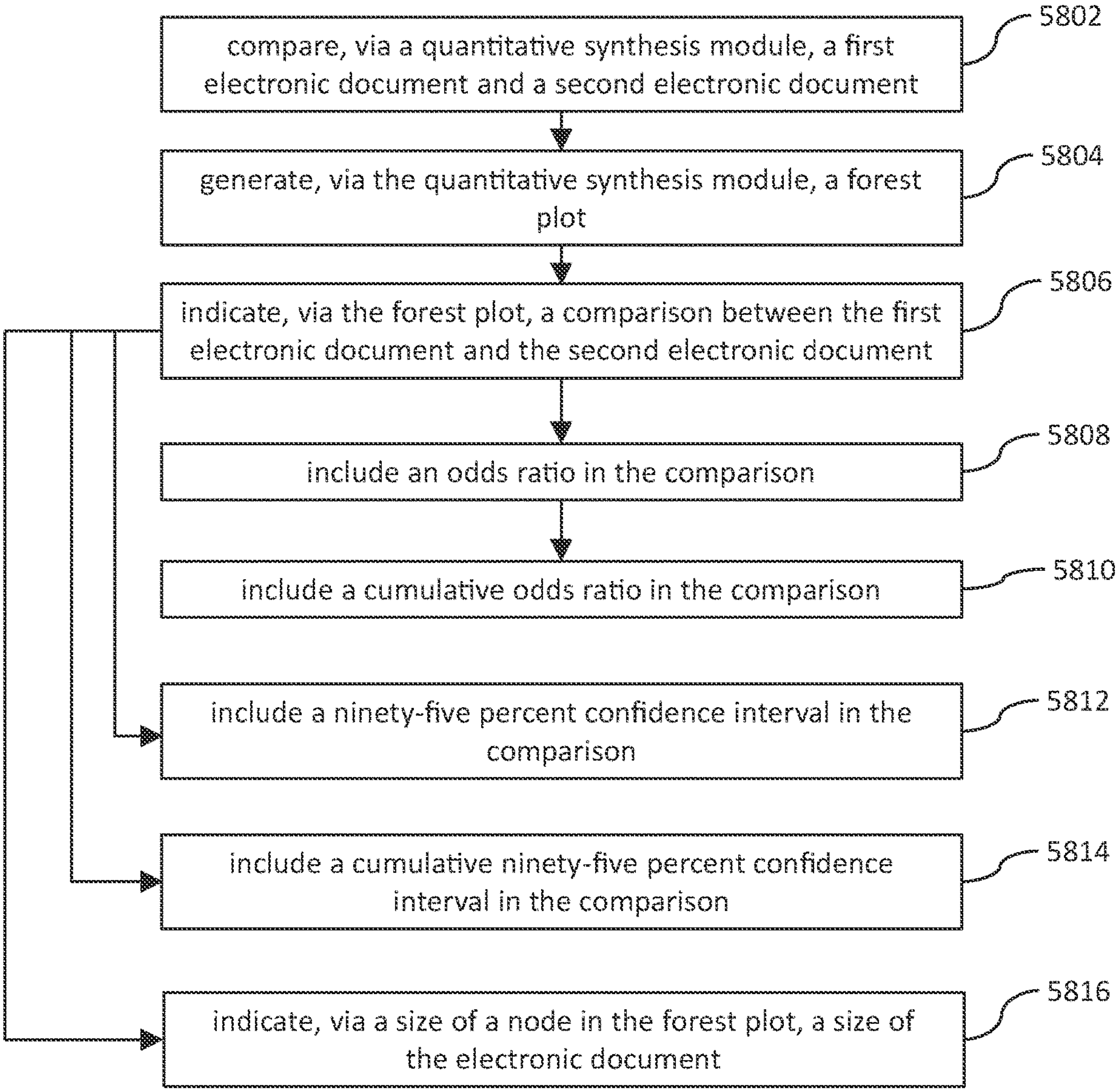

FIG. 58 illustrates a flowchart depicting a method of presenting information in a forest plot, according to some examples. The method can include comparing, via a quantitative synthesis module, a first electronic document and a second electronic document (at step 5802). In some examples, the method includes generating, via the quantitative synthesis module, a forest plot (at step 5804).

According to some examples, the method includes indicating, via the forest plot, a comparison between the first electronic document and the second electronic document (at step 5806). The method can include including an odds ratio in the comparison (at step 5808). In some examples, the method includes including a cumulative odds ratio in the comparison (at step 5810).

According to some examples, the method includes including a ninety-five percent confidence interval in the comparison (at step 5812). The method can include including a cumulative ninety-five percent confidence interval in the comparison (at step 5814). In some examples, the method includes indicating, via a size of a node in the forest plot, a size of the electronic document (at step 5816).

Figure 59:
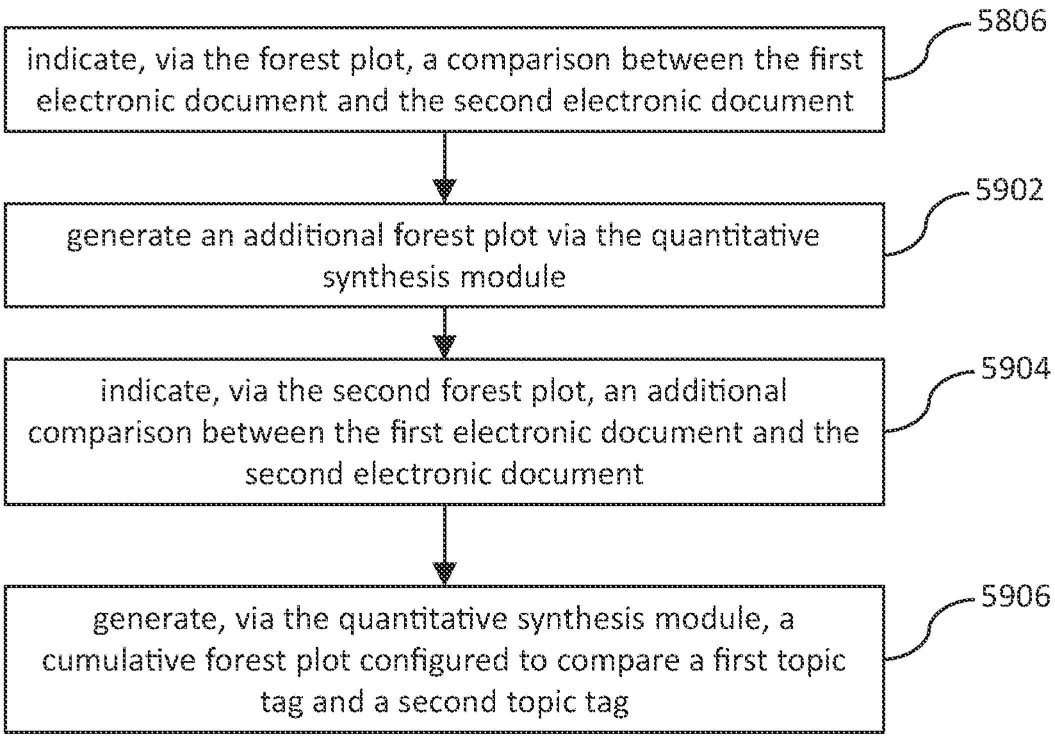

FIG. 59 illustrates a flowchart depicting another method of presenting information in a forest plot, according to some examples. The method can include indicating, via the forest plot, a comparison between the first electronic document and the second electronic document (as seen in step 5806 in FIG. 58 above). In some examples, the method includes generating an additional forest plot via the quantitative synthesis module (at step 5902).

According to some examples, the method includes indicating, via the second forest plot, an additional comparison between the first electronic document and the second electronic document (at step 5904). The method can include generating, via the quantitative synthesis module, a cumulative forest plot configured to compare a first topic tag and a second topic tag (at step 5906).

Figure 60:
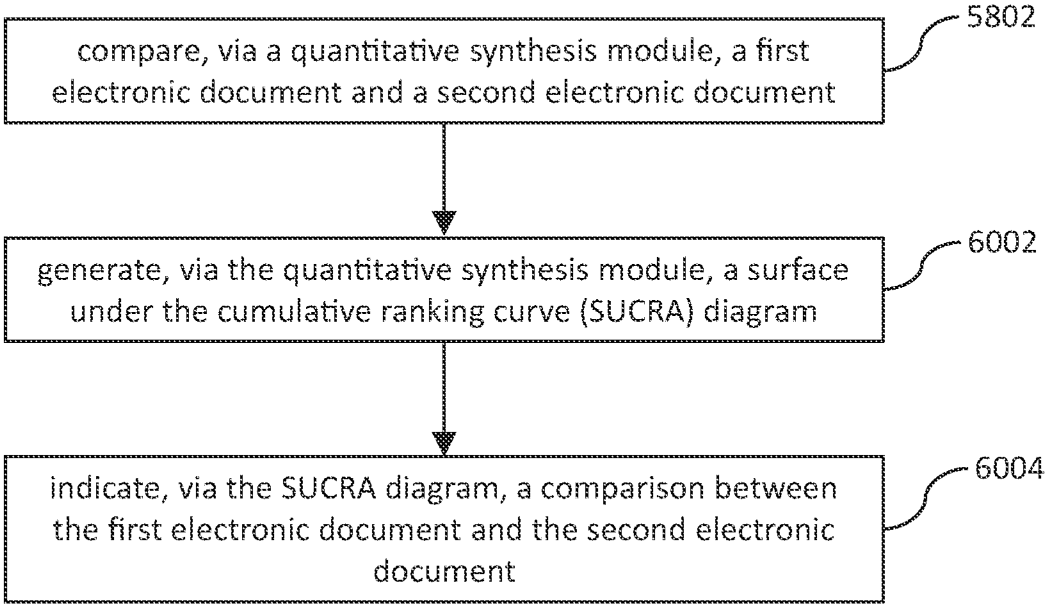

FIG. 60 illustrates a flowchart depicting a method of presenting information in a SUCRA diagram. In some examples, the method includes comparing, via a quantitative synthesis module, a first electronic document and a second electronic document (as seen in step 5802 in FIG. 58 above). According to some examples, the method includes generating, via the quantitative synthesis module, a SUCRA diagram (at step 6002). The method can include indicating, via the SUCRA diagram, a comparison between the first electronic document and the second electronic document (At step 6004).

Figure 61:
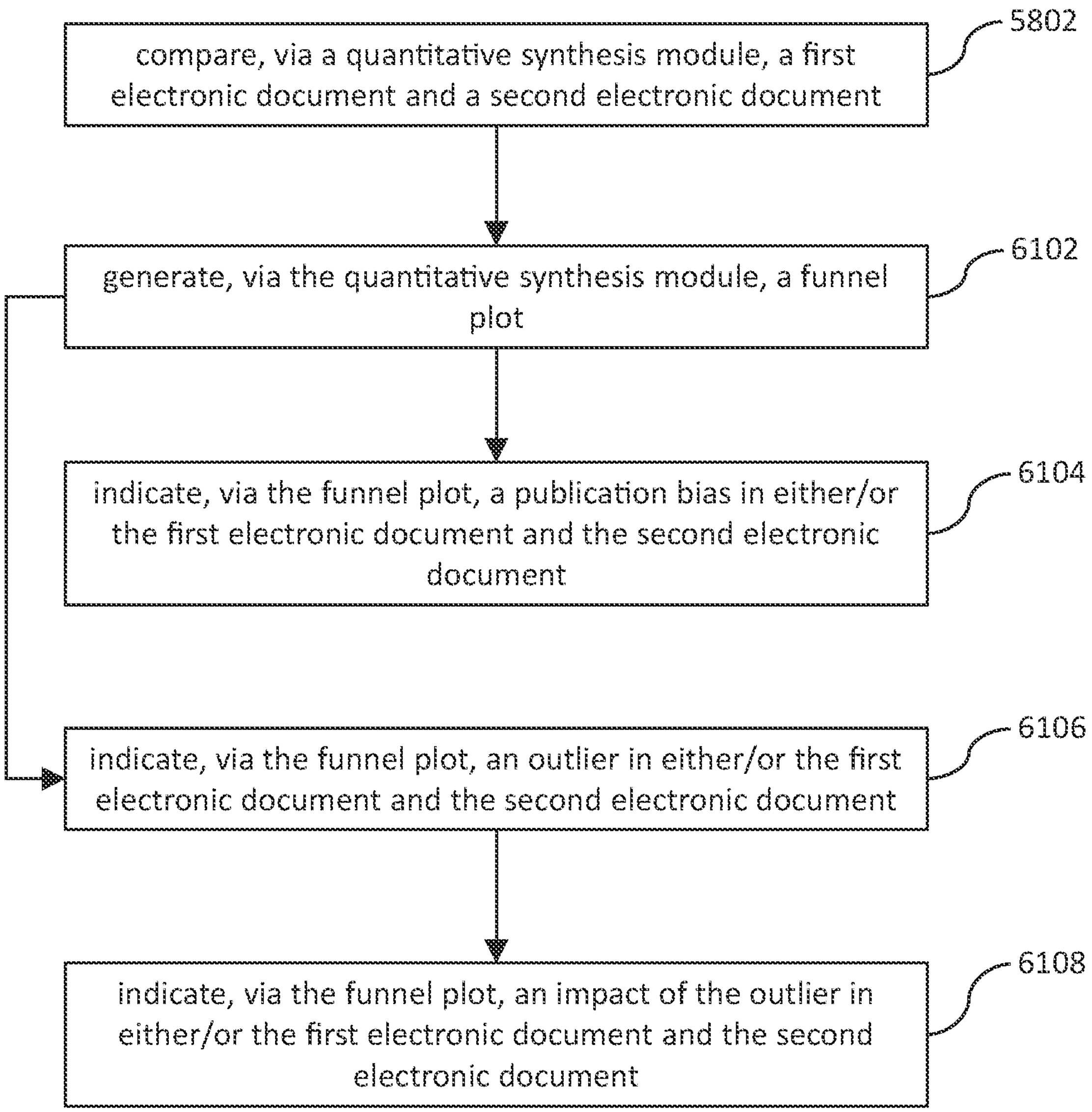

FIG. 61 illustrates a flowchart depicting a method of presenting information in a funnel plot, according to some examples. In some examples, the method includes comparing, via a quantitative synthesis module, a first electronic document and a second electronic document (as seen in step 5802 in FIG. 58 above). According to some examples, the method includes generating, via the quantitative synthesis module, a funnel plot (at step 6102). The method can include indicating, via the funnel plot, a publication bias in either/or the first electronic document and the second electronic document (at step 6104).

In some examples, the method includes indicating, via the funnel plot, an outlier in either/or the first electronic document and the second electronic document (at step 6106). According to some examples, the method includes indicating, via the funnel plot, an impact of the outlier in either/or the first electronic document and the second electronic document (at step 6108).

Figure 62:
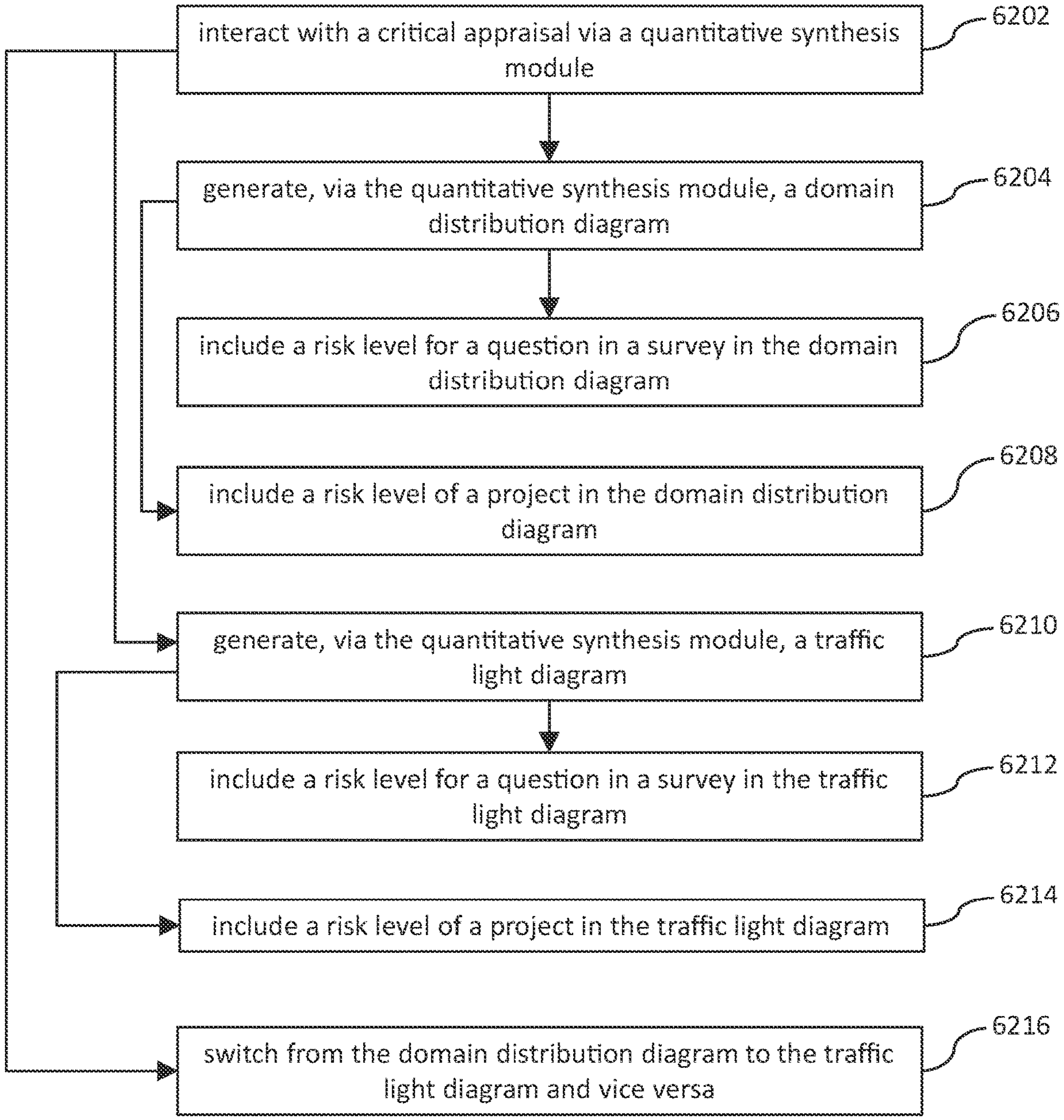

FIG. 62 illustrates a flowchart depicting a method of providing critical appraisal in a project, according to some examples. The method can include interacting with a critical appraisal via a quantitative synthesis module (at step 6202). In some examples, the method includes generating, via the quantitative synthesis module, a domain distribution diagram (at step 6204).

According to some examples, the method includes including a risk level for a question in a survey in the domain distribution diagram (at step 6206). The method can include including a risk level of a project in the domain distribution diagram (at step 6208).

In some examples, the method includes generating, via the quantitative synthesis module, a traffic light diagram (at step 6210). According to some examples, the method includes including a risk level for a question in a survey in the traffic light diagram (at step 6212).

The method can include including a risk level of a project in the traffic light diagram (at step 6214). In some examples, the method includes switching from the domain distribution diagram to the traffic light diagram and vice versa (at step 6216).

Figure 63:
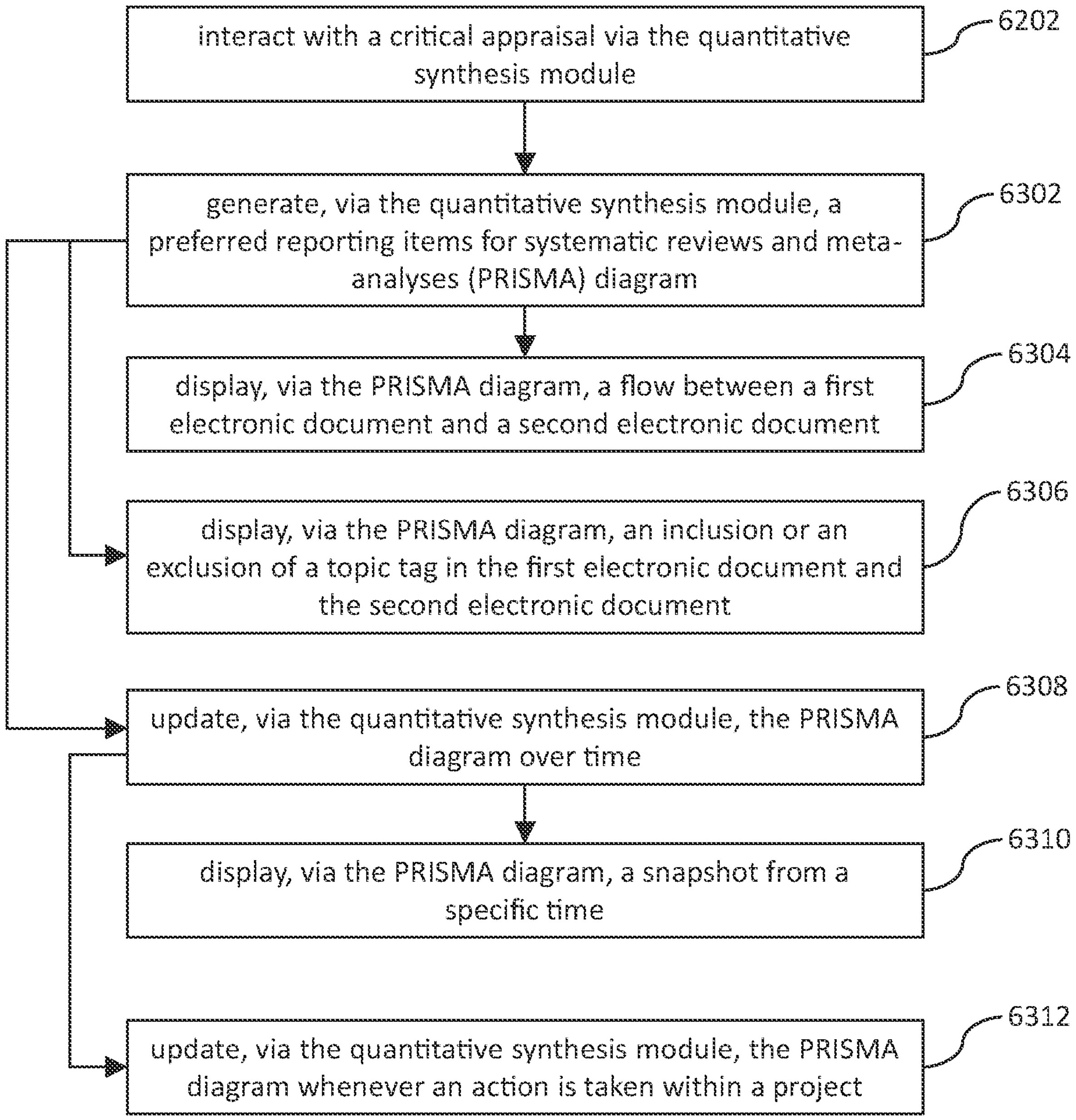

FIG. 63 illustrates a flowchart depicting a method of presenting information in a PRISMA diagram, according to some examples. The method can include interacting with a critical appraisal via the quantitative synthesis module (as seen in step 6202 in FIG. 62 above). In some examples, the method includes generating, via the quantitative synthesis module, a PRISMA diagram (at step 6302).

According to some examples, the method includes displaying, via the PRISMA diagram, a flow between a first electronic document and a second electronic document (at step 6304). The method can include displaying, via the PRISMA diagram, an inclusion or an exclusion of a topic tag in the first electronic document and the second electronic document (at step 6306).

In some examples, the method includes updating, via the quantitative synthesis module, the PRISMA diagram over time (at step 6308). According to some examples, the method includes displaying, via the PRISMA diagram, a snapshot from a specific time (at step 6310). The method can include updating, via the quantitative synthesis module, the PRISMA diagram whenever an action is taken within a project (at step 6312).

Figure 64:
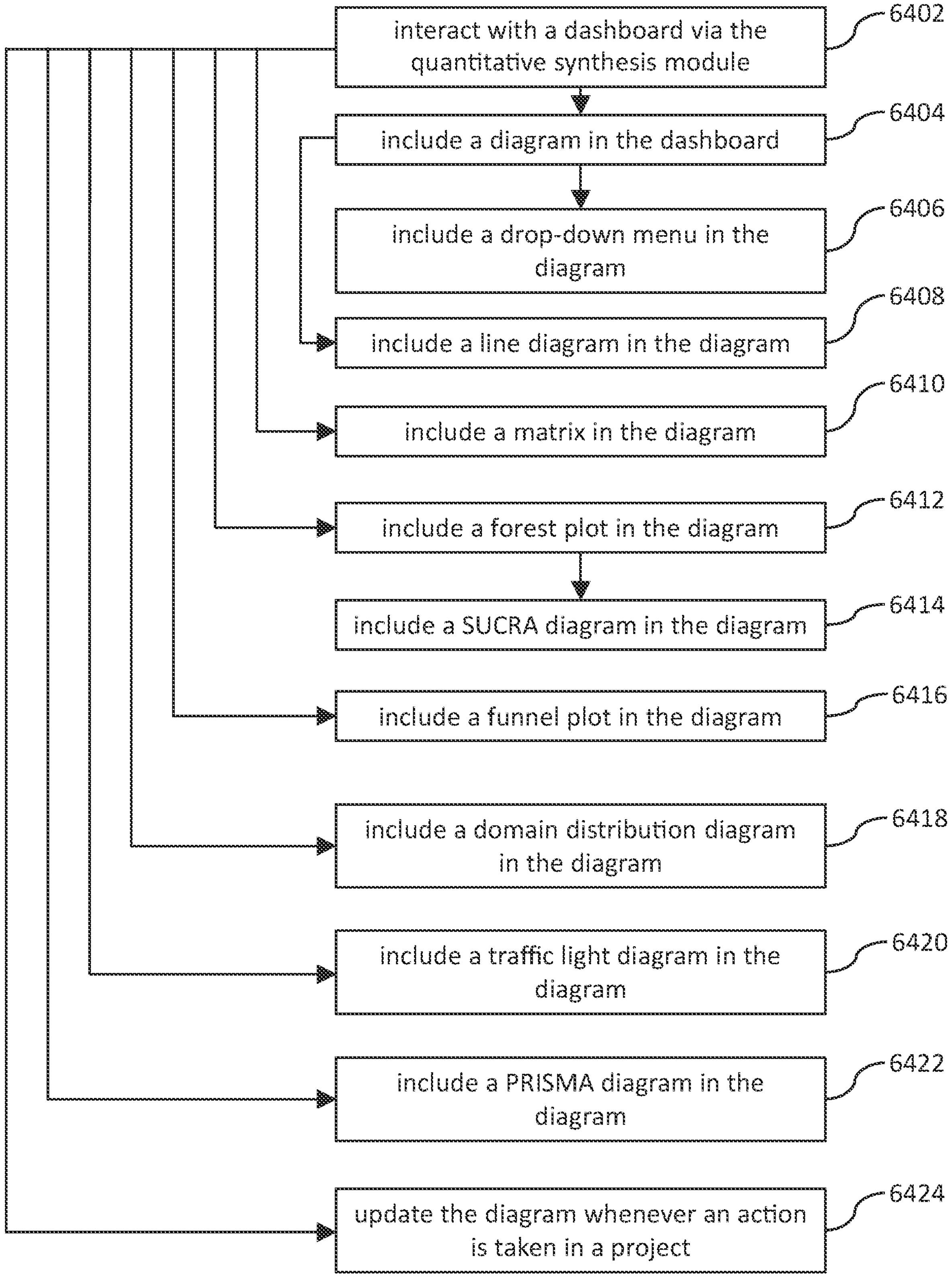

FIG. 64 illustrates a flowchart depicting a method of presenting information on a dashboard, according to some examples. In some examples, the method includes interacting with a dashboard via the quantitative synthesis module (at step 6402). According to some examples, the method includes including a diagram in the dashboard (at step 6404).

The method can include including a drop-down menu in the diagram (at step 6406). This can be the drop-down menu as shown in FIG. 47 and/or described in FIG. 56. In some examples, the method includes including a line diagram in the diagram (at step 6408). This can be the line diagram as shown in FIG. 48 and/or described in FIG. 57. According to some examples, the method includes including a matrix in the diagram (at step 6810). This can be the matrix as shown in FIG. 49 and/or described in FIG. 57.

The method can include including a forest plot in the diagram (at step 6412). This can be the forest plot as shown in FIG. 50 and/or described in FIGS. 58 and 59. In some examples, the method includes including a SUCRA diagram in the diagram (at step 6414). This can be the SUCRA diagram as shown in FIG. 51 and/or described in FIG. 60. The method can include including a funnel plot in the diagram (at step 6416). This can be the funnel plot as shown in FIG. 52 and/or described in FIG. 61.

According to some examples, the method includes including a domain distribution diagram in the diagram (at step 6418). This can be the domain distribution diagram as shown in FIG. 53 and/or described in FIG. 62. The method can include including a traffic light diagram in the diagram (at step 6420). This can be the traffic light diagram as shown in FIG. 54 and/or described in FIG. 62

In some examples, the method includes including a PRISMA diagram in the diagram (at step 6422). This can be the PRISMA diagram as shown in FIG. 54 and/or described in FIG. 63. According to some examples, the method includes updating the diagram whenever an action is taken in a project (at step 6424). Any and or all of the diagrams as disclosed in FIG. 64 can be updated over time. These updates can occur automatically after a predetermined time interval has occurred and/or after each action taken within a project.

Figure 65:
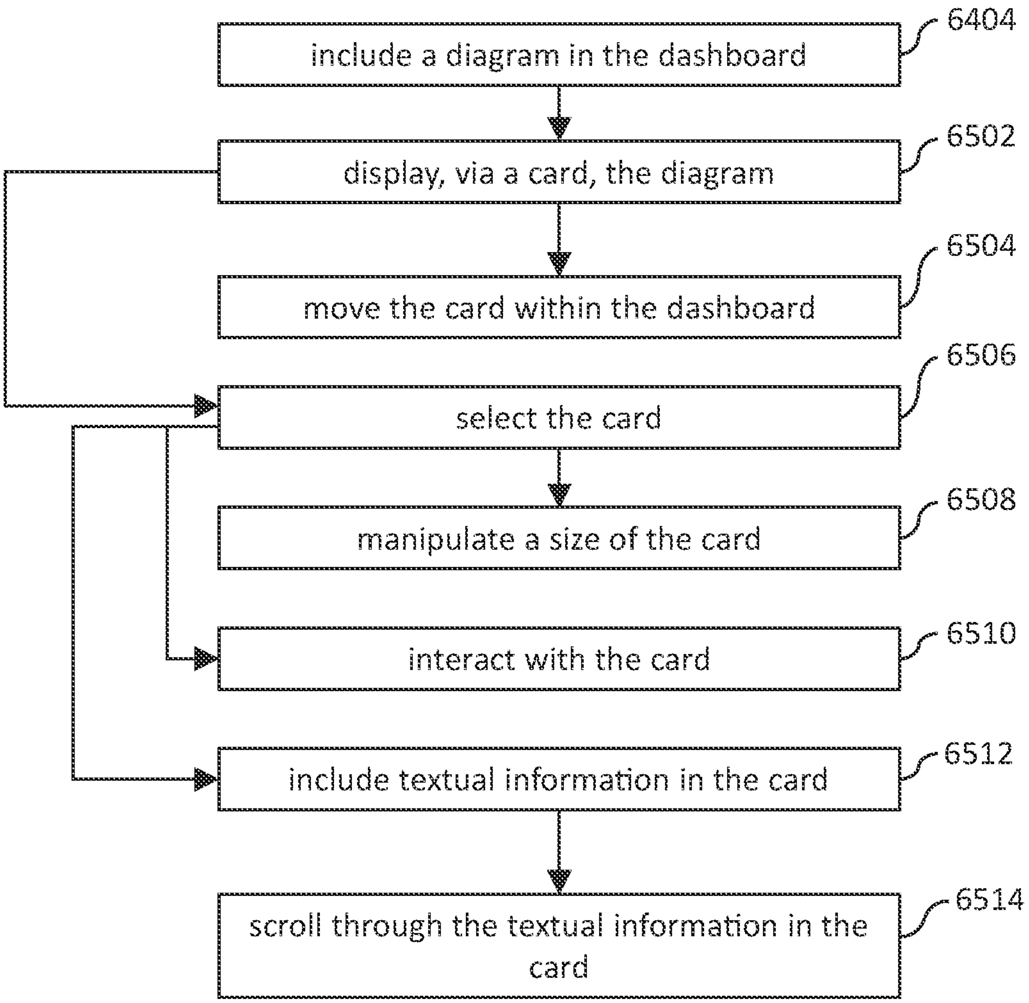

FIG. 65 illustrates a flowchart depicting a method of interacting with a dashboard, according to some examples. The method can include including a diagram in the dashboard (as seen in step 6404 in FIG. 64 above). In some examples, the method includes displaying, via a card, the diagram (at step 6502). According to some examples, the method includes moving the card within the diagram (at step 6504).

The method can include selecting the card (at step 6506). In some examples, the method includes manipulating a size of the card (at step 6508). According to some examples, the method includes interacting with the card (at step 6510).

The method can include including textual information in the card (at step 6512). In some examples, the method includes scrolling through the textual information in the card (at step 6514).

Figure 66:
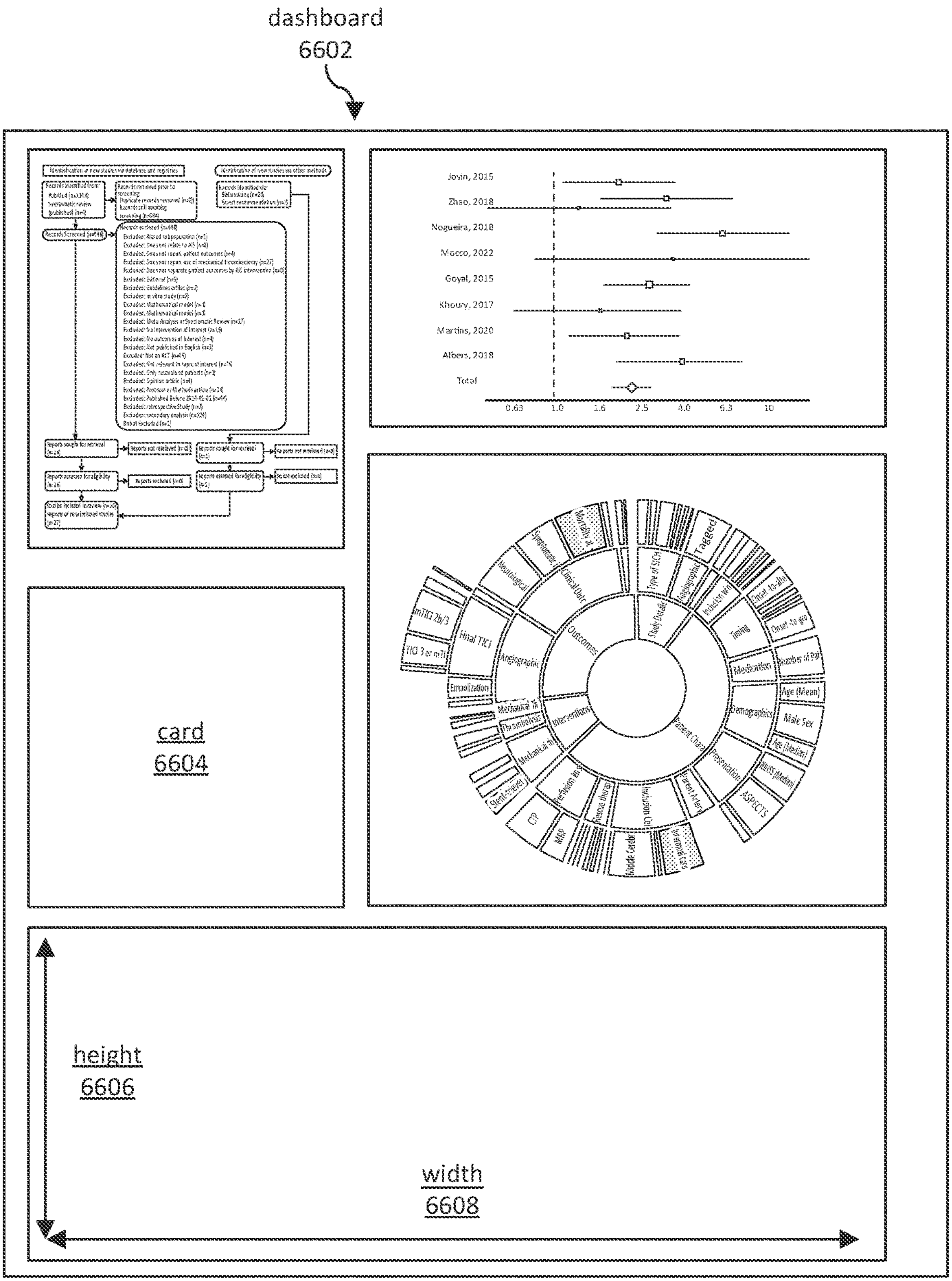
FIG. 66 illustrates a graphical representation of a dashboard, in accordance with some examples of the present disclosure.

FIG. 66 illustrates a graphical representation of a dashboard 6602, according to some examples. In some examples, the dashboard 6602 includes card 6604 which are capable of presenting textual or graphical information. As described in FIGS. 64 and 65 above, any of the graphical representations or diagrams mentioned throughout this disclosure can be included on a card 6604 for presentation on the dashboard 6602. This can allow a user to create a display for presentation, such as at a conference.

The dashboard 6602 can be a "living" dashboard 6602 in that the cards 6604 are fully interactable. Additionally, "living" can mean the dashboard 6602 is updatable, and this updating can occur automatically as the underlying database is updated (i.e., new electronic documents are added, screened, or extracted, or the data is updated in one of the other modules as detailed above). For example, the cards 6604 can have a height 6606 and a width 6608 that are adjustable. In this way, the cards 6604 can be increased or decreased in size, based upon the importance of the subject matter that they carry, the size of the information being presented, etc. Additionally, the cards 6604 can be maneuvered throughout the dashboard 6602 so that any single card 6604 can be placed anywhere on the dashboard 6602 at any time, making the dashboard 6602 fully customizable. Furthermore, the cards 6604 can be selected such that they display the underlying textual or graphical information, permitting a user to scroll through the information, thus providing more information than if it was limited to a smaller size presented by the card 6604 itself.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a predetermined desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that these and similar terms are to be associated with the appropriate physical quantities and are merely convenient labels applied to these quantities. The present disclosure can refer to the action and processes of a computing system, or similar electronic computing device, that manipulates and transforms data represented as physical (electronic) quantities within the computing system's registers and memories into other data similarly represented as physical quantities within the computing system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer-readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computing system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computing system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

We claim:

1. A system, comprising a non-transitory computer readable medium for managing medical literature, the non-transitory computer readable medium comprising instructions that, when executed by a processor, cause the processor to perform operations comprising:

identifying a plurality of electronic documents located in one or more medical literature databases, according to a search criteria, each electronic document comprising:

a work of authorship; and a plurality of topics of the work;

removing duplicates identified with the plurality of electronic documents;

screening the plurality of electronic documents to separate a plurality of inclusion electronic documents from one or more exclusion electronic documents, wherein the screening comprises:

training a model to identify screening criteria associated with i) an inclusion electronic document, ii) an exclusion electronic document, or iii) both;

analyzing the plurality of electronic documents, via the model, according to the screening criteria, so as to apply an inclusion probability for each electronic document of the plurality of electronic documents; and categorizing each electronic document having an inclusion probability i) equal to or above a threshold as an inclusion electronic document, or ii) below the threshold as an exclusion electronic document;

wherein training the model comprises associating, using a machine learning algorithm, i) metadata, ii) one or more topics, and iii) contextual information, of a subset of electronic documents of the plurality of electronic documents, with a calculation of the inclusion probability, wherein each electronic document of the subset of electronic documents is identified to be an inclusion electronic document or an exclusion electronic document, such that the model is configured to calculate the inclusion probability based on a combination of the metadata, the one or more topics, and the contextual information for a respective electronic document;

automatically generating a topic tag hierarchy for the plurality of topics of each inclusion electronic document of the plurality of inclusion electronic documents, via a tag generator, wherein the topic tag hierarchy for one or more topics of the plurality of topics comprises i) a corresponding topic tag that identifies a respective topic of the one or more topics, and ii) one or more subtopic tags, each subtopic tag corresponding to a subtopic identified as a part or division of the respective topic;

automatically extracting data associated with each topic of the plurality of topics for each inclusion electronic document based on i) a corresponding topic tag, ii) a corresponding subtopic tag, or iii) both, via the tag generator, wherein the tag generator is configured to identify the data related to the corresponding topic tag, the corresponding subtopic tag, or both;

wherein the tag generator is configured to provide i) a citation, ii) a quotation, or iii) both, of the extracted data from the work of authorship; and automatically presenting the extracted data as a visual, wherein automatically presenting the extracted data as a visual further comprises generating, via a sunburst diagram generator, a sunburst diagram renderable on an interactable graphical user interface (GUI), wherein the sunburst diagram depicts the topic tag hierarchy via a graphical representation of a hierarchical relationship between each topic tag and any corresponding one or more subtopic tags; and wherein each topic tag and the corresponding one or more subtopic tags are interactable, such that i) selecting a respective topic tag depicts a focused view of the topic tag, or ii) selecting a respective subtopic tag depicts a focused view of the respective subtopic tag.

2. The system of claim 1, wherein each topic tag is associated with a topic tag node and each subtopic tag of the one or more subtopic tags is associated with a corresponding subtopic tag node, and wherein a size of a respective subtopic tag node indicates a frequency of appearance of the corresponding subtopic tag within the plurality of inclusion electronic documents.

3. The system of claim 2, wherein each subtopic tag node indicates a frequency of appearance of the corresponding subtopic tag relative to other subtopic tags related to a corresponding topic tag.

4. The system of claim 1, wherein selecting a respective subtopic tag associated with a topic tag centers the respective subtopic tag, and wherein the sunburst diagram depicts a hierarchy comprising a graphical representation of a relationship.

5. The system of claim 1, wherein each topic tag comprises metadata that explains or is associated with the corresponding topic.

6. The system of claim 1, wherein each topic tag comprises a data element comprising a statistic.

7. The system of claim 6, wherein selection of a respective topic tag collects the corresponding statistic related to the data element from the work.

8. The system of claim 6, wherein the tag generator is configured to collect the statistic related to the data element from the work.

9. The system of claim 1, wherein the subset of electronic documents comprises a predefined percentage or amount of a total number of electronic documents in the plurality of electronic documents.

10. The system of claim 1, wherein each electronic document of the subset of electronic documents is identified to be an inclusion electronic document or an exclusion electronic document via input from a user.

11. The system of claim 10, wherein the model is configured to be updated via associating the i) metadata, ii) one or more topics, iii) contextual information, or iv) any combination thereof, of one or more additional subsets of electronic documents of the plurality of electronic documents, with the calculation of the inclusion probability, wherein each electronic document of the one or more additional subsets of electronic documents is identified to be an inclusion electronic document or an exclusion electronic document.

12. The system of claim 1, wherein the operations further comprise: updating the topic tag hierarchy by associating, via user input, a concept of the work of authorship as a new topic of the work, such that the tag generator is configured to automatically identify the concept in one or more of the plurality of inclusion electronic documents; and applying a new topic tag for each instance of the concept being identified in the one or more of the plurality of inclusion electronic documents.

13. The system of claim 12, wherein the extracting further comprises extracting data associated with the new topic based on the new topic tag.

14. The system of claim 12, wherein the user input comprises a question of interest relating to the work.

15. The system of claim 1, wherein the data comprises qualitative text, quantitative values, or both.

* * * * *